United States Patent
Suzuki et al.

(10) Patent No.: US 6,415,121 B1
(45) Date of Patent: Jul. 2, 2002

(54) CONNECTING METHOD OF RESIN MATERIAL MOLDED PRODUCT, PROCESS CARTRIDGE AND ASSEMBLING METHOD OF PROCESS CARTRIDGE

(75) Inventors: Akira Suzuki, Odawara; Kenshiro Abe, Edsakimachi; Tadayuki Tsuda, Susono; Shinichi Sasaki, Ushiku; Shigeo Miyabe, Numazu; Kouichi Hiratsuka, Tsuchiura, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/575,443

(22) Filed: May 22, 2000

(30) Foreign Application Priority Data

May 20, 1999 (JP) .............................. 11-139914
May 16, 2000 (JP) ........................ 2000-143047

(51) Int. Cl.[7] .................... G03G 15/00; B29C 65/70
(52) U.S. Cl. ........................ 399/111; 264/261
(58) Field of Search ................. 399/111, 113, 399/114; 156/245, 309.6, 244.22, 228; 264/259, 261; 425/542, 543, 588

(56) References Cited

U.S. PATENT DOCUMENTS

| | | | |
|---|---|---|---|
| 4,928,870 A | 5/1990 | Gat-Liquornik et al. | 228/107 |
| 5,126,800 A | 6/1992 | Shishido et al. | 355/211 |
| 5,134,441 A | 7/1992 | Nagata et al. | 355/245 |
| 5,151,734 A | 9/1992 | Tsuda et al. | 355/200 |
| 5,208,634 A | 5/1993 | Ikemoto et al. | 355/215 |
| 5,223,893 A | 6/1993 | Ikemoto et al. | 355/200 |
| 5,296,960 A | 3/1994 | Nomura et al. | 355/210 |
| 5,331,372 A | 7/1994 | Tsuda et al. | 355/200 |
| 5,331,373 A | 7/1994 | Nomura et al. | 355/200 |
| 5,345,294 A | 9/1994 | Nomura et al. | 355/200 |
| 5,404,198 A | 4/1995 | Noda et al. | 355/200 |
| 5,452,056 A | 9/1995 | Nomura et al. | 355/200 |
| 5,463,446 A | 10/1995 | Watanabe et al. | 355/200 |
| 5,470,635 A | 11/1995 | Shirai et al. | 428/131 |
| 5,475,470 A | 12/1995 | Sasago et al. | 355/210 |
| 5,485,249 A | 1/1996 | Higeta et al. | 355/210 |
| 5,488,459 A | 1/1996 | Tsuda et al. | 355/211 |
| 5,500,714 A | 3/1996 | Yashiro et al. | 355/200 |
| 5,510,878 A | 4/1996 | Noda et al. | 355/211 |
| 5,543,898 A | 8/1996 | Shishido et al. | 355/210 |
| 5,550,617 A | 8/1996 | Odagawa et al. | 355/210 |
| 5,561,504 A | 10/1996 | Watanabe et al. | 355/215 |
| 5,581,325 A | 12/1996 | Tsuda et al. | 355/200 |
| 5,583,613 A | 12/1996 | Kobayashi et al. | 355/200 |
| 5,585,889 A | 12/1996 | Shishido et al. | 355/200 |
| 5,585,902 A | 12/1996 | Nishiuwatoko et al. | 355/260 |
| 5,602,623 A | 2/1997 | Nishibata et al. | 399/111 |
| 5,608,509 A | 3/1997 | Shirai et al. | 399/351 |
| 5,617,579 A | 4/1997 | Yashiro et al. | 399/114 |
| 5,623,328 A | 4/1997 | Tsuda et al. | 399/111 |
| 5,640,650 A | 6/1997 | Watanabe et al. | 399/117 |
| 5,659,847 A | 8/1997 | Tsuda et al. | 399/113 |
| 5,669,042 A | 9/1997 | Kobayashi et al. | 399/111 |
| 5,689,774 A | 11/1997 | Shishido et al. | 399/111 |
| 5,768,660 A | 6/1998 | Kurihara et al. | 399/111 |
| 5,809,374 A | 9/1998 | Tsuda et al. | 399/111 |

(List continued on next page.)

FOREIGN PATENT DOCUMENTS

| | | | |
|---|---|---|---|
| JP | 63-57222 | * | 3/1988 |
| JP | 2-038377 | | 7/1990 |
| JP | 11-13980 | * | 1/1999 |

*Primary Examiner*—Joan Pendegrass
(74) *Attorney, Agent, or Firm*—Fitzpatrick, Cella, Harper & Scinto

(57) ABSTRACT

A bonding method for bonding molded resin products, includes the step of bonding a first one of the molded resin products and a second one of the molded resin products by injecting resin material through a resin material injection path to a bonding portion therebetween, wherein the resin material injection path is formed in one of or both of the first resin material molded product and the second resin material molded product.

69 Claims, 32 Drawing Sheets

U.S. PATENT DOCUMENTS

| | | | | |
|---|---|---|---|---|
| 5,812,909 | A | 9/1998 | Oguma et al. | 399/103 |
| 5,828,928 | A | 10/1998 | Sasago et al. | 399/111 |
| 5,839,028 | A | 11/1998 | Nomura et al. | 399/109 |
| 5,864,731 | A | 1/1999 | Ikemoto et al. | 399/27 |
| 5,870,654 | A | 2/1999 | Sato et al. | 399/109 |
| 5,873,012 | A | 2/1999 | Miyabe et al. | 399/90 |
| 5,878,304 | A | 3/1999 | Watanabe et al. | 399/92 |
| 5,878,309 | A | 3/1999 | Nomura et al. | 399/111 |
| 5,878,310 | A | 3/1999 | Noda et al. | 399/117 |
| 5,923,918 | A | 7/1999 | Nakagawa et al. | 399/27 |
| 5,926,666 | A | 7/1999 | Miura et al. | 399/25 |
| 5,937,237 | A | 8/1999 | Nonaka et al. | 399/106 |
| 5,943,529 | A | 8/1999 | Miyabe et al. | 399/111 |
| 5,946,531 | A | 8/1999 | Miura et al. | 399/111 |
| 5,950,047 | A | 9/1999 | Miyabe et al. | 399/111 |
| 5,966,567 | A | 10/1999 | Matsuzuki et al. | 399/111 |
| 6,006,058 | A | 12/1999 | Watanabe et al. | 399/167 |
| 6,009,289 | A | 12/1999 | Sekine et al. | 399/113 |
| 6,011,941 | A | 1/2000 | Takashima et al. | 399/111 |
| 6,029,031 | A | 2/2000 | Yokomori et al. | 399/109 |
| 6,041,196 | A | 3/2000 | Nakagawa et al. | 399/27 |
| 6,058,278 | A | 5/2000 | Tsuda et al. | 399/106 |
| 6,064,843 | A | 5/2000 | Isobe et al. | 399/111 |
| 6,070,028 | A | 5/2000 | Odagawa et al. | 399/104 |
| 6,072,968 | A | 6/2000 | Nomura et al. | 399/113 |
| 6,075,956 | A | 6/2000 | Watanabe et al. | 399/92 |
| 6,141,513 | A * | 10/2000 | Nishiuwatoko et al. | 399/109 |

* cited by examiner

FIG. 1 (b) (PRIOR ART)

CONNECTING METHOD OF RESIN MATERIAL MOLDED PRODUCT, PROCESS CARTRIDGE AND ASSEMBLING METHOD OF PROCESS CARTRIDGE

FIELD OF THE INVENTION AND RELATED ART

The present invention relates to a connecting method for molded resin products. Also, the present invention relates to a process cartridge detachably mounted to a main assembly of the electrophotographic image forming apparatus, and an assembling method of the process cartridge.

Here, the electrophotographic image forming apparatus forms an image on a recording material through an electrophotographic-image-formation-type process. Examples of electrophotographic image forming apparatus include an electrophotographic copying machine, an electrophotographic printer (a laser beam printer, an LED printer or the like), a facsimile machine and a word processor.

The above-described process cartridge contains as a unit an electrophotographic photosensitive member and a charging means, a developing means or a cleaning means in the form of a cartridge that is detachably mountable to a main assembly of an image forming apparatus. The process cartridge may contain an electrophotographic photosensitive member and at least one of a charging means, a developing means and a cleaning means in the form of a cartridge that is detachably mountably to a main assembly of an image forming apparatus. The process cartridge may contain an electrophotographic photosensitive member and at least developing means in the form of a cartridge that is detachably mountably to a main assembly of an image forming apparatus.

The molded resin product is a molded material of resin material, and may be a frame of the above-described process cartridge, a cap of a toner container and a main body of the container.

A description will be provided as to a conventional toner container which is a molded resin product.

The toner container is used with an electrophotographic image forming apparatus, and accommodates a developer (toner) for developing an electrostatic latent image.

FIG. 1(b) schematically shows a conventional toner container 40. More particularly, it shows a molding method wherein the toner container 42 and the toner container cap 41 are molded using a die slide injection molding method (the primary molding and the secondary molding are carried out using the same metal mold, as disclosed in Japanese Patent Application Publication No. HEI 2-38377, for example. In this molding method, a molten resin material, which is the same material as the toner container 42 and the cap 41, is applied to the abutment portions 142a, 142b, by which the container 42 and the cap 41 are bonded).

The toner container 42 and the cap 41 have the abutment portions 142a, 142b and flanges 143a, 143b, 143c, 143d. In the surface of the flange, there are provided continuous or intermittent recesses or projections 144a, 144b, 144c, 144d extended along the longitudinal direction, which are projected or recessed in a direction not interfering with the removal of the mold. The recess or the projection are engaged in the mold at a predetermined position.

As shown in FIG. 7, a gate 72 which in this molding technique provides an inlet for the bonding material to the abutment portion is provided on a horizontal extension line of the abutment portion 142a, and more particularly, the gap formed between the frames. The molten resin material, as shown in the figure by an arrow 7, flows perpendicularly into the abutment portion 142a through the gate 72 in the horizontal direction.

With this conventional structure, the projected area of the unit after the connection has to be significantly larger than the inside volume thereof (by approximately 3–4 mm) at the connecting portions at each sides.

Additionally, when the cap is manufactured (molded), the direction of the mold removal is limited, with the result that there is less latitude in the design of the product.

The position of the gate is as described in the foregoing. Therefore, the portion of the container not engaged with the metal mold due to the pressure of the resin material upon the resin material injection, is liable to deform inwardly of the container, that is, the direction of the resin material injection through the gate. Furthermore, a high fluid material has to be selected with an increased number of gates.

The resin-material injecting direction is necessarily determined with the result that there is less latitude in the design of the metal molds.

The DSI molding method, as disclosed in Japanese Patent Application Publication No. HEI 2-38377, carries out the primary molding and the secondary molding in the same metal molds. Therefore, the number of the containers which can be bonded is normally two, and if the number is larger, the configurations of the metal molds are very complicated. However, when parts are connected using connecting metal molds other than the molding molds, the container side for one connecting mold has a plurality of cavities (determined by the number of the metal molds and the number of the containers). Therefore, the matching is not good, and there is a liability that a gap results in the molded product and the metal mold and therefore the leakage of the resin material may occur.

The present invention is intended to provide a further development of the above-described conventional technique.

SUMMARY OF THE INVENTION

Accordingly, it is a principal object of the present invention to provide a connecting method for molded resin products, a process cartridge and an assembling method of a process cartridge, wherein molded resin parts are assuredly bonded.

It is another object of the present invention to provide a bonding method of molded resin products, a process cartridge, and an assembling method of a process cartridge, wherein molded resin parts having complicated configurations can be connected through a simple process.

It is a further object of the present invention to provide a bonding method of molded resin products, a process cartridge and an assembling method of a process cartridge, wherein molded resin parts can be connected without deformation.

According to an aspect of the present invention, there is provided a bonding method for bonding molded resin products. The improvement resides in the bonding of a first one of the molded resin products and a second one of the molded resin products by injecting resin material through a resin material injection path to a bonding portion therebetween. The resin material injection path is formed in one of or both of the first resin material molded product and the second resin material molded product.

A first one of the molded resin products and a second one of the molded resin products are bonded by injecting resin material through a resin material injection path to a bonding portion therebetween, wherein the resin material injection path is formed in one of or both of the first resin material molded product and the second resin material molded product.

According to another aspect of the present invention, there is provided a bonding method for bonding molded resin products, comprising a first molding step of forming a first resin material molded product by a first metal mold, a second molding step for forming a second resin material molded product by a second metal mold, and a positioning step of placing the first resin material molded product and the second resin material molded product in a third metal mold which is different from the first metal mold and second metal mold and positioning bonding portions of the first resin material molded product and the second resin material molded product. The method also comprises a bonding step of bonding the first resin material molded product and second resin material molded product with each other by injecting a resin material through a resin material injection path to a bonding portion between the first resin material molded product and second resin material molded product. The resin material injection path is provided in one of or both of the first resin material molded product and the second resin material molded product.

According to a further aspect of the present invention, there is provided a process cartridge which is detachably mountable to a main assembly of an electrophotographic image forming apparatus, comprising an electrophotographic photosensitive member, process means actable on the electrophotographic photosensitive member, and an outer wall constituted by bonding a first resin material molded product and a second resin material molded product by injecting resin material through a resin material injection path to a bonding portion between the first resin material molded product and the second resin material molded . The resin material injection path is provided in one of or both of the first resin material molded product and the second resin material molded product.

According to a further aspect of the present invention, there is provided a process cartridge which is detachably mountable to a main assembly of an electrophotographic image forming apparatus, comprising an electrophotographic photosensitive drum, a charge member for electrically charging the electrophotographic photosensitive drum, a developing member for developing an electrostatic latent image formed on the electrophotographic photosensitive drum, a drum frame for supporting the electrophotographic photosensitive drum and the charge member, a developer frame having a developer accommodating portion for accommodating a developer for use by the developing member to develop the electrostatic latent image, and a first end cover bonded to the drum frame and the developer frame by injecting resin material through a resin material injection path to bonding portions between the first end cover and the drum frame and between the first end cover and the developer frame. The first end cover is provided at one side longitudinal ends of the drum frame and the developer frame. The process cartridge also comprises a second end cover bonded to the drum frame and developer frame by injecting resin material through a resin material injection path. The second end cover is provided at the other side longitudinal ends of the drum frame and developer frame.

According to a further aspect of the present invention, there is provided an assembling method of a process cartridge which is detachably mountable to a main assembly of an electrophotographic image forming apparatus, comprising a step of preparing an electrophotographic photosensitive member, a step of preparing process means actable on the electrophotographic photosensitive member, and a step of bonding a first resin material molded product and a second resin material molded product by injecting resin material through a resin material injection path to a bonding portion between the first resin material molded product and second resin material molded product, with the resin material injection path being provided in one of or both of the first resin material molded product and second resin material molded product.

According to a further aspect of the present invention, there is provided an assembling method of a process cartridge which is detachably mountable to a main assembly of an electrophotographic image forming apparatus, comprising a step of preparing a drum frame for supporting an electrophotographic photosensitive drum and a charge member for electrically charging the electrophotographic photosensitive drum. The method also comprises a step of preparing a developer frame having a developer accommodating portion for accommodating a developer for use by a developing member to develop the electrostatic latent image. The method further comprises a first bonding step of bonding a first end cover to the drum frame and to the developer frame by injecting resin material through a resin material injection path to bonding portions between the first end cover and the drum frame and between the first end cover and the drum frame. The first end cover is bonded to one side longitudinal ends of the drum frame and the developer frame. The method also comprises a second bonding step of bonding a second end cover to the drum frame and to the developer frame by injecting resin material a resin material injection path to bonding portions between the second end cover and the drum frame and between the second end cover and the developer frame. The second end cover is bonded to the other side ends of the drum frame, a lower developing cover and a developer frame.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The preferred embodiments of the present invention will be described in conjunction with the accompanying drawings.

Figure 14:
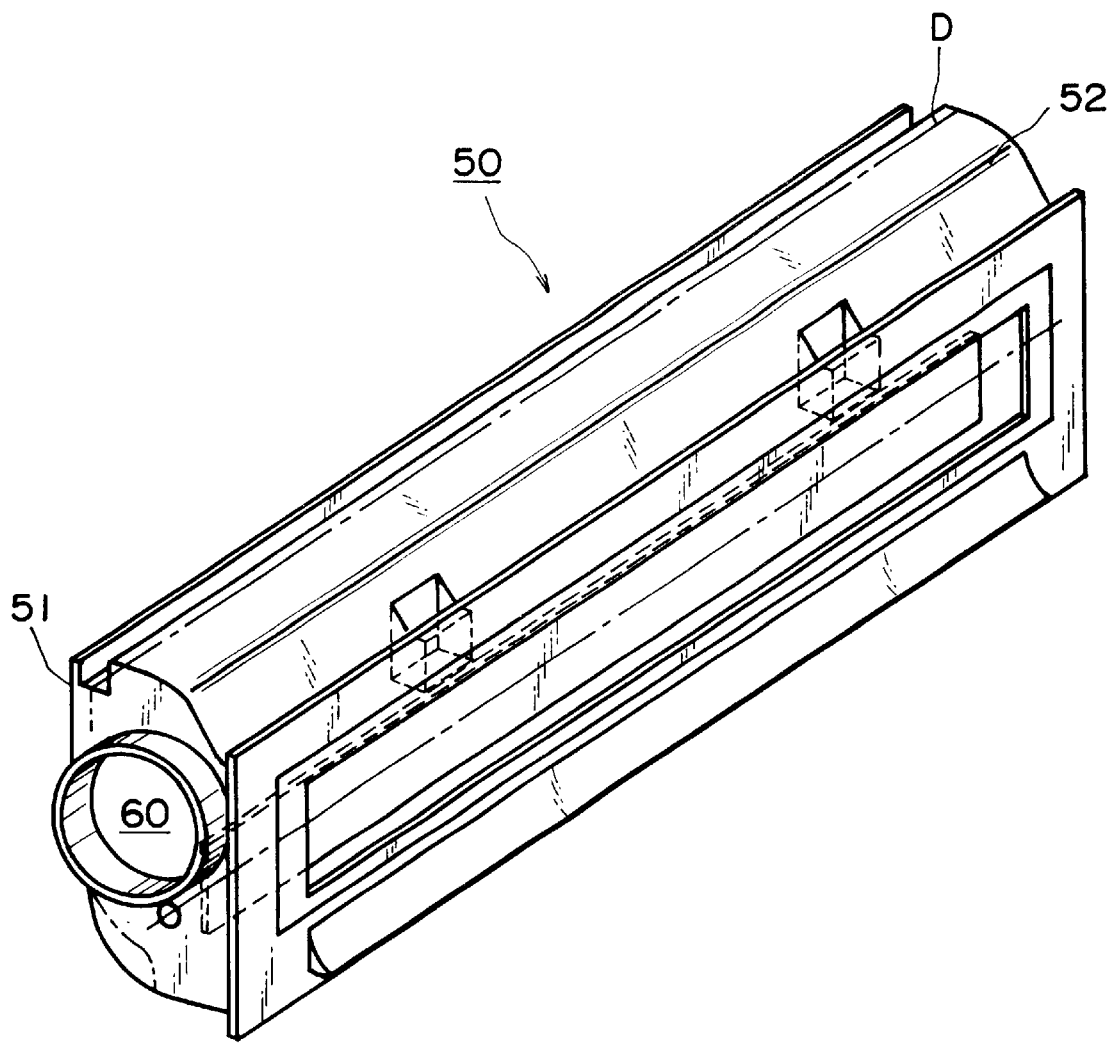
FIG. 14 is a perspective view of a toner container.

FIG. 14 is a perspective view of a toner container 50.

The container 50 is used for a color developing device for a color laser beam printer. The container 50 accommodates a developer (toner) for developing an electrostatic latent image formed on an electrophotographic photosensitive member. The container 50 comprises a main body 51 of a toner container of a molded resin product and a cap 52, which are bonded by resin material.

The container 50 is produced through an integral molding process. In this embodiment, two half bodies are abutted to each other and are bonded by molten resin material. The connecting portion is indicated by the D part of a chain line.

The inside 60 of the container 50 is filled with toner, and is sealed until the start of use.

A description will be provided as to a manufacturing method of the container 50.

Figure 1:
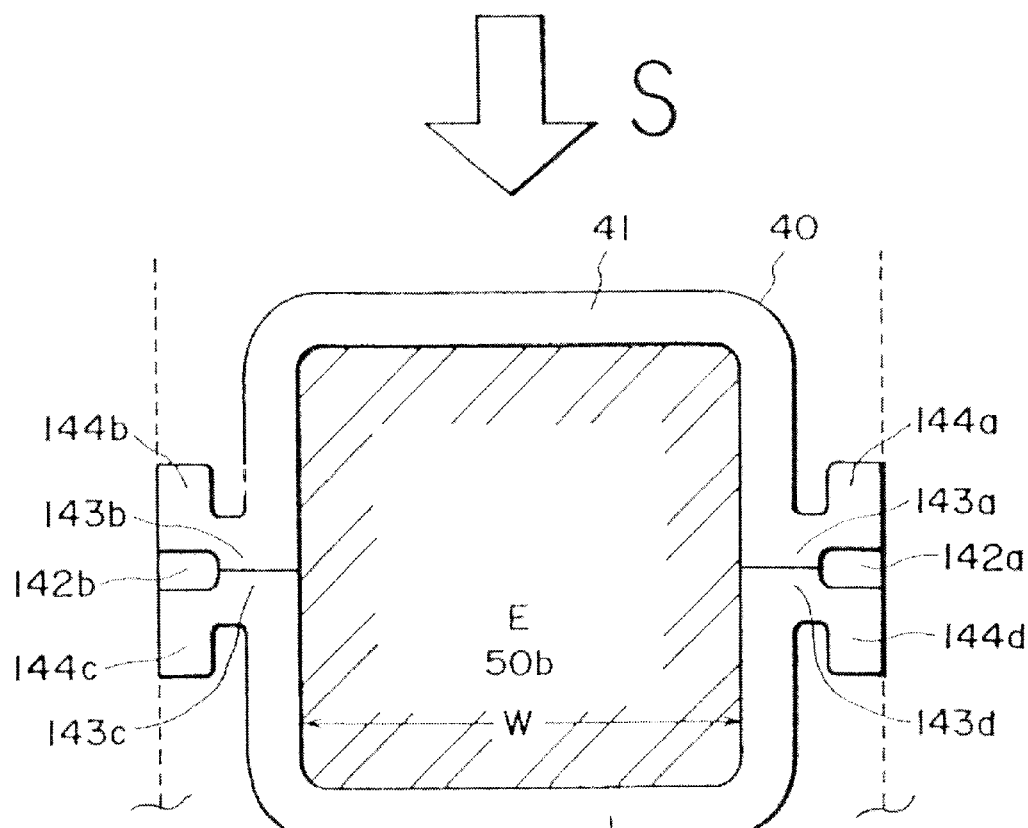
FIG. 1 is a longitudinal sectional view of a hollow member of resin material according to Embodiment 1 of the present invention (a), and a longitudinal sectional view of a hollow member of resin material according to prior art.
Figure 1:
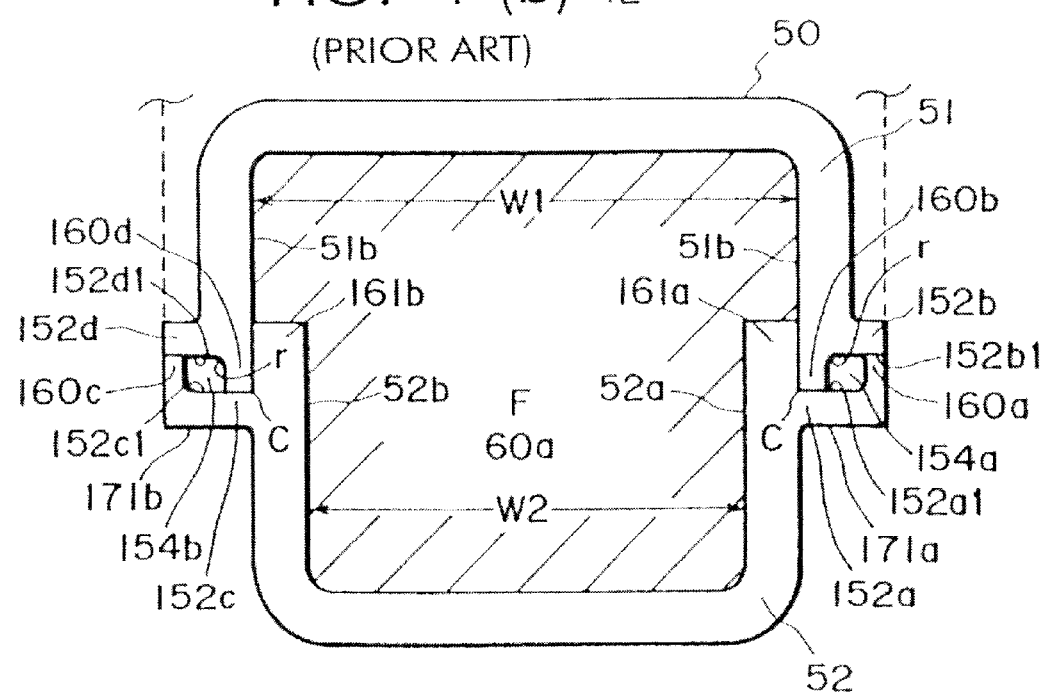

FIG. 1 is a cross-sectional view of the toner container.

FIG. 1(a) is a sectional view of a toner container 50 according to an embodiment of the present invention. FIG. 1(b) is a sectional view of a conventional toner container 40.

In this embodiments, a main body of the toner container (molded resin product or container part) 51 and a toner container cap (molded resin product or container part) 52 are bonded in the following manner.

A description will be provided as to Embodiments 1 to 4. The Embodiments 1–4 will be described in more detail after Embodiment 5.

(Embodiment 1)

FIG. 1(a), 4, 12, 13 show Embodiment 1.

Figure 12:
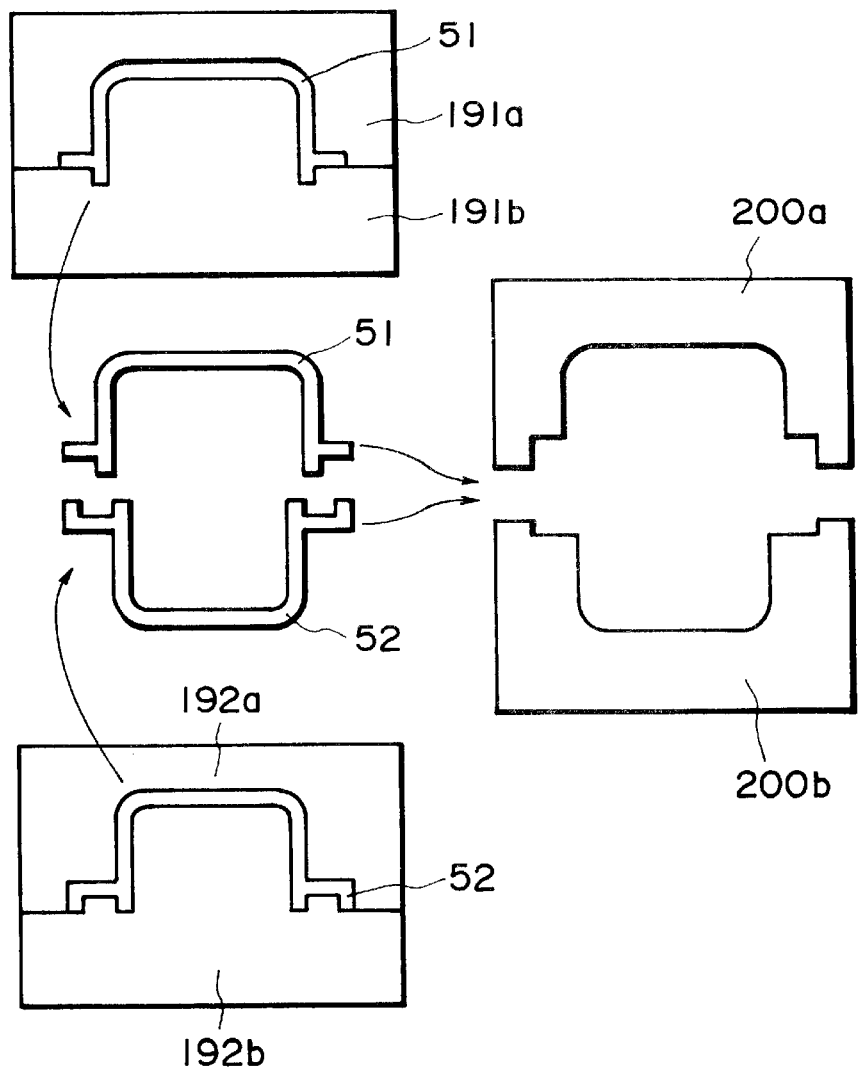
FIG. 12 is a longitudinal sectional view illustrating a connection metal mold and a container part to be conducted therewith.
Figure 13:
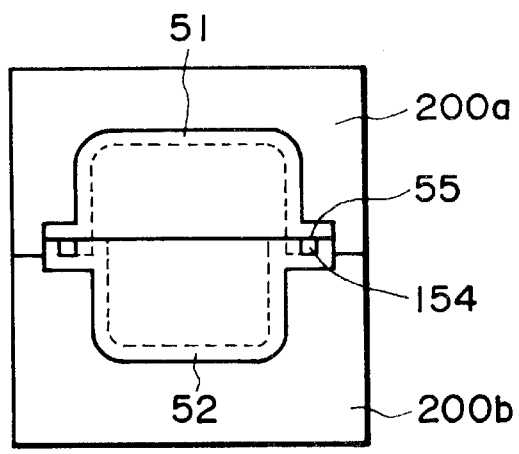
FIG. 13 is a longitudinal sectional view in which molten resin material has to flow to an abutment portion in which a container part has been set in a metal mold for collection.

As shown in FIG. 12, the main body 51 of the container is injection-molded using an upper metal mold 191a and a lower metal mold 191b. Thus, the main body 51 of the container is formed as a molded resin product. A cap 52 is injection-molded using an upper metal mold 192a and a lower metal mold 192b. By this, cap 52 is formed as a molded resin product.

Then, the main body 51 and the cap 52 of the container are accommodated in the cavity formed by an upper metal mold 200a and a lower metal mold 200b which are different from the metal molds 191a, 191b, 192a, 192b. The flanges 152a, 152c and the flanges 152b, 152d are abutted to each other. Then, abutment portions 154a, 154b for receiving the injected resin material, is formed between the flanges 152a and the 152c and the flanges 152b and 152d. The abutment portions 154a, 154b are constituted by the main body 51 and the cap 52 of the container. A groove (resin material injection path) for injecting the resin material along the connecting portion between the main body 51 and the cap 52 of the container, is formed in one of the main body 51 and the cap 52. The groove functions to guide the injected resin material.

Figure 4:
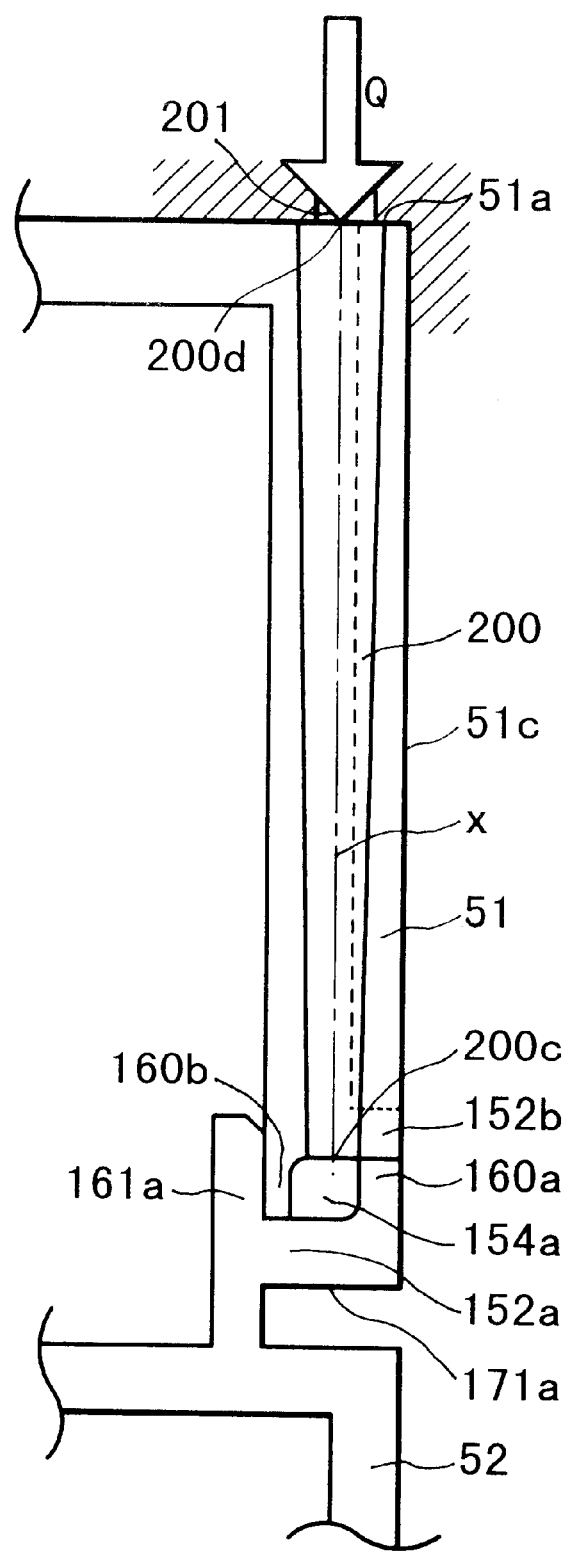
FIG. 4 is a sectional view taken along a line M—M of FIG. 3.

Thus, the main body 51 and the cap 52 are abutted to each other using metal molds 200a, 200b which are different from the metal molds 191a, b, 192a, b used for the injection molding of the plastic resin material (resin material) to form the main body 51 and the cap 52 of the container. Then, the container resin material is injected to the abutment portion 154 through the injection path 200 (FIG. 4). By doing so, the main body 51 and the cap 52 are bonded to each other. With such a bonding method, the plurality of the parts (molded resin products) can be bonded with a higher latitude in the design thereof. The assembling is simplified.

The resin material injection path 200 is provided in the main body 200a of the container.

(Embodiment 2)

Figure 2:
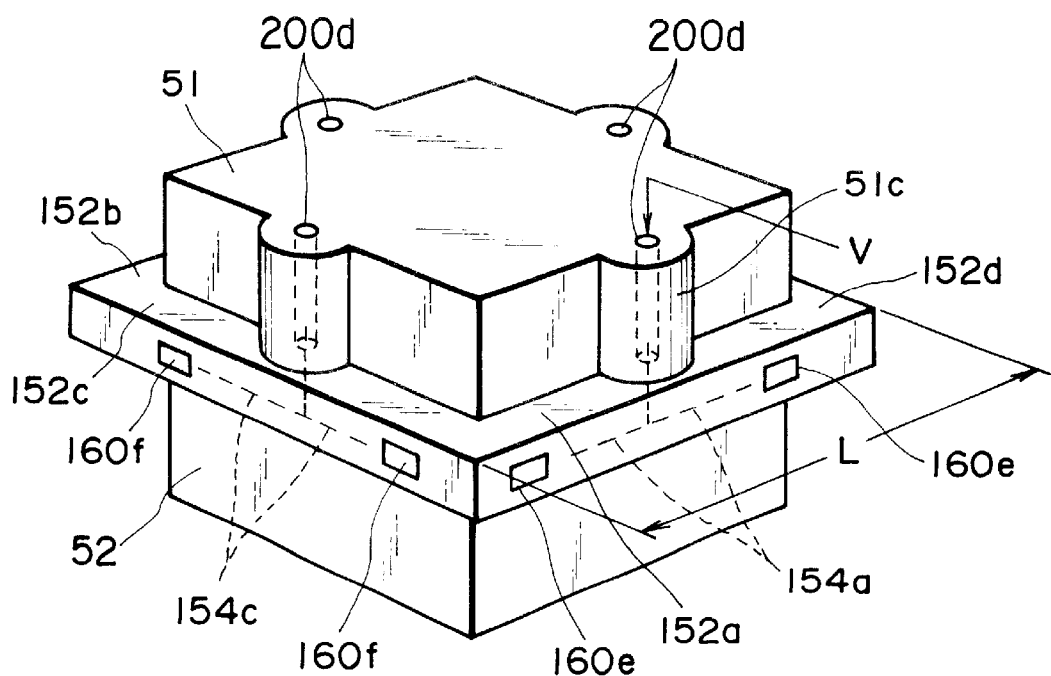
FIG. 2 is a perspective view of a hollow member of resin material according to Embodiment 2 of the present invention.

As shown in FIG. 1(a) and FIG. 2, at least 2 molded products 51, 52 produced by the injection molding of the plastic resin material (resin material), are abutted to each other in the molds. Then, the bonding molten resin material is injected into the abutment portions 154a, 154b. In this manner, they are bonded. The bonding or connected structure is provided by the flange portions 152a, 152b, 152c, 152d formed by the container parts 51, 52 and ribs 160a, 160b, 160c, 160d projected in the mold removing direction from the flange portion. One of container part 52 is provided, in addition to the ribs 160b, 160d, with ribs 161a, 161b for preventing inward deformation of the ribs 160b, 160d when the molten resin material is injected. The ribs 161a, 161b are projected in the mold removing direction, similarly to the ribs 160a, b, c, d. Therefore, as compared with the conventional structure, the flange portion 152b is shorter, so that container 50 can provide larger inside volume F. The projected area S as the unit can be reduced. Additionally, the mold removing structure can be more freely selected when the container 50 is produced or molded. Thus, the limitations in the product design can be reduced.

(Embodiment 3)

Figure 9:
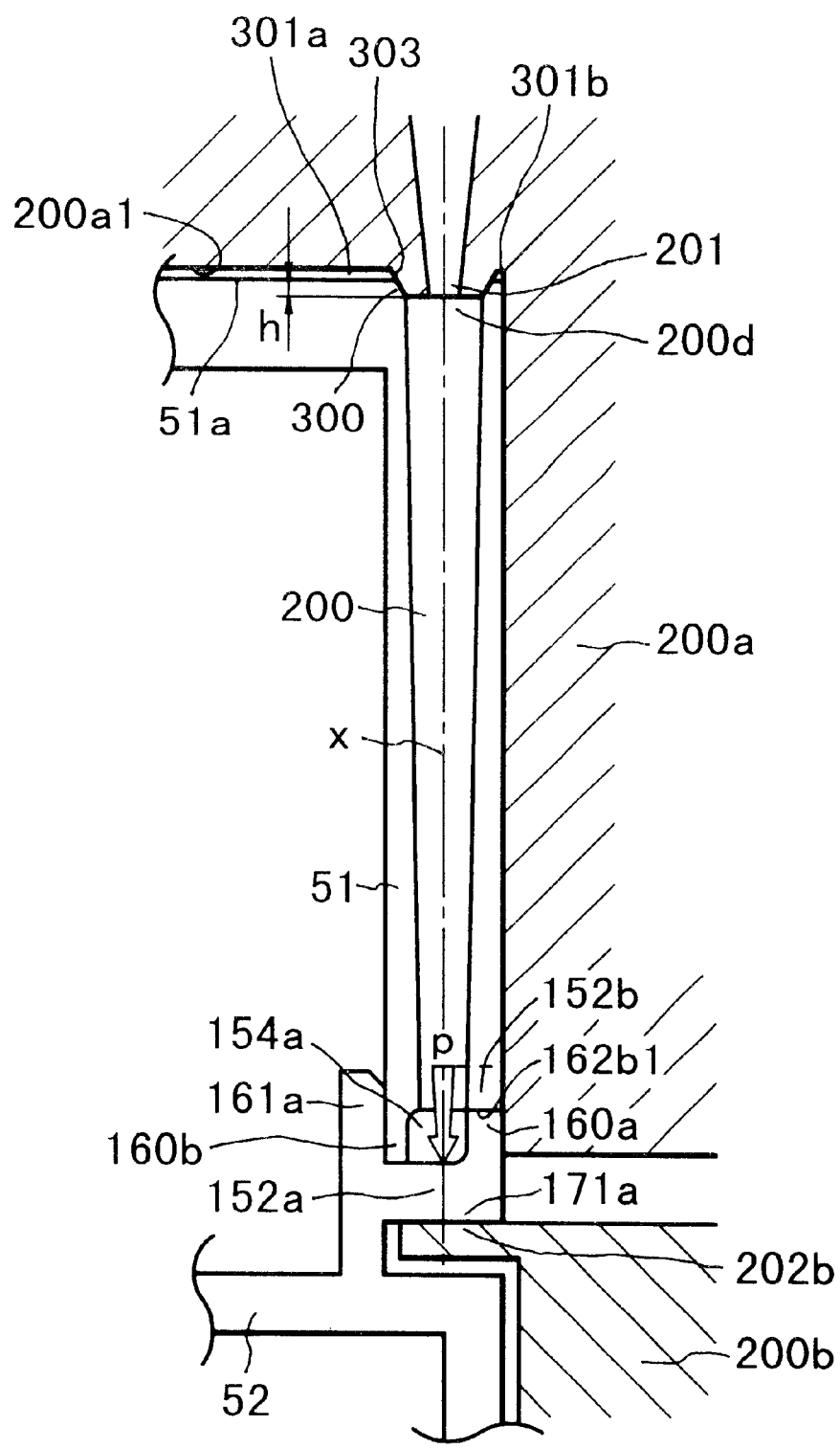
FIG. 9 is a sectional view taken along a line M—M of FIG. 3 illustrating a relation between a metal mold gate and a resin material flow path.

As shown in FIG. 1(a) and FIG. 9, the thickness of the rib 160a, 160b (160c, 160d) is 0.3 mm–2.5 mm. By doing so, when the resin material is injected into the abutment portion, the ribs are deformed radially in the perpendicular direction to the resin flow direction by the pressure applied further to the center of the abutment portion. The ribs are closely contacted to the back-up ribs 161a of the metal mold 200a and the container part 52. Therefore, the injected material does not leak into the container.

(Embodiment 4)

In the bonding structure in the Embodiment 2, the cross-sectional area 55 in the direction perpendicular to the direction of the resin material flow at the molten resin material injecting portion (FIG. 13) is 1 mm to 9 mm. By such a selection, the cross-sectional area 55 of the molten resin material injecting portion 154a, 154b as can be determined properly depending on the desired connection strength and the bonding length (region) (FIG. 2).

(Embodiment 5)

FIG. 1 is a longitudinal sectional view of a hollow member of synthetic resin material, which illustrates Embodiment 5. The longitudinal section in the direction perpendicular to the direction of FIG. 1, is similar, too, except for the different size in the horizontal direction. Therefore, FIG. 1 is commonly used for explanation.

FIG. 1(a) shows also Embodiment 5. FIG. 1(b) shows a prior art structure for comparison with the embodiment of the present invention.

The container parts 51, 52 abut each other in the mold (unshown). Then the molten resin material for the bonding is injected into the abutment portions 154a, 154b. By doing so, the container parts 51, 52 are bonded to each other.

Here, flange portions 152a, 152b and 152c, 152d are provided at the position where the container parts 51, 52 are abutted to each other. The flange portions 152b, 152d are provided on the container part 51. The flange portions 152a, 152c are provided on the container part 52. The flange portions 152b, 152d are provided with ribs 160b, 160d which are projected in the mold removing direction along the edge of the container part 51 and which are contactable to the flange portions 152a, 152c.

The container part 51 takes a top position, and the container part 52 takes the bottom position during the bonding. The rib 160b, 160d are directed 5 in the vertical direction (mold removing direction) The inner walls 51b, 51b of the container part 51 are flush with a side surface of the ribs 160b, 160d. The flange portions 152b, 152d are outer flanges extended on the outer periphery of the side and have horizontal flange surfaces 152b1, 152d1. The thicknesses of the ribs 160b, 160d measured in the direction perpendicular to the mold removing direction are 0.3 mm–2.5 mm. The top surfaces of the ribs 160b, 160d are horizontal, and inner corners of the ribs 160b, 160d are beveled as indicated by C. The flange portions 152a, 152c are provided with ribs 160a, 160c which are projected in the mold removing direction along the edge of the container part 52 and which are contacted to the flange portions 152b, 152d. The ribs 160a, 160c are provided on the outside of the rib 160b, 160d as with the abutment portions 154a, 154b therebetween. The horizontal surfaces 152a1, 152c1 of the flange portions 152a, 152c are contacted by the ribs 160b, 160d. The ribs 160a, 160c are projected in the mold removing direction (perpendicular direction).

The container part 52 is provided with ribs 160a, 160c which are parallel with the ribs 161a, 161b which will be described hereinafter, respectively. The ribs 160a, 160c have outer surfaces which are flush with the ends of the flange portions 152a, 152c. The flange portions 152a, 152c are on the outside of the container part 52. The ribs 160b, 160d are contacted to the flange surfaces 152a1, 152c1 of the flange portions 152a, 152c. The thicknesses of the ribs 160a, 160c measured in the mold removing direction are 0.3 mm–2.5 mm.

The heights of the ribs 160a, 160b, 160c, 160d from the flange surfaces 152a1, 152b1, 152c1, 1521d are the same.

The abutment portion 154a, 154b sides of the ribs 160a, 160b, 160c, 160d are of a circular column shape having a radius r. The heights of the ribs 160b, 160d are the same as the heights of the ribs 160a, 160c. Therefore, before the molten resin material is injected into the abutment portion 154a, 154b, the abutment portion 154a, 154b is a cavity having a rectangular cross-section. It is provided at diagonal corners.

The ribs 160a, 160b, 160c, 160d enclose the edges of the container part 51, 52. The shape provided by legitimate cutting of the edges of the container parts 51, 52 is the same as in FIG. 1(a).

The cross-sectional area of the abutment portions 154a, 154b is 1–9 mm². In this embodiment, cross-sections of the abutment portions 154a, 154b are square. Therefore, the heights of the ribs 160a, 160b, 160c, 160d are approximately 1–3 mm. The container part 52 is provided with back-up ribs 161a, 161b for preventing deformation of the ribs 160b, 160d toward inside of the container when the molten resin material is injected. The ribs 161a, 161b are projected in the mold removing direction.

They are provided inside the ribs 160b, 160d.

The rib 161a, 161b have side surfaces which are flush with the inner walls 52a, 52b.

The container part 52 has inner walls 52a, 52b having flat surfaces. The inner walls 52a, 52b extend beyond the flange portion 152a, 152c as back-up ribs 161a, 161b. The heights of the back-up ribs 161a, 161b are substantially equal to the height of the abutment portions 154a, 154b from the flange surfaces 152a1, 152c1 plus the thickness of the flange portions 152b, 152d. The thickness of the back-up ribs 161a, 161b is substantially equal to the thickness of the container part 52. Therefore, the deformation of the back-up ribs 161a, 161b per se when the back-up ribs 161a, 161b received force due to deformation of the ribs 160b, 160d, can be suppressed. FIG. 1 shows both of the embodiment in (a) and the conventional example in (b).

Here, it is assumed that widths of the hollow members of synthetic resin material of the containers of the prior art and of the present invention are the same (in FIG. 1, the parallel broken lines are on the flange end surfaces which define the widths). In the conventional example, the inner distances of the cap 41 and the container 42 in the widthwise direction are the same (W). In the present invention, the inner distance of the container part 51, that is, the dimension W1 between the inner walls 51b, 51b is larger than the distance W between the inner walls of the toner container of the conventional example. The distance W2 between the inner walls of the container part 52 is equal to the distance W between the inner walls of the conventional example. The hollow members of synthetic resin material of the conventional example and the embodiment have the same heights.

Therefore, if the lengths of toner containers of the conventional example and the toner container of the embodiment are the same, the inside volume F in the embodiment is larger than the inside volume E of the conventional toner container.

A description will be provided as to the operation of the injection of the molten resin material with these structures. No runner is shown in the figure. Preferred embodiments of the runner and the gate will be described hereinafter. In any case, the molten resin material flows to the abutment portions 154a, 154b through a molten resin material injecting portion extending from the outside to abutment portions 154a, 154b. At this time, the ribs 160b, 160d receive inward forces by the pressure applied in the direction of the center of the abutment portion perpendicularly to the direction of the flow of the molten resin material. However, the ribs 160b, 160d abut the ribs 161a, 161b so that deformation thereof is prevented. The ribs 160b, 160d process against the rib 161a, 161b to enhance the rigidity and the strength of the container. The ribs 160a, 160c tend to deform outwardly of the container by the pressure. However, the outer surfaces of the ribs 160a, 160c abut the metal mold (unshown) so that deformation is limited. It is preferable that the heights of the back-up ribs 161a, 161b from the flange surfaces 152a1, 152c1 are larger than the heights of the ribs 160b, 160d. From the standpoint of increasing the inside volume F of the container, the heights of the back-up ribs 161a, 161b are small.

The ribs 160a, 160c receive pressure from the molten resin material in the abutment portions 154a, 154b. However, the deformation is limited by the contact to the metal mold. Therefore, the ribs 160a, 160c may have a smaller thickness within the range described above.

The material of the container part is, for example, shock-resistant polystyrene.

(Embodiment 6)

In this embodiment, an injection path leading to the abutment portion is provided in one of the container parts. The structure of the ribs is the same as with Embodiment 5, and the detailed description thereof are omitted for simplicity.

Figure 3:
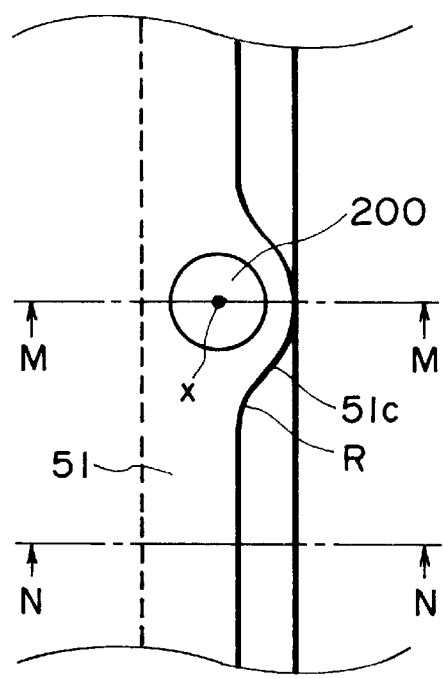
FIG. 3 is a view taken along a line V—V of FIG. 2.
Figure 5:
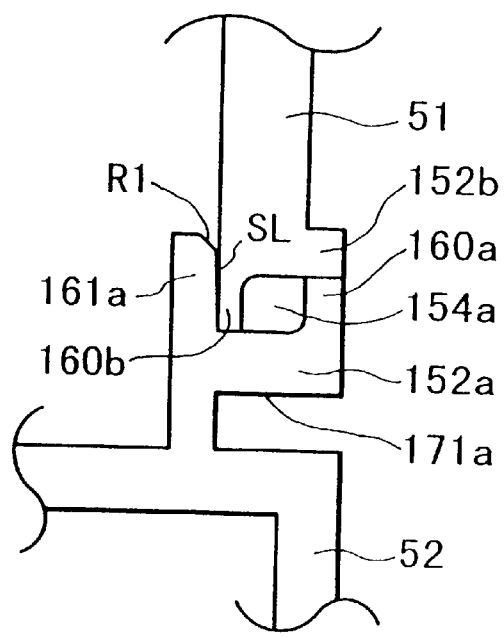
FIG. 5 is a sectional view taken along a line N—N of FIG. 3.

FIG. 2 is a perspective view; FIG. 3 is a view as seen in a direction V; FIG. 4 is a sectional view taken along a line M—M; FIG. 5 is a sectional view taken along a line N—N of FIG. 3.

In this embodiment, the injection path down to the abutment portion is formed in one of the container parts. The flow path penetrates between the abutment portion and an outside of the container part.

As shown in FIG. 2, the container part 51 is provided with injection ports 200d for the molten resin material at the position of the gate of the metal mold. In this embodiment, each of the injection ports 200d is disposed substantially at the center of the edge of the flange portion 152 (152a, 152b, 152c, 152d) of the container part 51. The injection path 200 extending toward the abutment portion in the flange 152 is the same as the one described in the foregoing description. A description will be provided as to the abutment portion 154a.

As shown in FIG. 4, the injection path 200 is extended perpendicularly to the direction of the flow of the resin material at abutment portion 154a. In this embodiment, the injection path 200 is vertical. The injection path 200 is extended between the outer surface 51a and the abutment portion 154a of the container part 51.

In order to provide the injection path 200, the container part 51 is provided with a column-like portion 51c extending from the flange portion 152b to the outer surface 51a ((FIG. 2). As shown in FIG. 3, it is arcuate having a center which is the center line x of the injection path 200. The corners between the outer surface of the container part 51 are rounded as indicated by R.

The injection path 200 is tapered with a large diameter portion at the injection port 200d side and a small diameter portion 200c at the abutment portion 154a side.

As shown in FIG. 5, the relationship among the ribs 160a, 160b, 161a is the same as with Embodiment 1. However, the corner of the base portion of the back-up rib 161a is not rounded. The rib 161a is provided with an inclined surface SL with a beveled portion R1. Therefore, the rib 160b easily contacts the side surface of the back-up rib 161a when the container parts 51, 52 are assembled. Thus, a side surface of a free end of the rib 160b is closely contacted to a side surface of the back-up rib 161a at the base portion, by pressure of the resin material flowing into the abutment portion 154a. Therefore, the back-up rib and the rib of the upper container part are closely contacted all over the connecting portion of the container parts 51, 52.

Figure 7:
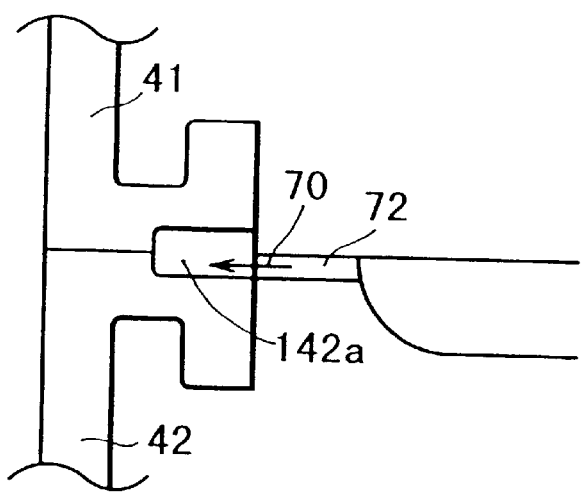
FIG. 7 is a longitudinal sectional view illustrating a runner and a gate in a conventional example.

According to this embodiment, the gate portion of the metal mold is connected to the injection path 200 at the outer side of the container part 51. Therefore, as shown in FIG. 7, there is no need to provide a side gate 72 adjacent to the abutment portion. Moreover, the metal mold for bonding the container parts 51, 52 can be downsized in terms of the product projected area. In the conventional example shown in FIG. 7, the side gate 72 is provided at the side of the abutment portion 142a. Therefore, a runner has to be provided in a radial direction from an outside of the main body 42 of the container and the container cap 41, requiring the use of a larger metal mold.

According to this embodiment, as indicated by arrow Q in FIG. 4, the gate of the metal mold is connected to the injection port 200d of the injection path 200. Since the injection path 200 is convergingly tapered, the molten resin material, when it is supplied into the injection path 200, is not solidified in the injection path 200 and is gate-sealed in the neighborhood of the small diameter portion 200c whether the abutment portion 154a and the injection path 200 are crossed with each other. Therefore, the resin material pressed and injected into the abutment portion 154a does not flow back to the injection path 200. The resin material is solidified at the abutment portion 154a with the ribs 160a, 160b pressed against the metal mold 200a (FIG. 9) and back-up rib 161a.

(Embodiment 7)

Figure 6:
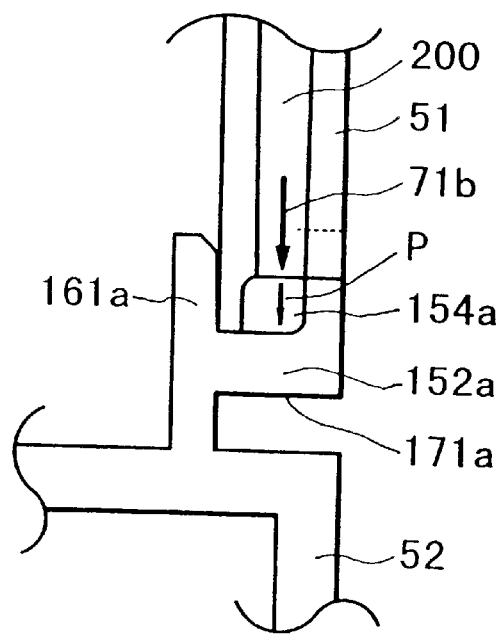
FIG. 6 is a partly enlarged view of the view shown in FIG. 4.

According to the Embodiment 6, the resin material flowing in the injection path 200 is as indicated by an arrow 71b in FIG. 6 at the abutment portion 154a. It then abuts the flange portion 152a. By this, the flange 152a receives molten resin material by the change of the kinetic momentum of the molten resin material. The force P is large because the flow speed and the mass of the flowing resin material through the injection path 200 are large.

In this embodiment, therefore, as shown in FIG. 9, a lower surface 171a of the flange 152a is supported by a support surface 202b provided in the metal mold 200b to support the container part 52.

A surface 202b for supporting the metal mold 200b is provided to cross with an extension of a center portion line x extending through the gate of the metal mold and the injection path 200. Therefore, the pressure imparted to the flange by the injected resin material is received by the flange, which is backed up by the metal mold, so that the flange is not deformed. Additionally, the limitation on the selection of the high fluid material, the requirement for the increase of the number of the gates, or other limitations on the manufacturing process, can be avoided. Even if the ejection pressure is set slightly higher, a problem such as deformation in the unit after the bonding, does not arise.

The kinetic energy of the resin material flowing in the resin material flow path is quickly converted to a static pressure. Therefore, a large pressure against the circumference wall of the abutment portion results. However, as described in the foregoing, the rib of the upper container part is backed up by the rib of the lower container part.

In this embodiment, the thickness of the ribs 160a, 160b, 160c, 160d is 0.3 mm–2.5 mm. When the bonding material is injected to the abutment portions 154a, 154b, the rib is closely contacted to the back up ribs 161a, 161b. Therefore, the bonding material injected to the abutment portions 154a, 154b do not leak outside or into the inside of the container. At this time, the back-up ribs 161a, 161b receive a pressure from the molten resin material in the abutment portions 154a, 154b through the ribs 160b, 160d. The pressure is eased by the deformation of the ribs 160a, 160d. After the ribs 160a, 160d are contacted to the back-up ribs 161a, 161b, the ribs 160a, 160b and back-up ribs 161a, 161b cooperate with each other to bear against the pressure applied by the molten resin material to the abutment portions 154a, 154b. In this embodiment, the thickness of the backup ribs 161a, 16 1b are substantially the same as the base material of the container part 52.

A description will be provided as to another embodiment in which the sealing property between the gate of the metal mold and the molded product, that is, the container is described.

(Embodiment 8)

Figure 8:
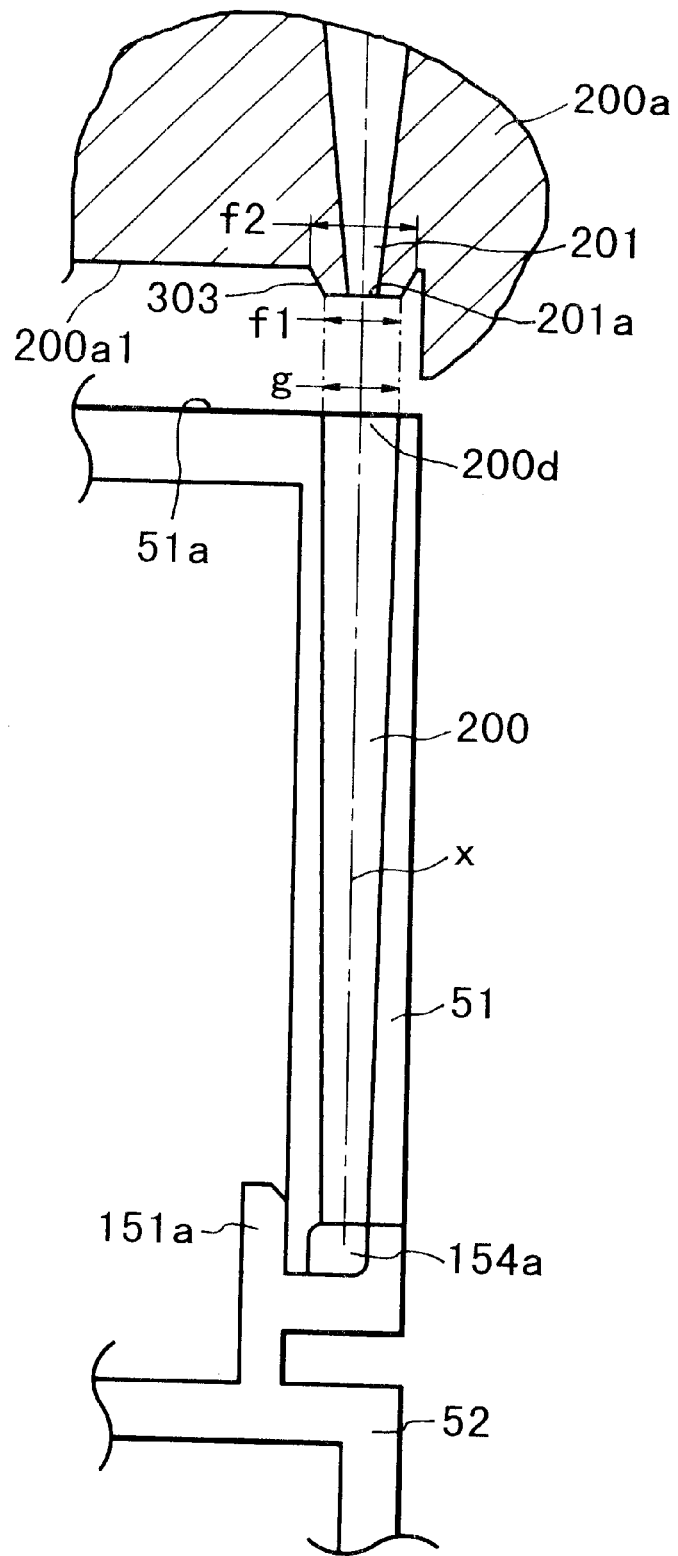
FIG. 8 is a sectional view taken along a line M—M of FIG. 3 illustrating a relation between a gate of a metal mold and a resin material flow path.

FIG. 8 and FIG. 9 illustrate Embodiment 8.

Impregnated, the leakage of the resin material is prevented at the connecting point between the injection path 200 and the gate.

The free end portion of the metal mold constituting the gate, which is an injection port of molten resin material, is flush with, or retracted inwardly of the injection path from an outer surface of the inlet of the resin material flow path of the container part.

As shown in FIG. 8, the gate 201 in the metal mold 200a and the injection path 200 of the container part 51 are concentric, that is, having a common center line x. Here, the diameter of the inlet port 200d of the injection path 200 is g. The metal mold 200a is provided with an inclined portion 303 (conical portion) which has a common center line x and extends downwardly from the lower surface 200a1 of the metal mold. The metal mold 200a is provided with a gate 201 and the injection port 201a is positioned at the top surface of the inclined portion 303. The lower surface 200a1 of the metal mold is parallel with the outer surface 51a of the container part 51.

Assuming that the diameter of the top portion of the inclined portion 303 is f1; the diameter of the bottom portion is f2; and the diameter of the inlet is g, these parameters satisfy f2>g>f1. In the embodiment shown in FIG. 8, the diameter f1 is very close to the diameter g.

In FIG. 8, the metal mold 200a is moved downwardly. Then, the top portion of the inclined portion 303 is press-contacted to the edge corner of the injection port 200d. Thus, the neighborhood of the inlet is deformed. By doing so, the connection point between the gate 201 and the injection path 200 is sealed.

Therefore, the molten resin material is prevented from leaking to the outside between the injection port 201a and the injection port 200d.

In FIG. 9, the container part 51 is provided with a beveling 300 which is closely contacted to the inclined portion 303, around the injection port 200d. This structure is also effective to prevent the leakage of the molten resin material at the connecting portion between the injection port 200d parts and the gate 201 of the metal mold 200a. Thus, the inclined portion 303 is closely contacted to the beveling portion 300. In the state in which the inclined portion 303 of the metal mold 200a is press contacted to the beveled 300, there are gaps 301a, 301b between the resin material part 51 and the lower surface 200a1 of the metal mold.

In the embodiment shown in FIG. 9, the inclined portion 303 enters the injection port, and the amount h of the entering is not more than 10 mm.

As described in the foregoing, the metal mold for forming the gate is press-contacted closely to the inlet of the injection path of the container part.

There is provided an inclined sealing portion for sealing between the metal mold and the container part. By doing so, the molten resin material is prevented from leaking through the inlet of the resin material flow path of the container part and through the gate of the metal mold.

As shown in FIG. 9, the metal mold 200a extends to devour the contact surface between the surface 152b1 of the flange and the rib 160a to be close to the side surface of the container part 51, 52.

In the foregoing, the inclined portion 303 is a part of the conical shape, but it is not inevitable that the shape is conical. For example, the structure around the gate may be of another pyramid shape.

(Embodiment 9)

Figure 10:
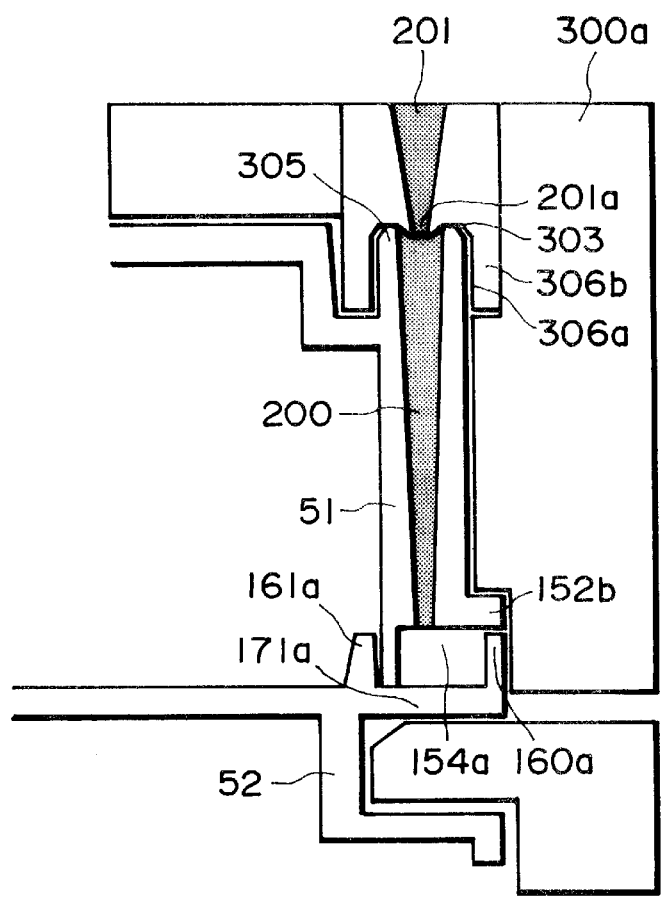
FIG. 10 is a longitudinal sectional view illustrating a structure around the inlet port of a resin material flow path according to another embodiment of the present invention.
Figure 11:
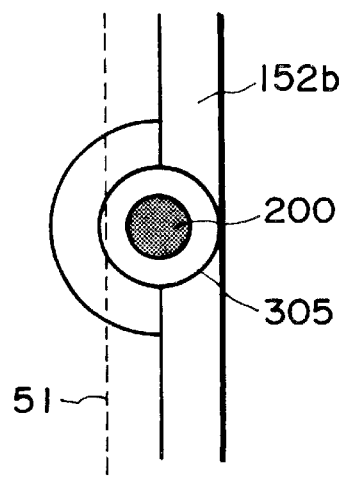
FIG. 11 is a top plan view of a container part with the metal mold omitted in FIG. 10.

FIG. 10 illustrates Embodiment 9.

The embodiment is different from the embodiment of FIG. 2 in the structure around the inlet port of the injection path 200. The general shape of the connecting portion is substantially the same as in FIG. 2.

The metal mold 300a for confining the container part 51 is provided with a downward cylindrical projected portion 306b. The center of the projected portion 306b is provided with a cylindrical recess 306a. An injection port 201a of the gate 201 is provided at the center of the inclined portion 303 formed at center of a bottom surface of the recess 306a.

Around the inlet port of the injection path 200, there is provided a cylindrical boss 305 engaged with the cylindrical recess 306a of the metal mold 300a with a gap therebetween. In the state in which the peripheral surface of the metal mold 300a of the inclined portion 303 is press-contacted to the periphery of the inlet of the injection path 200, the free end of the projected portion 306b of the metal mold is away from the container part 51. The metal mold 300a is sufficiently spaced from the container part 51 in a portion other than the portion where the periphery of the inlet of the injection path 200 is contacted to the inclined portion 303, except for the portion corresponding to the rib 160a and the flange 152b.

In this embodiment, a cylindrical recess having a larger diameter than the injection port of the gate is provided continuing from the gate outside the injection port of the gate of the metal mold. A cylindrical boss is provided around the inlet of the injection path of the container part and is engaged with the cylindrical boss with a gap therebetween and contacted to the bottom of the recess. By doing so, the resin material is injected to the abutment portion from the injection port of the injection path 200 formed by the container parts 51, 52 and extended to the abutment portions 154a, 154b. Even if a force is applied toward outer periphery of container part 51, the outer periphery of the boss 305 and the inner surface of the recess 306 are contacted closely. Therefore, the container part 51 is prevented from cracking and prevents the resultant leakage of a resin material to the outside of container part 51.

The gap between the recess 306a and the cylindrical portion 305 is preferably not more than 0.3 mm. The gap may be omitted.

As shown in FIG. 1, (a), the abutment portion 154a, 154b constituting the injection path is provided in the outer periphery part toner container 50 in above-described Embodiments 1–9. However, it may be provided in the container part. For example, the injection path may have a cross-shaped partition as seen in a top plan view of a connecting plane of the two container parts.

(Means for Confirming Flow of the Molten Resin Material)

The ribs 160a, 160c shown in FIG. 1(a) may be provided with cut-away portions 160e, 160f (FIG. 2). When the molten resin material comes to the abutment portions 154a, 154c, the cut-away portions 160e, 160f are filled with the resin material. Since the side surface of the rib 160 is covered with the metal mold 200a, the resin material does not leak. If the flow of the molten resin material is not sufficient, with the result of a short shot, the operator can discover this fact during the manufacturing because there is provided a recess in the cut-away portions portion 160e, 160f.

In the manufacturing, the products are checked by sampling inspection. By this, the ejection balance can be checked.

A description will be provided as to a connection of the frames of the process cartridge as the molded resin product, as another example of the molded resin products.

The preferred embodiments of the present invention will be described with reference to FIGS. 15–40.

In these embodiments, "longitudinal direction" means the direction which is perpendicular to the recording medium conveyance direction, and is parallel to the plane of the recording medium.

(Process Cartridge ad Main Assembly of Electrophotographic Image Forming Apparatus)

Figure 15:
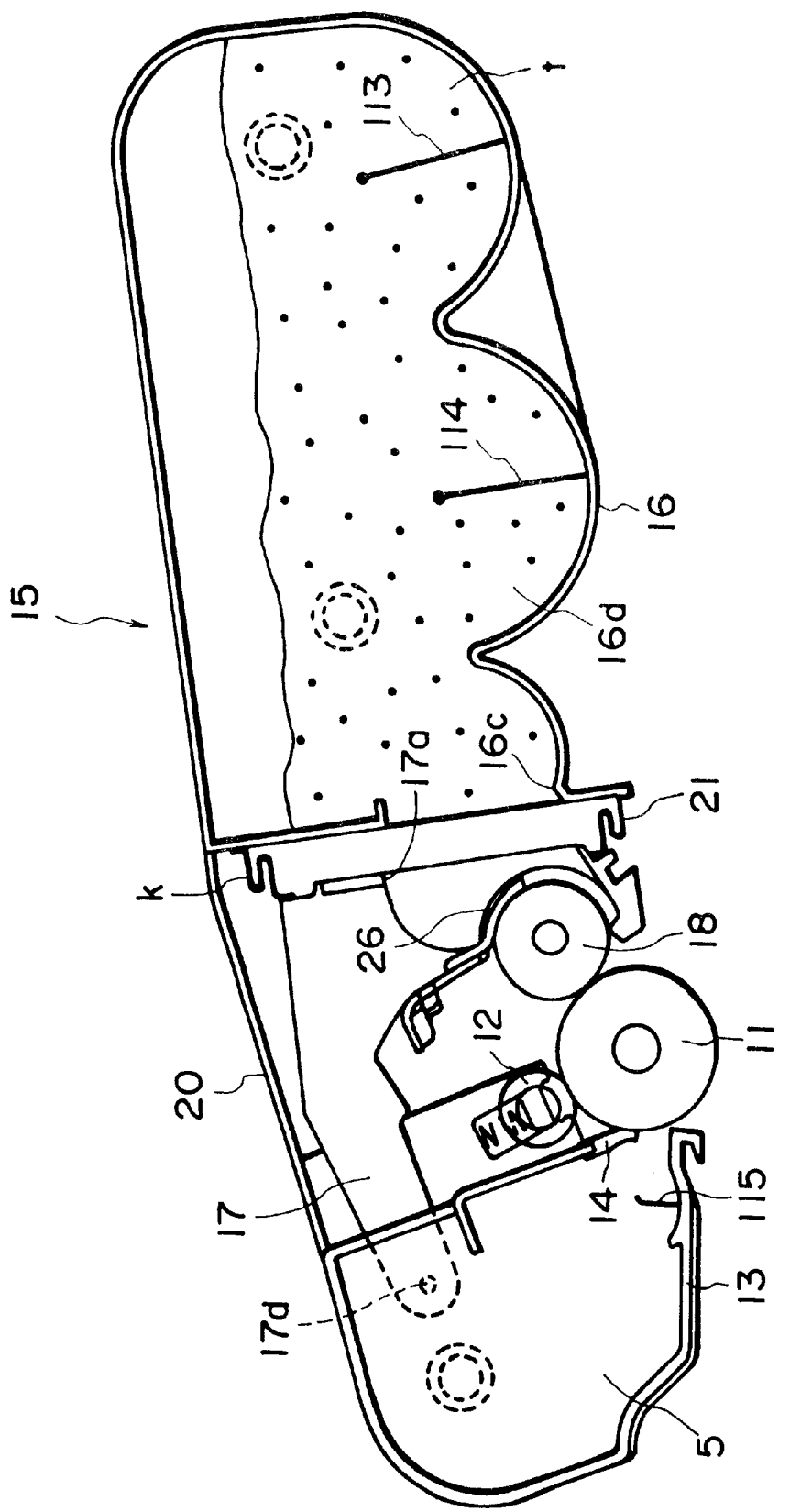
FIG. 15 is a sectional view of a process cartridge according to an embodiment of the present invention.
Figure 16:
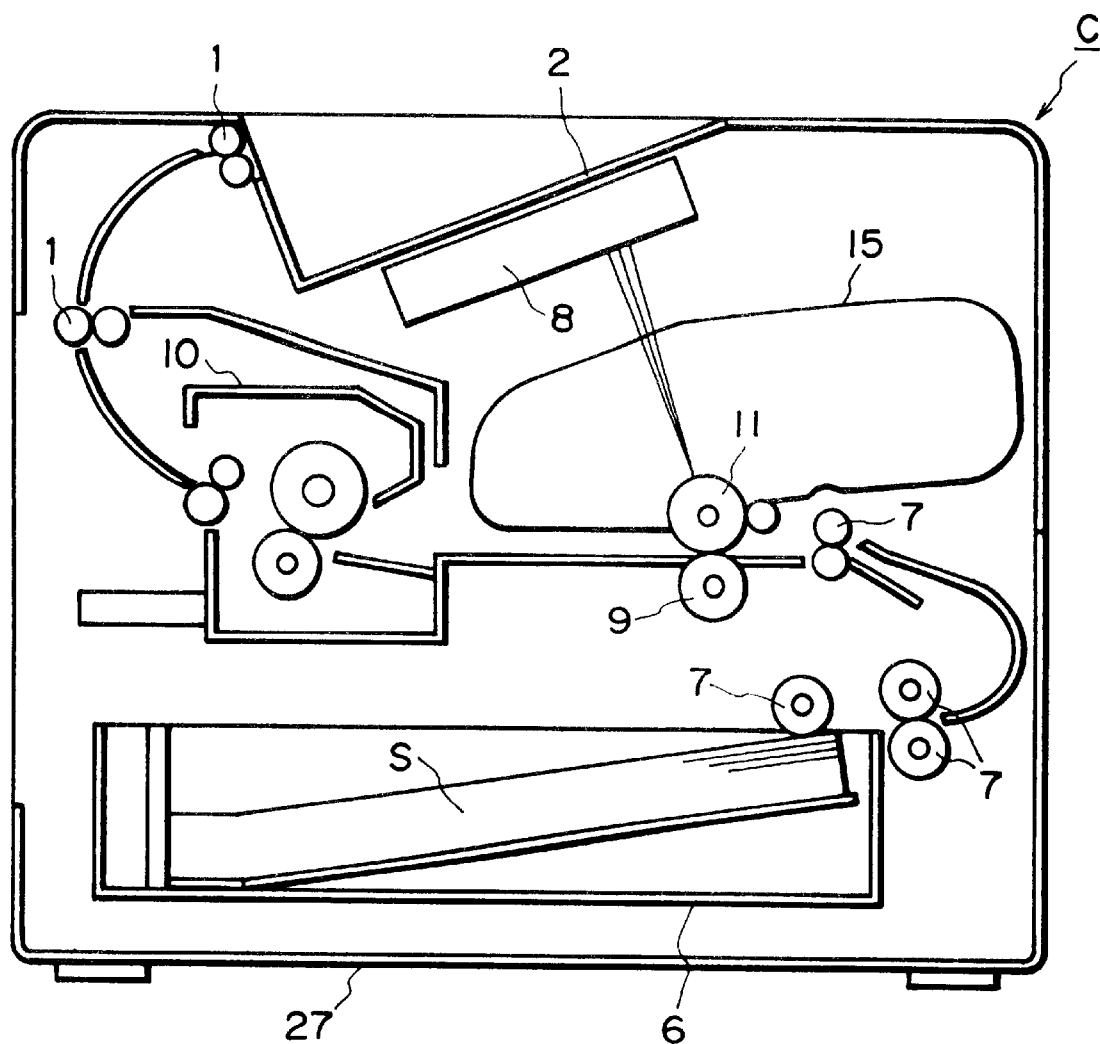
FIG. 16 is a schematic sectional view of the main assembly of an apparatus according to an embodiment of the present invention.

FIG. 15 is a sectional view of the essential portion of the process cartridge in accordance with the present invention. FIG. 16 is a sectional view of the essential portion of an image forming apparatus in accordance with the present invention. This process cartridge is provided with an electrophotographic photosensitive member, and a processing means which acts on the electrophotographic photosensitive member. As the processing means, there are, for example, a charging means for charging the peripheral surface of the electrophotographic photosensitive member, a developing means for developing an electrostatic latent image formed on the electrophotographic photosensitive member, and a cleaning means for removing the toner remaining on the peripheral surface of the electrophotographic photosensitive member.

As shown in FIG. 15, the process cartridge 15 in this embodiment comprises: an electrophotographic photosensitive member 11 (hereinafter, "electrophotographic photosensitive drum") in the form of a drum; a charge roller 12 as a charging member; a developing apparatus comprising a development roller 18 as a developing member, and a development blade 26; a cleaning blade 14 as a cleaning member; and a housing in which the preceding components are integrally disposed. The process cartridge 15 is removably installable in the main assembly 27 of an electrophotographic image forming apparatus (hereinafter, "apparatus main assembly").

The development roller 18 is a cylindrical member formed of metallic material such as aluminum, stainless steel, or the like, and contains a nonconducting magnetic roller (unillustrated).

Referring to FIG. 16, this process cartridge 15 is installed in an electrophotographic image forming apparatus C, for image formation.

A sheet S is fed out of a sheet cassette 6 in the bottom portion of the apparatus, by a conveyer roller 7. In synchronism with the conveyance of this sheet S, the photosensitive drum 11 is exposed by an exposing apparatus 8 according to the image data. As a result, an electrostatic latent image is formed on the photosensitive drum 11. Thereafter, the developer (hereinafter, "toner") stored in a toner storage container 16 is triboelectrically charged by a development blade 26, and this developer is borne on the peripheral surface of the development roller 18. Then, as development bias is applied to the development roller 18 as a developing member, the toner is supplied to the photosensitive drum 11. As a result, an image formed of toner (hereinafter, "toner image") is formed on the photosensitive drum 11, corresponding to the electrostatic latent image. Next, this toner image is transferred onto the sheet S, as a recording medium, by applying bias (voltage) to a transfer roller 9. Then, the sheet S is conveyed to a fixing apparatus 10, in which the toner image is fixed. Next, the sheet S is discharged by a discharge roller 1 into a delivery portion 2 provided on the top side of the apparatus. Meanwhile, the toner which remains on the photosensitive drum 11 after the image transfer is removed by a cleaning blade 14 as a cleaning member. The removed toner is moved rearward of a removed toner storage bin 5 by a removed toner conveying member 115. It should be noted here that prior to the above-described photosensitive drum exposure, the photosensitive drum 111 is charged by a charge roller as a charging member.

(Structure of Process Cartridge Frame)

Figure 17:
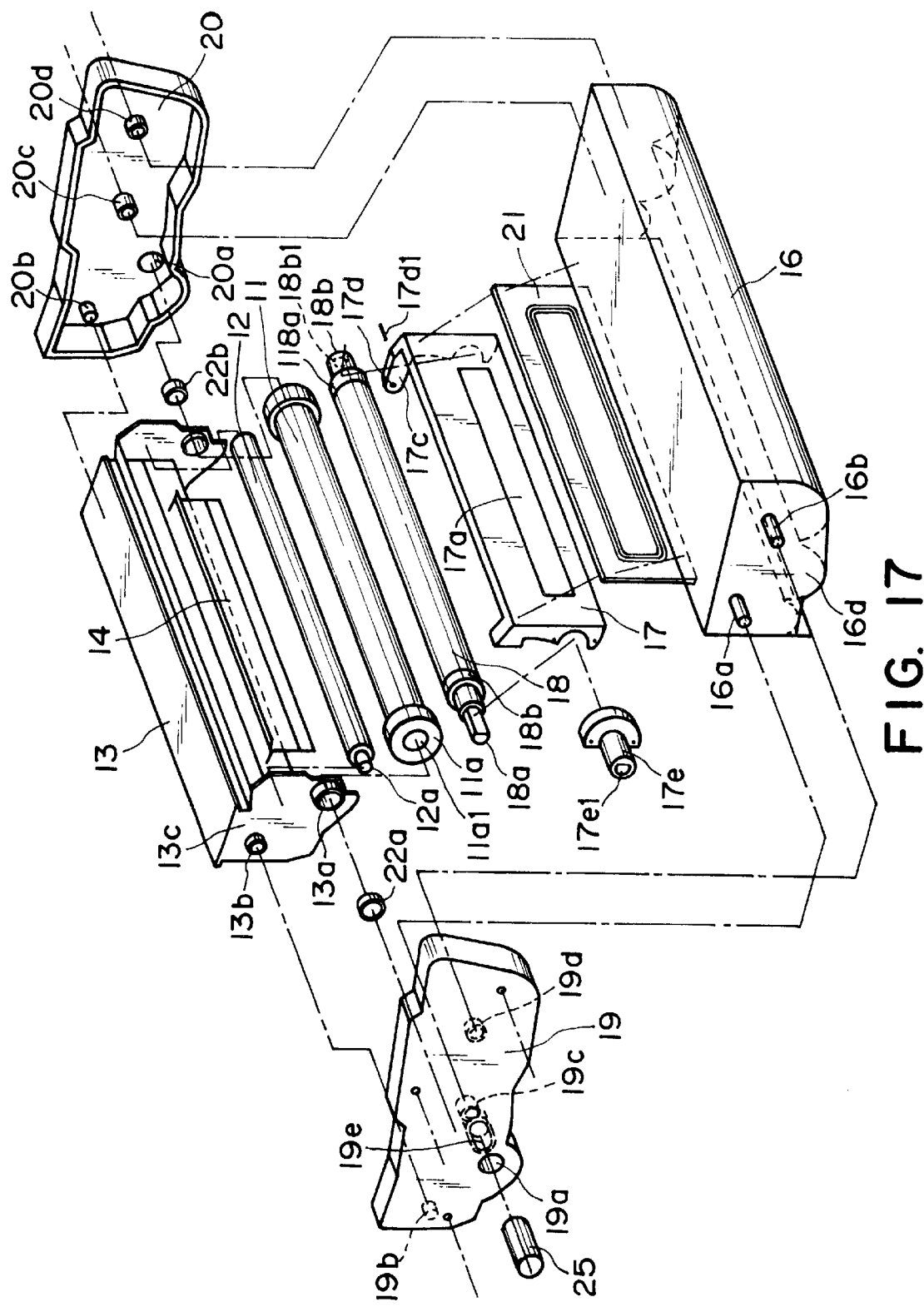
FIG. 17 is a schematic exploded perspective view of a frame for a process cartridge according to an embodiment of the present invention.
Figure 18:
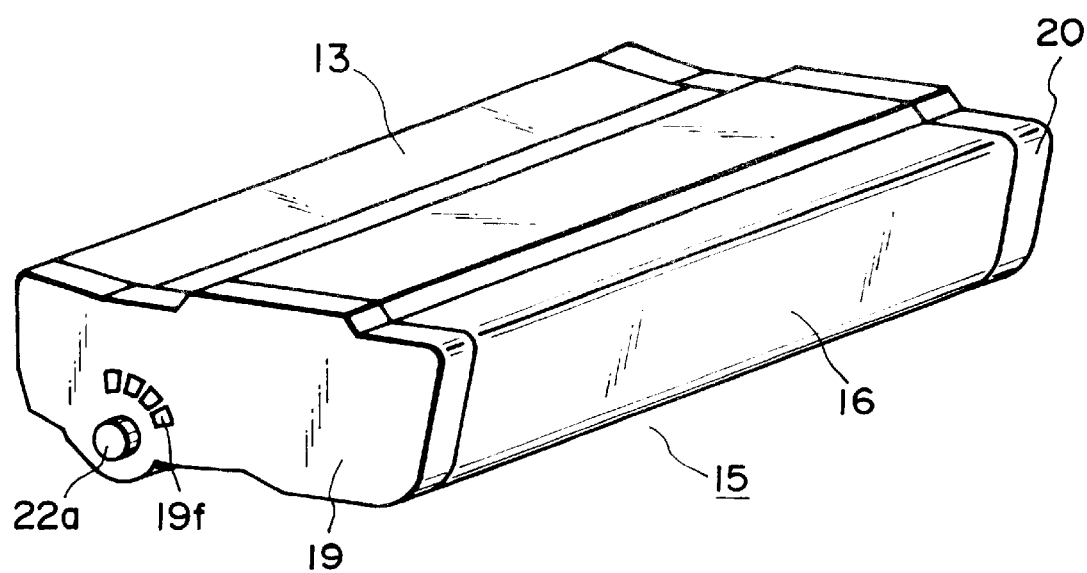
FIG. 18 is a schematic perspective view of a frame for a process cartridge according to an embodiment of the present invention.

FIGS. 17 and 18 are perspective views which show the structure of the process cartridge frame. FIG. 17 shows the process cartridge frame prior to its assembly, and FIG. 18 shows the process cartridge after its assembly.

The process cartridge 15 comprises three frame pieces: a cleaning means frame 13 as a drum frame which integrally supports the photosensitive drum 11, the charge roller 12, and the cleaning blade 14; a developing means frame 17 which integrally supports the development roller 18, and a development blade (unillustrated in FIG. 17, and designated by a reference numeral 26 in FIG. 18); and a toner storage frame 16 provided with a toner storage portion 16d in which toner is stored. Further, the process cartridge 15 in this embodiment comprises a pair of side covers 19 and 20 which are fixed to the longitudinal ends of the cleaning means frame 13 and toner storage frame 16 to hold the frames 13 and 16 together. The development means frame 17 is supported by the cleaning means frame 13.

To the cleaning means frame 13, the cleaning blade 14 is fixed with the use of small screws. The charge roller 12 is rotatably supported by the longitudinal ends, by bearings (unillustrated). Referring again to FIG. 15, in the cleaning means frame 13, the removed toner conveying member 115 for conveying the toner removed by the cleaning blade 14, into the removed toner bin 5, is rotatably disposed. In addition, in the cleaning means frame 13, the photosensitive drum 11 is rotatably supported, with the flange portions, that is, the longitudinal end portions, of the photosensitive drum 11, supported by a pair of bearings 22a and 22b. The toner storage frame 16 stores toner therein, and comprises a pair of toner conveying members 113 and 114 (FIG. 15) for conveying the stored toner toward the development roller 18. These toner conveying members may be provided with a toner stirring function.

The detailed description of the development means frame 17 will be given later.

The aforementioned side covers 19 and 20 are large enough to match in size the primary cross section (cross section at a plane perpendicular to the longitudinal direction of the photosensitive drum 11) of the process cartridge 15. They are positioned at the longitudinal ends of the process cartridge 15 (end portion in terms of the longitudinal direction of the photosensitive drum 11), one for one, covering, and being fixed to, both the cleaning means frame 13 and toner storage frame 16. With this arrangement, the side covers 19 and 20 integrally hold together the cleaning means frame 13 and toner storage frame 16. The holes 19a and 20a with which the side covers 19 and 20 are provided, respectively, are aligned with the rotational axis of the photosensitive drum 11 in the cleaning means frame 13. In the hole 13a of the side cover 19, that is, the side cover illustrated on the front side of the drawing, with which cleaning means frame 13 is provided, the bearing 22a is press fitted. Also, a shaft 25 is put through the hole 19a of the side cover 19, the bearing 22a, and the center hole 11a1 of the flange 11a, to rotatably support one of the longitudinal ends of the photosensitive drum 11 by the cleaning means frame 13. With this arrangement, the side cover 19 is precisely positioned by the bearing 22a, improving the accuracy in terms of the positional relationship of the side cover 19 with respect to the photosensitive drum 11. Further, a positioning member 19b, with which the side cover 19 is provided, and which is located so that its position becomes as far away as possible from the photosensitive drum 11 after the attachment of the side cover 19, is engaged with a positioning portion 13b with which the side wall 13c of the cleaning means frame 13 is provided. As a result, the position of the side cover 19, in terms of the rotational direction of the side cover 19 with respect to the center, or the axial line, of the photosensitive drum 11, is fixed. Then, the side cover 19 is fixed to the side wall 13c, that is, the wall at the longitudinal end, of the cleaning means frame 13. The toner storage frame 16 is provided with a pair of cylindrical positioning portions 16a and 16b, which project from one of the side walls 16d, that is, the wall at the longitudinal end, of the toner storage frame 16, in the longitudinal direction of the toner storage frame 16. These positioning portions 16a and 16b are fitted in the positioning portion 19c and 19d, that is, holes, respectively, with which the side cover 19 is provided, accurately positioning the toner storage frame 16 relative to the side cover 19. Then, the toner storage frame 16 and side cover 19 are fixed to each other. The other side cover 20 is similarly fixed to the toner storage frame 16 and cleaning means frame 13, being accurately positioned relative to each other. The developing means frame 17 is positioned using a method which will be described later. The bearings 22 (22a and 22b) double as members for positioning the process cartridge 15 relative to the apparatus main assembly 27.

(Joining of Toner Storage Frame and Developing Means Frame)

In order to supply toner from the toner storage frame 16 to development roller 18, the toner storage frame 16 and development means frame 17 are provided with opening 16c (FIG. 15) and 17a. Further, the development means frame 17 and toner storage frame 16 are joined with each other in such a manner that their internal spaces become connected to each other through the openings 17a and 16c, with a sealing means 21 as a flexible sealing means disposed between the two frames. As described above, the position of the toner storage frame 16 is fixed relative to the side covers 19 and 20, whereas the position of the development means frame 17 is fixed relative to the cleaning means frame 13. Therefore, the frames 16 and 17 are attached to each other in a manner to allow them to pivot relative to each other to absorb their dimensional errors of the two frames. When installed into the apparatus main assembly 17, the position of the process cartridge 15 is fixed relative to the cartridge installation space of the apparatus main assembly 27, by the cleaning means frame 13 which supports the photosensitive drum 11. The toner storage frame 16 is substantially different in weight between the beginning of its usage when it contains toner, and the end of its usage when it is empty. Therefore, flexible material is used as the material for the sealing member 21. With this setup, even if a deformation occurs to the toner storage frame 16, or one or both of the side covers 19 and 20, the deformation can be absorbed.

Figure 32:
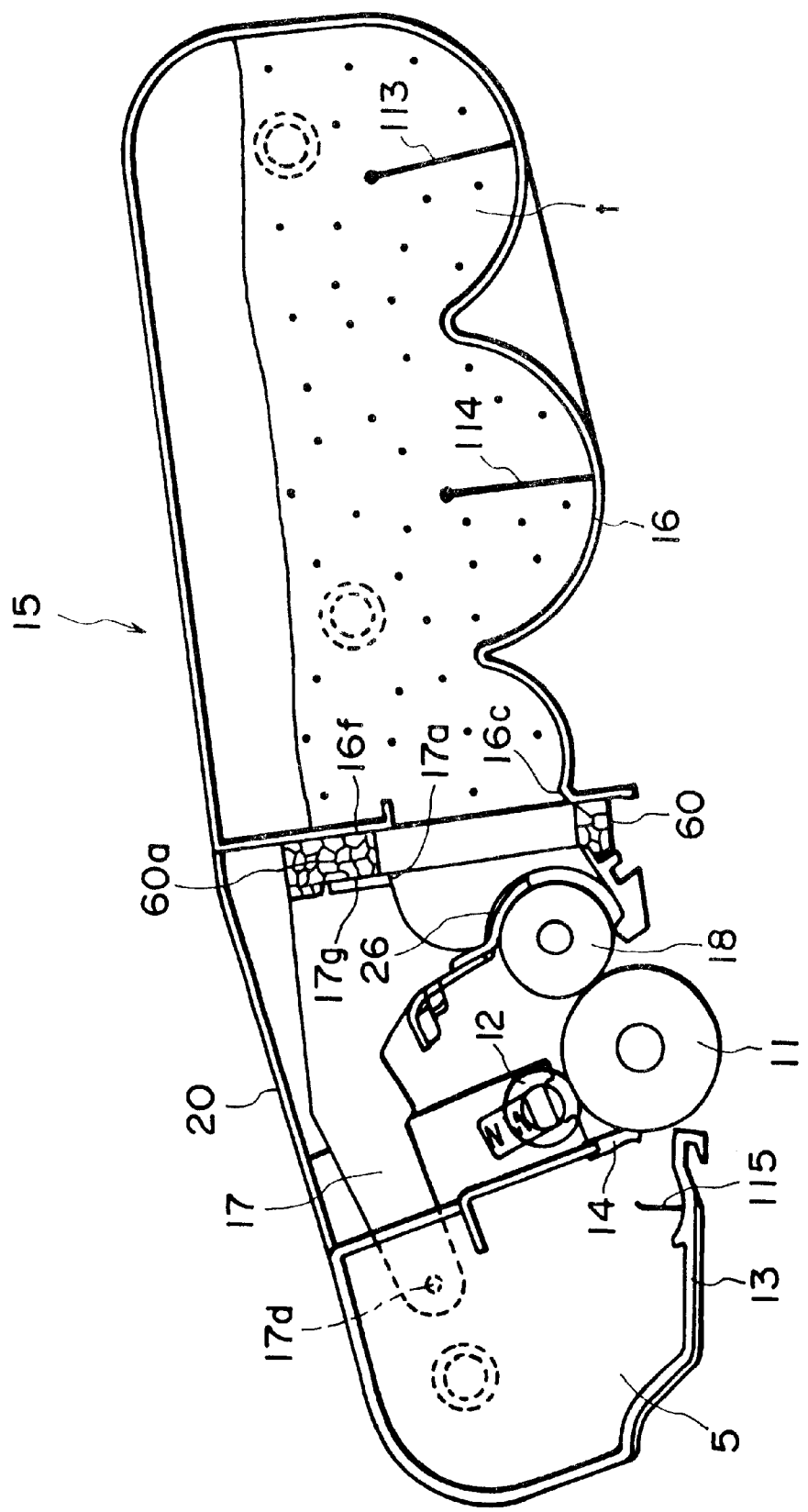
FIG. 32 is a longitudinal sectional view of a process cartridge according to a further embodiment of the present invention.

FIG. 32 is a vertical sectional view of a process cartridge equipped with a flexible sealing member different from the above-described sealing member 21.

A sealing member 60 as a flexible sealing means is formed of elastic material such as foamed synthetic resin (for example, foamed urethane), rubber with a low degree of hardness, silicon rubber, or the like. This sealing member 60 is in the form of a piece of a plate with a large opening 60a. After the installation of the sealing member 60, the opening 60a aligns with both the openings 17a and 16c. The size of the opening 60a is approximately the same as those of the openings 17a and 16c. The sealing member 60 is pasted to either the surface of the development means frame 17 or the surface of the toner storage frame 16, which face each other, or both of the surfaces. The sealing member 60 is not pasted to the portion of the toner storage frame 16, corresponding to the area through which the toner seal 24 is passed when the toner seal 24 is pulled out.

The thickness of the sealing member 60 is greater than the distance, after the completion of the assembly of the process cartridge 15, between the surface 17g of the developing means frame 17 and the surface 16f of the toner storage frame 16.

Therefore, after the completion of the assembly of the process cartridge 15, the sealing member 60 is compressed by the mutually facing surfaces 17g and 16f as shown in FIG. 32. The reactive force generated by the compression of the sealing member 60 acts as the pressure which keeps the spacer rollers 18b of the development roller 18 pressed upon the photosensitive drum 11. Therefore, the reactive force which the sealing member 60 generates is desired to be as small as possible.

With the provision of the above-described structure, the load generated by the weight of the toner is applied to the side covers 19 and 20, instead of being applied to the development roller supported by the development means frame 17. Thus, the photosensitive drum 11 is not subjected to the load generated by the weight of the toner, and therefore, a stable image can be formed, even if the amount of the toner in the toner storage frame 16 increases.

(Structure of Developing Means Frame)

Figure 19:
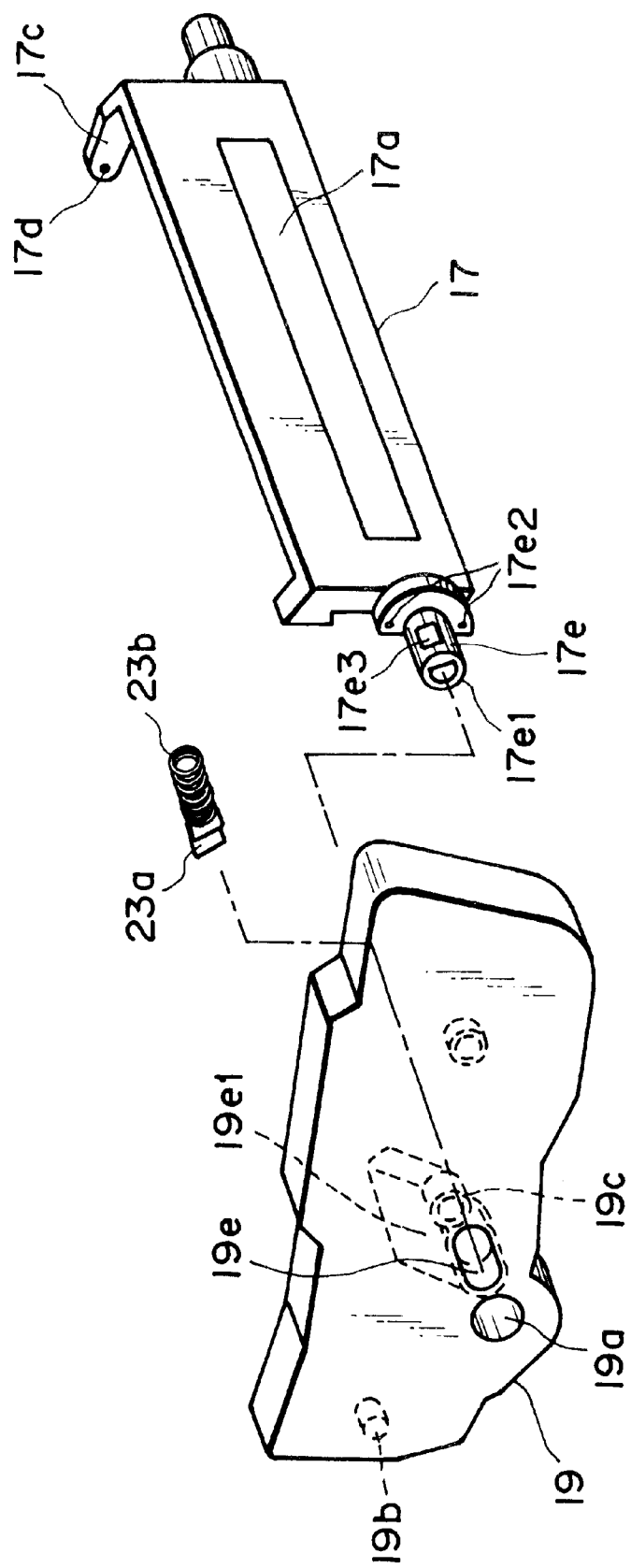
FIG. 19 is a partial perspective view of a process cartridge according to an embodiment of the present invention.
Figure 20:
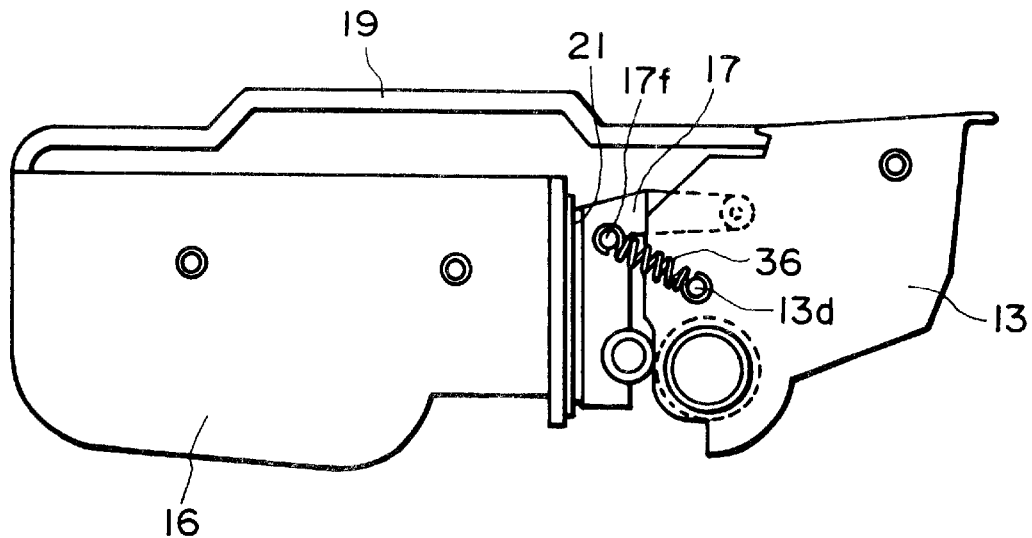
FIG. 20 is a skeleton side view of a part of a process cartridge according to an embodiment of the present invention.
Figure 21:
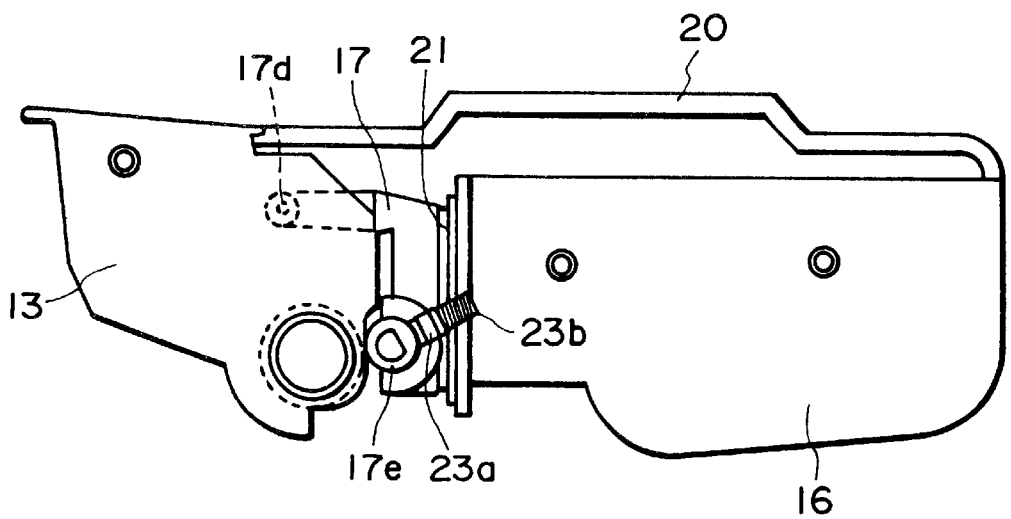
FIG. 21 is a schematic side view of a part of a process cartridge according to an embodiment of the present invention.

Referring to FIGS. 17, 19, 20 and 21, the structure of the developing means frame will be described. FIG. 17 represents the state of the developing means frame prior to assembly. FIGS. 19, 20 and 21 are drawings for describing the structure of the developing means frame involved in the pressure application to the developing means frame.

To the development means frame 17, the development roller 18, which contains the magnetic roller 118a, the development blade 26 (FIG. 15), and a magnetic seal (unillustrated) is attached. A magnetic roller 18a is put through the longitudinal center hole of the development roller 18, and is nonrotationally supported by a developing means frame 17, at each of the longitudinal ends. There is maintained a gap between the development roller 18 and magnetic roller 18a. The development roller 18 is rotationally supported by the developing means frame 17, at each of the longitudinal ends. For the power supply to the development roller 18, electrical contacts are provided within the development roller 18. Further, both of the longitudinal end portions of the development roller 18 are fitted with a ring 18b (spacer rig) (FIG. 17) for maintaining a predetermined distance between the peripheral surfaces of the photosensitive drum 11 and the development roller 18.

The developing means frame 17 is provided with an arm portion 17c, which is on the driven side, that is, one of the longitudinal ends of the development roller 18, from which the development roller 18 is driven. The end portion of this arm portion 17c is provided with a hole 17d, the center of which functions as the pivotal center. The developing means frame 17 is pivotally supported by a cleaning means frame 13 in such a manner that the central axes of the photosensitive drum 11 and development roller 18 remain parallel to each other. More specifically, a pin 17d1 is fitted in the hole 17d of the development means frame 17 and the hole (unillustrated) of the cleaning means frame 13, so that the development means frame 17 becomes-pivotable about the center of the hole 17d. In addition, as described above, the cleaning means frame 13 and toner storage frame 16 are immovably fixed to each other. Thus, the development means frame 17 is movable relative to the toner storage frame 16. Next, referring to FIG. 30, the hooks of a tensional coil spring 36 are fitted around the spring anchoring projections 13d and 17f of the cleaning means frame 13 and development means frame 17, respectively, to provide such force that keeps the development roller 18 pressed toward the photosensitive drum 11, by their longitudinal ends. It should be noted here that in terms of the longitudinal direction of the photosensitive drum 11, the hole 17d is located on the driven side of the photosensitive drum 11. The drive side is the side by which the driving force is received when the process cartridge 15 is in the apparatus main assembly 27. The non-driven side is the side opposite to the driven side in terms of the longitudinal direction of the electrophotographic photosensitive drum 11.

Furthermore, the non-driven side of the developing means frame 17 is provided with a projecting member 17e, which is fixed to the development means frame 17 with the use of screws 17e2 and projects in the direction of the rotational axis of the development roller 18. This projecting member 17e is under the pressure which keeps it pressed toward the photosensitive drum 11 while keeping the rotational axes of the photosensitive drum 11 and development roller 18 parallel to each other. The longitudinal ends of the cleaning means frame 13 and toner storage frame 16, on the non-driven side, are covered with a side cover 19 which is attached thereto with the use of screws 100.

The longitudinal ends of the cleaning means frame 13 and toner storage 16, on the other side, or the driven side, are covered with a side cover 20, which is attached thereto with the use of screws 100 (FIG. 17).

Conversely, the cleaning means frame 13 and toner storage frame 16 are fixed to the side covers 19 and 20. Further, the development means frame 17 is movable relative to the cleaning means frame 13 and toner storage frame 16, with one of the longitudinal ends of the development means frame 17 being supported by the cleaning means frame 13 and the other being supported by the side cover 19.

(Development Roller Pressing System)

The end 17e1 of the projecting member 17e is inserted in a groove 19e, as a guiding portion, with which the side cover 19 is provided. The groove 19e extends toward the rotational axis of the photosensitive drum 11, allowing the projecting member 17e to move toward the rotational axis of the photosensitive drum 11. In the groove 19e, a compression coil spring 23b as an elastic member, and a slide piece 23a as a pressing member, slidable in the longitudinal direction of the groove 19e, are disposed so that pressure is applied to the projecting member 17e through the slide piece 23a.

Further, this groove 19e functions as a positioning member for regulating the direction in which the development roller 18 (developing means frame 17) is allowed to move. In other words, the development roller 18 is allowed to be displaced only in the direction parallel to the longitudinal direction of this groove 19e, since the moving direction of the projecting member 17e is regulated by the internal surface of the groove 19e.

As the process cartridge 15 receives a driving force from the apparatus main assembly 27, the force is applied to the gears 105b and 107b (FIG. 23), which are attached to the longitudinal ends of the photosensitive drum 11 and development roller 18, respectively, in the direction parallel to the central axis of the hole 17e to move the gears 105b and 107b so that they engage with each other (it does not occur that the force is applied in a direction to separate the gears 105b and 107b from each other). In other words, the gears 105b and 107b are disposed so that the extension of the transverse line of action between the gears 105b and 107b runs adjacent to the hole 17d. Further, the center line of the hole 17d and the rotational axis of the photosensitive drum 11 are disposed on the same side with respect to the transverse line of action. Furthermore, the development roller 18 is under the force from the aforementioned compression coil spring 23b, being kept pressed toward the photosensitive drum 11.

The above description of this embodiment may be summarized as follows.

The process cartridge 15, removably installable in the main assembly 27 of an image forming apparatus, comprises: the electrophotographic photosensitive drum 11; the development roller 18 as a developing member for developing the electrostatic latent image formed on the electrophotographic photosensitive drum 11; the cleaning means frame 13 as a frame for supporting the electrophotographic photosensitive drum 11; and the developing means frames 17 for supporting the development roller 18. The developing means frame 17 is provided with the projecting member 17e, which is attached to one of the longitudinal ends of the development roller 18, and projects in the longitudinal direction of the development roller 18. The projecting member 17e is fitted in the groove 19e as a guiding portion, being enabled to move in the groove 19e toward, or away from, the cleaning means frame 13. The developing means frame 17 is pivotally joined with the cleaning means frame 13, at the other longitudinal end of the development roller 18. The development roller 18 is supported by the development means frame 17, being enabled to move in the direction perpendicular to its rotational axis. The process cartridge 15 further comprises the compression coil spring 23b as an elastic member for generating such pressure that keeps the projecting member 17e pressed toward the cleaning means frame 13 while allowing the projecting member 17e to move in the groove 19e in the direction perpendicular to the central axis of the projecting member 17e.

The groove 19e as a guiding member is provided with a recess 19e1, in which the end 17e1 of the projecting member 17e is fitted. Within the recess 19e1, the coil spring 23b, as an elastic member, is fitted in such a manner that the projecting member 17e is kept pressed toward the cleaning means frame 13 by the elastic force of the coil spring 23b. With this arrangement, the development roller 18 is pressed upon the electrophotographic photosensitive drum 11 with the interposition of a pair of spacer rollers 18b between the peripheral surfaces of the development roller 18 and the electrophotographic photosensitive drum 11. The spacer rollers are fitted around the longitudinal ends of the development roller 18, one for one.

To the end of the coil spring 23b, the slide piece 23a as a pressing member is attached. The slide piece 23a makes contact with the flat portion 17e3 of the projecting member 17e, pressing the projecting member 17e due to the elastic force of the coil spring 23b. The coil spring 23b is fitted in the groove 19e, being allowed to slide within the groove 19e.

The projecting member 17e is disposed so that its axial line approximately aligns with the rotational axis of the development roller 18.

The development means frame 17 is rotationally supported by the cleaning means frame 13, by the other longitudinal end of the development roller 18, at a position away from the rotational axis of the development roller 18 rotationally supported also by the developing means frame 17, with the pin 17d1 fitted through the developing means frame 17 and cleaning means frame 18.

Further, at the other longitudinal end of the development roller 18, the tension spring 36 is stretched between the development means frame 17 and cleaning means frame 13, with one end of the tension spring 36 attached to the development means frame 17 and the other end attached to the cleaning means frame 13.

The groove 19e is provided in the inwardly facing surface of the side cover 19, as a first side cover, attached to the longitudinal ends of the cleaning means frame 13 and development means frame 17, at each of their longitudinal ends.

It is necessary that the toner storage frame 16 and development means frame 17 are joined so that toner does not leak from the joint between the opening 16c of the toner storage frame 16 and the opening 17a of the development means frame 17. On the other hand, the development means frame 17 and toner storage frame 16 need to be pivotable relative to each other. Therefore, in this embodiment, a sealing member 21, the size of which matches the size of the moving ranges of both opening portions, is placed between the opening portion of the toner storage frame 16 and the opening portion of the development means frame 17, to prevent toner leakage. This sealing member 21 is pinched between the two opening portions, with the opening of the sealing member 21 aligning with the openings 16c and 17a. The sealing member 21 is desired to be shaped not to generate such force that impedes the movement of the development means frame 17; more specifically, it is provided with at least one fold, or it is in the form of a bellows. It is possible that the surface surrounding the opening 16c or 17a is provided with a groove which surrounds the opening, and in which an O-ring is fitted to seal the joint between the toner storage frame 16 and development means frame 17 while allowing the gap between the two frames to be variable.

In this embodiment, the sealing member 21 is formed of elastomer, and is provided with two folds (unillustrated), to reduce the overall resiliency of the sealing member 21. However, the material for the sealing member 21 does not need to be limited to the elastomer. It may be any material superior in flexibility, for example, foamed urethane, rubber with a low degree of hardness, silicone rubber, or the like. If the material used for the sealing member 21 is small in reactive force, the same effects at those obtained with the provision of the folds, that is,the shaping of the sealing member 21 in the form of a bellows, can be obtained without such provision or shaping.

(Driving System)

Figure 23:
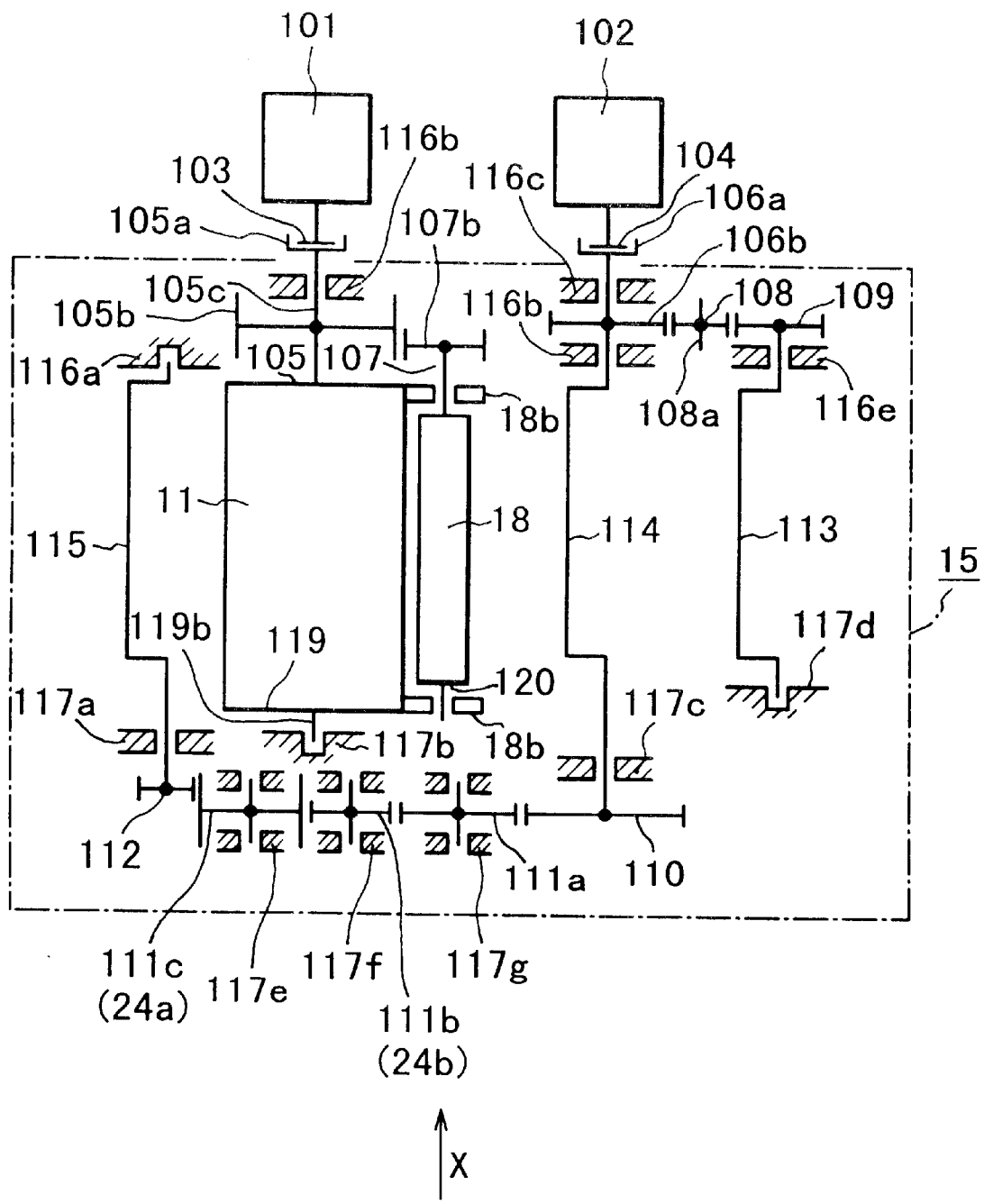
FIG. 23 is an illustration of a driving system fourth process cartridge according to an embodiment of the present invention.

FIG. 23 is a diagram which depicts the drive train in this embodiment.

An arrow mark X indicates the direction in which the process cartridge 15 is installed into the apparatus main assembly 27.

The driving force sources 101 and 102 (for example, an electric motor) provided in the apparatus main assembly 27 are connected to couplings 103 and 104. As the process cartridge 15 is installed into the apparatus main assembly 27, the couplings 103 and 104 are engaged with couplings 105a and 16a, respectively, with which the process cartridge 15 is provided. The couplings 105a and 106a rotate with the input gears 105b and 106b, respectively. The coupling 106a is supported by a bearing 116c. The coupling 105a is integral with the gear 105b, or is an integral part of a gear flange 105. The gear flange 105 is supported by a bearing 116b.

Next, the driving system of the process cartridge will be described.

To one of the longitudinal ends of the photosensitive drum 11, the gear flange 105 is fixed. To one of the longitudinal ends of the development roller 18, a gear flange 107 is fixed. The gear flanges 105 is integrally formed with the gear 105b. Similarly, the gear flange 107 is integrally formed with the gear 107b. To the other longitudinal end of the photosensitive drum 11, a bearing flange 119 is fixed, and to the other longitudinal end of the development roller 18, a bearing flange 120 is fixed. The photosensitive drum 11 and development roller 18 belong to their own units. The gear 105b meshes with the sleeve gear 107b.

As the coupling 103 is rotated by the driving force from the driving force source 101 provided in the apparatus main assembly 27, the photosensitive drum 11 and development roller 18 are rotated. The photosensitive drum unit is rotationally supported by the bearings 116b and 117b. The development roller 18 is rotationally supported by the development means frame 17. Further, the development roller 18 is rotated while maintaining an optimal gap, which is provided by the aforementioned spacer rollers 18b, from the peripheral surface of the photosensitive drum 11. The bearings 116b and 117b are the surfaces themselves of the holes with which the cleaning means frame 13 is provided, or the bearings 22 (FIG. 19) fixed to the cleaning means frame 13. In the bearings 116b and 117b, the journal portions 105c and 119b of the flanges 105 and 109, respectively, are fitted.

Next, the driving of toner conveying members 113 and 114 will be described.

To the toner conveying member 114, a driving force is transmitted from the input gear 106b. The toner conveying member 114 is directly connected to the shaft of the gear 106b. The driving force is transmitted to the toner conveying member 113 through an idler gear 108 meshed with the input gear 106b, and a toner conveyance gear 109 meshed with the idler gear 108. The idler gear 108 is rotationally supported by the shaft 108a. Thus, as the input gear 106b rotates, the toner conveyance gear members 114 and 113 follow the rotation of the input gear 106b because their journal portions are rotationally supported by the bearings 116b and 116e, and the bearings 117c and 117d, respectively.

Further, in a removed toner bin 5, with which the cleaning means frame 13 is provided to collect the removed toner, a feather-shaped toner conveying member 115 for conveying the toner removed from the photosensitive drum 11 is disposed. This removed toner conveying member 115 is rotationally supported by the cleaning means frame 13, with the use of bearings 116a and 117a. To one of the longitudinal ends of the toner conveying member 115, an input gear 112 fixed. This gear 112 is indirectly meshed with an output gear 110, through idler gears 111c, 111b and 111a.

To the other longitudinal end (non-driven side) of the toner conveying member 114, the output gear 110 is fixed. The idler gears 11a, 11b and 11c are rotationally supported by the bearing portions 117e, 117f, 117g, by their shaft portions. Thus, as the toner conveying member 114 rotates, the removed toner conveying member 115 follows the rotation of the toner conveying member 114. In other words, the driving force received by the gear 106b is transmitted to the other longitudinal end of the toner conveying member through the toner conveying member 114. Then, it is transmitted to the conveying member 115 through the gears 111a, 111b, 111c and 112, at the other longitudinal end (on the non-driven side). The above positional arrangement of the components of the driving system assures that the driving force is efficiently delivered to both the driven and non-driven sides through the driving system.

As described above, the transmission of the driving force throughout the process cartridge 15 is separately shared by a driving system for transmitting the driving force to the photosensitive drum 11 and development roller 18, and another driving system for transmitting the driving force to the toner conveying members and removed toner conveying members, to which the driving force is delivered from the driving force source 101 and 102, respectively.

In addition to the above described structural arrangement, according to which the driving force is transmitted from the output portion of the toner conveying member 114 to the removed toner conveying member 115, the following arrangements are conceivable: (1) the removed toner conveying member 115 is driven by transmitting the driving force by way of the toner conveying member 113 with the provision of the similar structure; (2) the removed toner conveying member 115 is driven by transmitting the driving force by way of any of the input gears 106b and 109, and the idler gear 108, through the gear trains; or (3) the removed toner conveying member 115 is driven by an idler gear attached to the end of the shaft of the idler gear 108 extended to the non-driven side.

The above described embodiment may be summarized as follows.

The process cartridge 15 removably installable in the main assembly 27 of an electrophotographic image forming apparatus comprises: the electrophotographic photosensitive drum 11; the development roller 18 as a developing member for developing the electrostatic latent image formed on the electrophotographic photosensitive drum 11; the toner storage portion 16d as a developer storage portion for storing the developer to be used for developing the electrostatic latent image; the toner conveying members 113 and 114 as a developer conveying member for conveying the toner to be stored in the toner storage portion 16d, toward where the development roller 18 is disposed; a combination of the coupling 105a and input gear 105b as the first driving force transmitting means for receiving the driving force for rotating the electrophotographic photosensitive drum 11 from the apparatus main assembly 27 and transmitting the received driving force to the electrophotographic photosensitive drum 11, as the process cartridge 15 is installed into the electrophotographic photosensitive member main assembly 27; and a combination of the coupling 106a and input gear 106b as the second driving force transmitting means for receiving the driving force for driving the toner conveying member from the apparatus main assembly 27 and transmitting the received driving force to the toner conveying member, as the process cartridge 15 is installed into the electrophotographic image forming apparatus main assembly 27, wherein the driving system for driving the coupling 106a and gear 106b, and the driving system for driving the coupling 105a and gear 106b, are independent from each other.

The position at which the coupling 105a and coupling 106a receive the driving force from the apparatus main assembly 27 is the leading end of the process cartridge in terms of the direction in which the process cartridge 15 is installed into the apparatus main assembly 27, provided that the process cartridge 15 is installed into the apparatus main assembly 27 in the direction parallel to the longitudinal direction of the electrophotographic photosensitive drum 11.

Further, the process cartridge 15 comprises the cleaning blade 114 as a cleaning member for removing the developer remaining on the electrophotographic photosensitive drum 11, and the removed toner conveying member 115 as a removed developer conveying member for conveying the developer removed from the electrophotographic photosensitive drum 11 by the cleaning blade 114. The removed toner conveying member 115 is rotated by the driving force which the coupling 106a received from the apparatus main assembly 27.

The driving force which the coupling 106a received from the apparatus main assembly 27 is transmitted to the other longitudinal end of the toner conveying member 114 through the toner conveying member 114, and then, is transmitted to the removed toner conveying member 115, at the other longitudinal end of the toner conveying member 114.

At the other longitudinal end of the toner conveying member 114, the plurality of gears 111a, 111b, 111c and 112 are disposed, and the driving force which was transmitted to this side through the toner conveying member 114 is transmitted to the removed toner conveying member 115 through the plurality of gears 111a, 111b, 111c and 112.

The driving force which the coupling 105a received from the apparatus main assembly 27 is transmitted to the development roller 18 through the gear 107b. By this driving force, the development roller 18 is rotationally driven. Further, as the process cartridge 15 is installed into the apparatus main assembly 27, the coupling 106a as the aforementioned cartridge coupling engages with the coupling 104 as the main assembly coupling of the apparatus main assembly 27 to receive the driving force, whereas the coupling 105a as the aforementioned cartridge coupling engages the coupling 103 as the main assembly coupling of the apparatus main assembly 27 to receive the driving force.

The apparatus main assembly 27 is provided with the coupling 103 as the first driving force transmitting member of the main assembly, and the coupling 104 as the second driving force transmitting member of the main assembly.

With the provision of the above structural arrangement, it does not occur that the rotational irregularity and vibration of the driving system involved in the conveyance of the toner for development, and the removed toner, are directly transmitted to the driving system for rotationally driving the photosensitive drum and development roller directly involved in image formation. Therefore, it is possible to prevent the formation of an image which suffers from irregularities traceable to pitch irregularity or vibration, or blurring.

In particular, as the capacity of the toner storage container is increased (for example, to a capacity equivalent to the amount of toner sufficient to produce approximately 30000 A4 type standard copies), the amount of the load applied to the system for driving the toner conveying member increases. Further, there is a possibility that as the number of the toner conveying members is increased to three, four, and so on, it becomes easier for irregularities, traceable to driving force transmission, to occur. Thus, a driving system structure such as the above-described one in which the driving system is divided into a plurality of sub-systems is advantageous.

Further, with the increase in the capacity of the toner storage container, the load which is applied to the removed toner conveying member also increases. Also, a driving system divided into a plurality of sub-systems becomes advantageous as the cleaning means frame becomes virtually filled up with the removed toner.

Furthermore, the driving force input system for driving the removed toner conveying member and the driving force input system for driving the developmental toner, are integrated into a single unit, simplifying the structure of the coupling for connecting the apparatus main assembly and the process cartridge, which in turn makes it easier to arrange the gears and the like, providing an advantage from the viewpoint of saving space.

Conventionally, the toner conveying system and toner stirring system are driven by directly meshing the gear of the development roller with the gears of the toner conveying system and toner stirring system. However, in this embodiment, such direct engagement between the gears of the former and latter does not occur. Therefore, even if the load which is applied to the toner conveying system and toner stirring system increases due to the increase in the toner storage container capacity, it is unnecessary to increase the strength of the gears 105b and 107b for driving the development roller 18. Therefore, it is possible to use low module gears for driving force transmission. With this arrangement, it does not occur that an image suffering from the aforementioned irregularities is produced due to the irregularity in the pitch which occurs as the drum gear 105b and sleeve gear 107b mesh with each other.

Further, in this embodiment the cleaning means frame and toner storage frame are integrally fixed to each other by the side covers. Therefore, the removed toner conveying member and development toner conveying member can be precisely connected and driven.

Further, only the developing means frame which supports the developing member such as the development roller is pivotally supported so that it is enabled to pivot following the photosensitive drum. Therefore, it is easy to connect the drum gear 105b and sleeve gear 107b to each other by driving them.

The force for rotationally driving the removed toner conveying member 115 is transmitted from the driving system for driving the toner conveying member. Therefore, even when the photosensitive drum is rotated at a high velocity, it is easy to continue to convey the removed toner at the conventional rotational velocity.

(Structure of Air Passage for Cooling)

Figure 22:
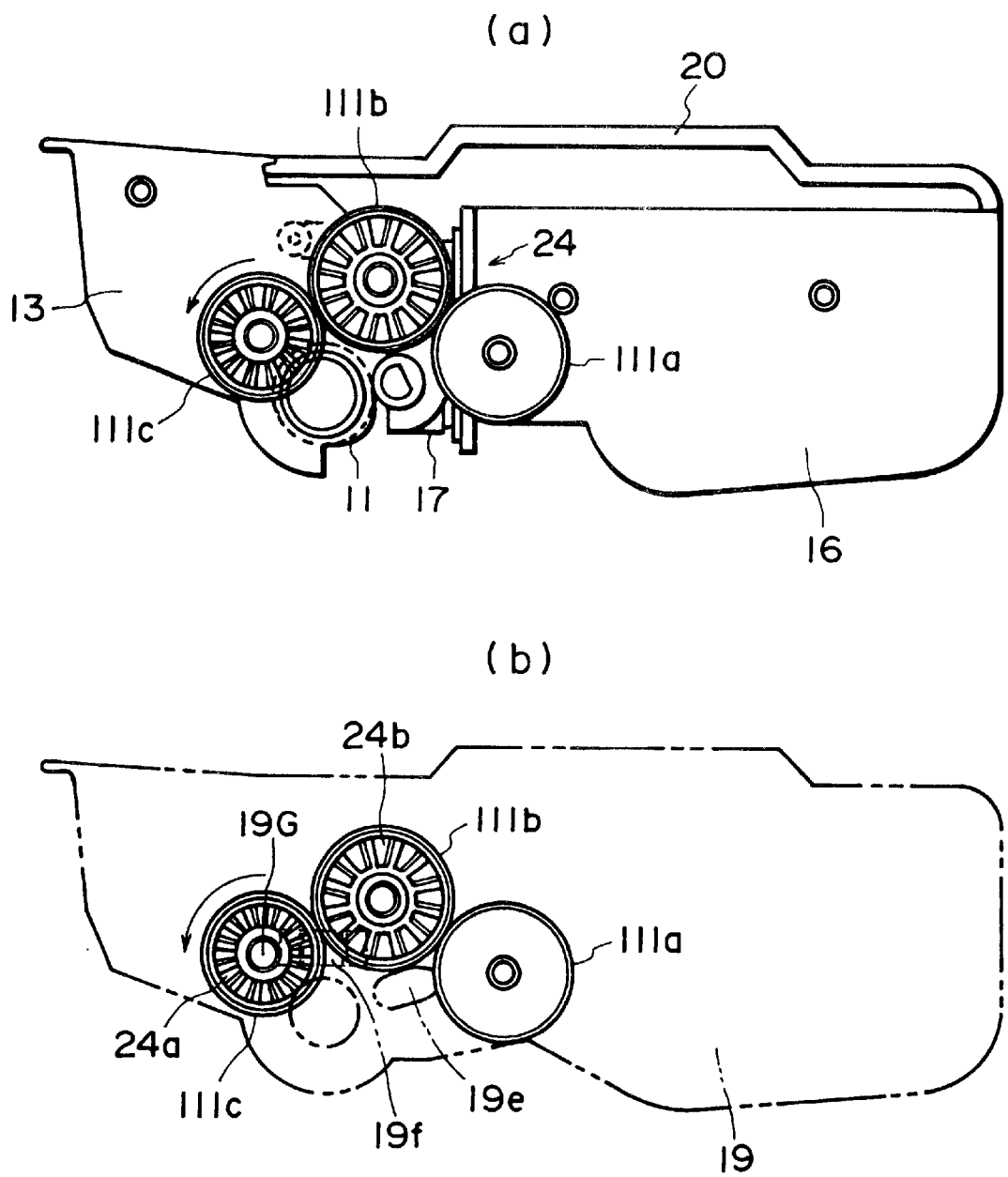
FIG. 22 is a schematic side view of a process cartridge according to an embodiment of the present invention.

FIG. 22 is a schematic drawing of the gear train positioned along the photosensitive drum. FIG. 22(a) is a side view of the process cartridge, with the side cover removed, and FIG. 22(b) is a side view of the process cartridge, in which the contour of the side cover is indicated by an imaginary line. Within the cleaning means frame 13, the conveying member 115 for conveying the recovered removed toner toward the rear of the removed toner bin 5 is disposed. When the structural arrangement of the process cartridge 15 is such that the conveying member 115 receives the driving force from photosensitive drum 11, the rotational velocity must be reduced by a large ratio. However, if the arrangement is such that the driving force is transmitted from the toner conveying member 114, the velocity reduction by a large ratio is unnecessary. Therefore, it is easy to attain a proper rotational velocity. In this case, the gears 111b and 111c are disposed in the adjacencies of the photosensitive drum 11, penetrating the toner storage frame 16 and developing means frame 17 (FIG. 22(a)).

In this embodiment, in order to prevent a temperature increase in the adjacencies of the photosensitive drum, it is assured that an air passage 19f is secured in the side cover 16, in the adjacencies of the photosensitive drum (FIG. 22(b)). More specifically, the gear 111b and 111c are provided with a plurality of slits 24a and 24b, respectively, the interval portions of which form a plurality of axial flow vanes, to forcefully exhaust, or take in, the air through an air passage 19b. With this arrangement, it does not occur that the air passage 19 for cooling the interior is blocked by the gears 111b and 111c.

Figure 34:
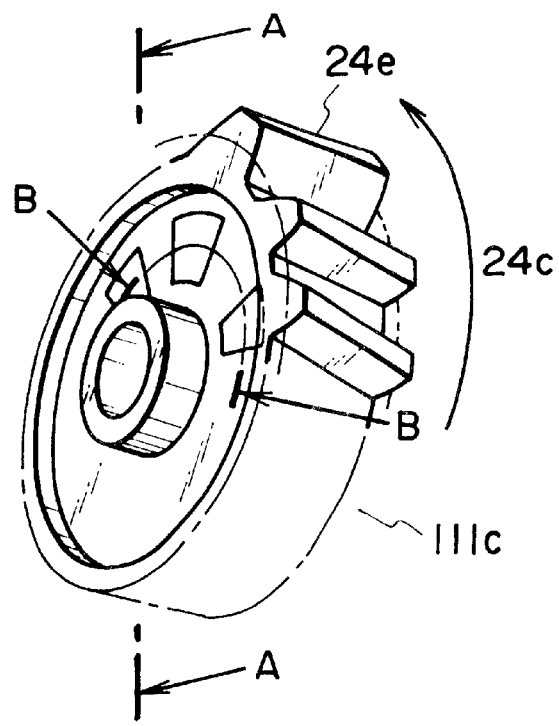
FIG. 34 is a perspective view of a gear having an impeller in a process cartridge.
Figure 35:
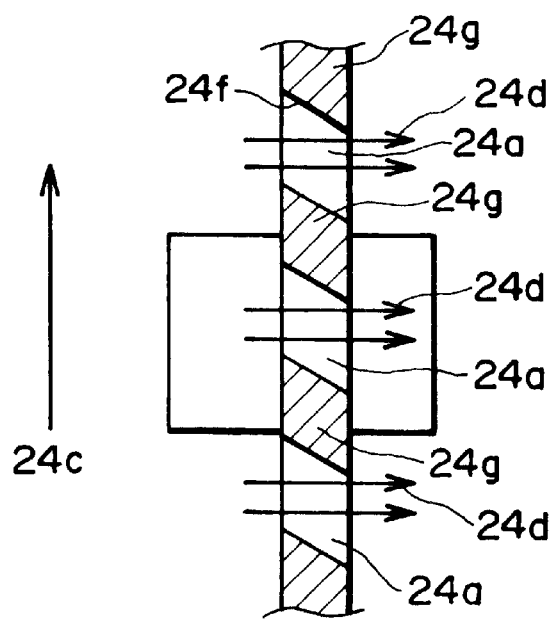
FIG. 35 is a sectional view taken along a line B—B of FIG. 34.
Figure 36:
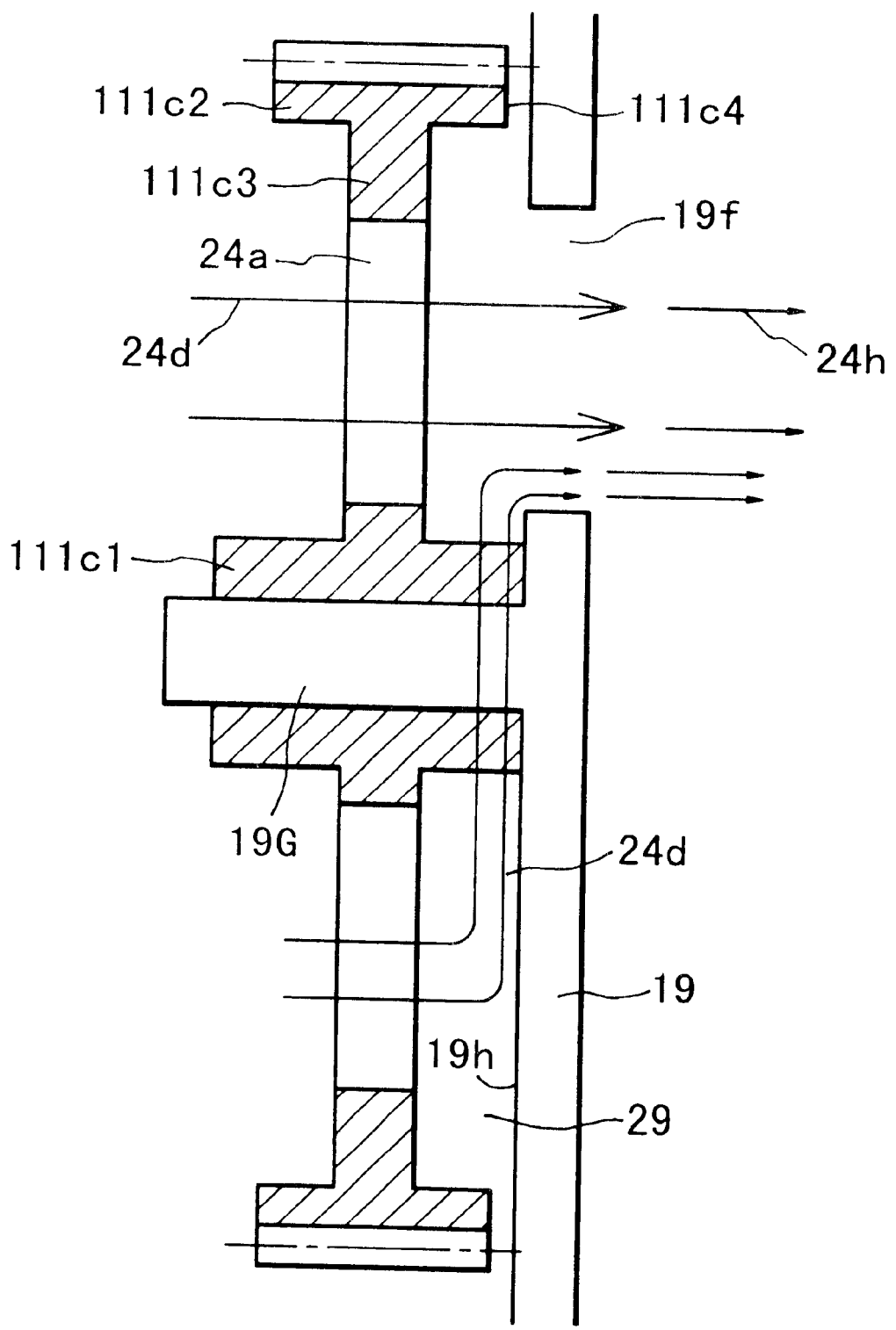
FIG. 36 is a sectional view taken along a line A—A of FIG. 34.

Next, referring to FIGS. 34, 35 and 36, the structure of the cooling air passage will be described. FIG. 34 is a perspective view of the gear 11c. The structure of the gear 111b is the same as that of the gear 111c, except that the former is opposite to the latter in the direction of the helical teeth, and the direction of the helical air passages. Therefore, the air passage structure is described referring to the gear 111c as an example. FIG. 35 is a development of the section of the B—B portion of the gear 111c illustrated in FIG. 34, at a cylindrical plane perpendicular to the rotational axis of the gear 111c, and FIG. 36 is a sectional view of the gear 111c illustrated in FIG. 34, at a plane A—A.

The gear 111c is a helical gear. A disk portion 111c3, which connects the rim portion 11c2 comprising the helical teeth, and the hub portion 111c1, is provided with a plurality of through slits 24a, which extend in the radial direction of the gear 111c, at equal intervals. There is provided a certain amount of distance between the surface of the disk portion 111c3 and the inwardly facing surface 19h of the side cover 19. Thus, the air passage 19f of the side cover 19 and the slits 24a are rendered continuous through the space 29. The gear 111c is rotationally supported by a shaft 19G which extends inward from the inwardly facing surface of the side cover 19, perpendicular to the longitudinal direction of the photosensitive drum 15; the shaft 19G is put through the center hole of the hub 111c1. The end portion of the shaft 19G is fitted with a retainer ring (unillustrated) to prevent the gear 111c from moving in the shaft direction. The outwardly facing surface 111c4 of the rim portion 111c2 is very close to the inwardly facing surface 19h of the side cover 19. The inwardly facing surface 19h of the side cover 19, and the outwardly facing surface 111c4 of the rim portion, are required to make the amount of the air flow between them as small as possible. Thus, they may be intricately formed in such a manner that the gap between them forms a labyrinth.

The length and position of each slit 24a in terms of the radial direction of the gear 111c matches those of the air passage 19f.

Referring to FIG. 35, the interval between the adjacent two slits 24a is occupied by a helical vane 24g; the adjacent two slits 24a are separated by a helical vane. The slit 24a is desired to be shaped like an interval space between adjacent two vanes of an axial flow fan so that the gear 111c is rendered aerodynamically effective in moving air. However, the gear 111c is relatively slow in rotational velocity, and therefore, the vanes of the gear 111c may be simply angled. With the provision of these slits 24a, the disk portion 111c3 of the gear 111c, that is, the portion of the gear 111c on the inward side of the rim 111c2 in terms of the radial direction of the gear 111c, constitutes an impeller.

Referring to FIGS. 34 and 35, as the gear 111c rotates in the direction indicated by an arrow mark 24c, air flows in the axial direction as indicated by an arrow mark 24d. Then, the air moves toward the air passage 19f through the space 29, and is exhausted out of the process cartridge 15 through the air passage 19f of the side cover 19.

As is evident from the drawings, the cooling air passage is structured so that the air currents from all the slits 24a are allowed to simultaneously flow through the space 29. Therefore, all the vanes 24d contribute to the generation of the air flow.

If the direction of the surface 24f of the vane 24g is reversed, the direction of the air flow reverses even if the rotational direction of the gear 111c is kept the same. Thus, the direction of the surface 24f should be determined to be advantageous in terms of cooling efficiency, in consideration of the positional arrangement of the components, and the general configuration of the cooling air passage.

The twist angle of teeth 24e of the helical gear 111c is rendered parallel to the twist angle of the surfaces 24f of the vanes 24g. With this arrangement, the teeth 24e and vanes 24g become the same in terms of the air flow in the axial direction of the gear 111c. Further, such an arrangement is advantageous in terms of mode formation, in a case that the gear 111c is molded of resin. In a case that the teeth 24e and vanes 24g of the gear 111c are constructed so that they become the same in terms of the direction in which they send air in terms of the axial direction of the gear 111c, a gap for allowing the air to pass is provided between the outwardly facing surface of the rim 111c2 and the inwardly facing surface of the side cover 119. Also, a cover which follows the peripheral surface of the gear 111c, except for the portion where the gear 111c meshes with its counterpart, is provided as a member which functions like the casing of an air blower.

As described above, during an image forming operation, the gears 111b and 111c rotates, and therefore, the internal space of the process cartridge 15 is ventilated. Also, the heat generated by the fixing apparatus and the like is removed. Further, the apparatus main assembly 27 is provided with ventilation holes through which the apparatus main assembly 27 is naturally ventilated, or ventilating means such as a fan (unillustrated), or the like.

(Other Embodiments of Process Cartridge)

Figure 24:
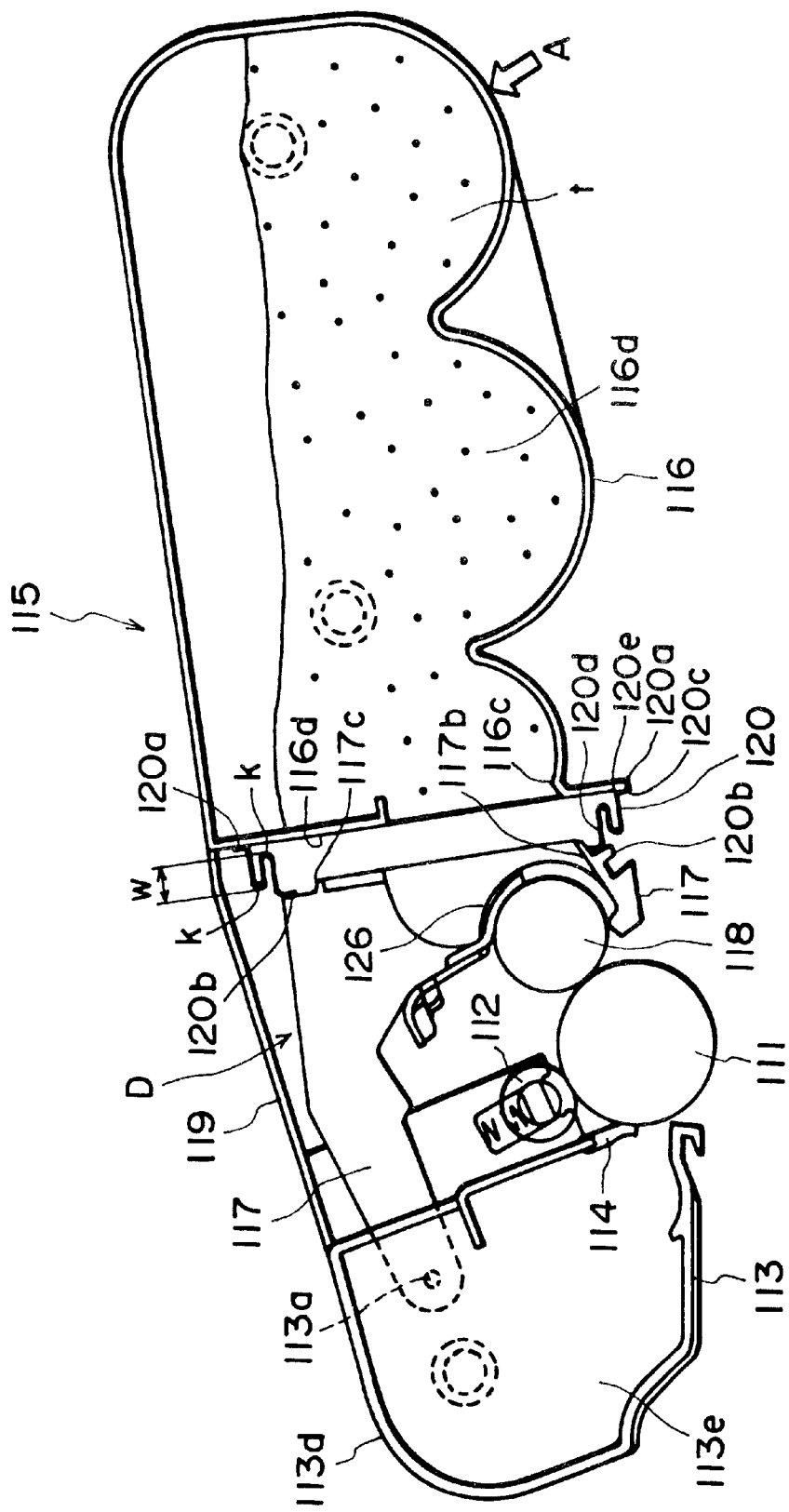
FIG. 24 is a longitudinal sectional view of a process cartridge according to a further embodiment of the present invention.
Figure 25:
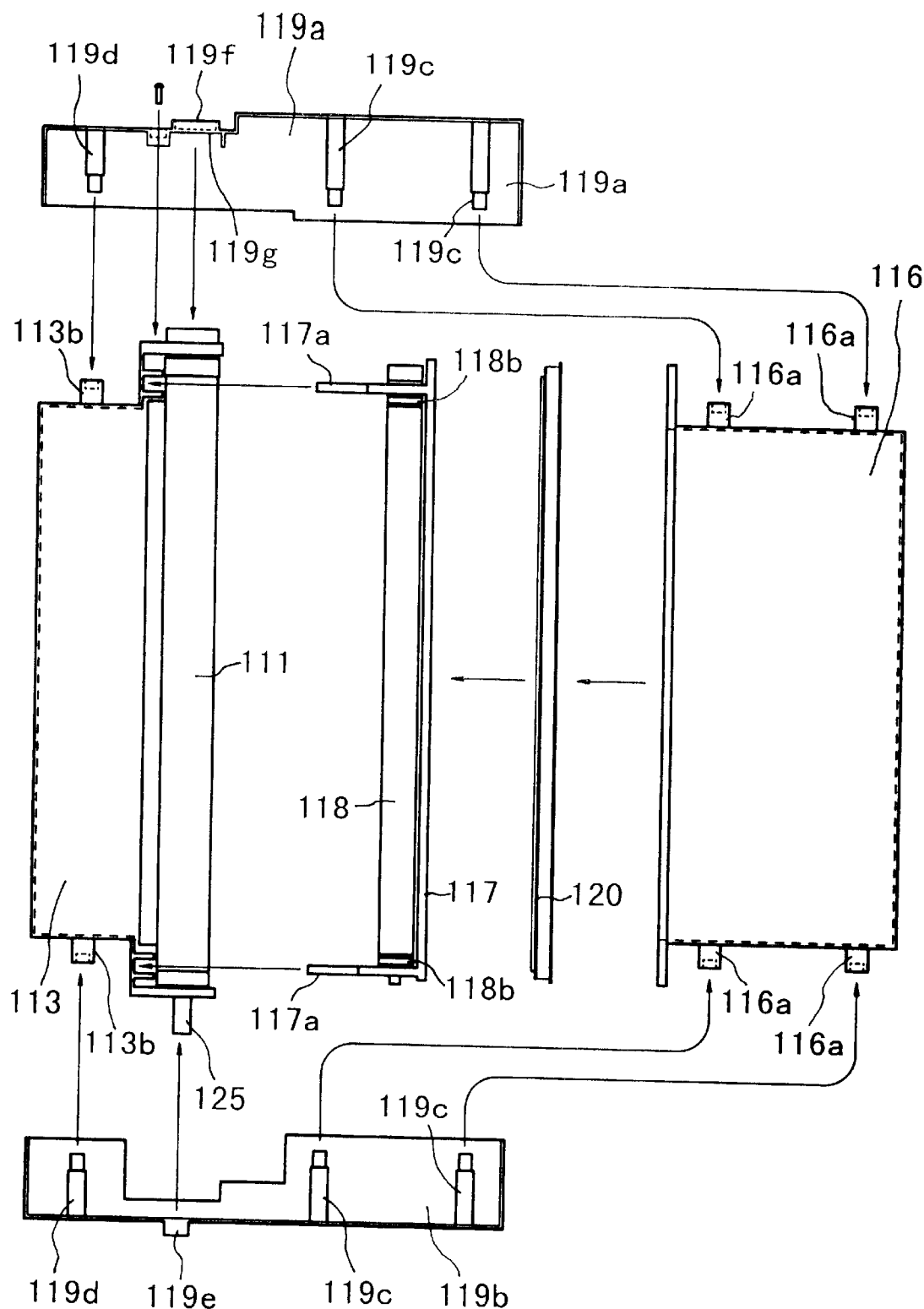
FIG. 25 is a disassembling top plan view of a process cartridge according to an embodiment of the present invention.

Referring to FIGS. 24, 25 and 35, the embodiments of the process cartridge in accordance with the present invention, different from the preceding embodiment, will be described.

Figure 26:
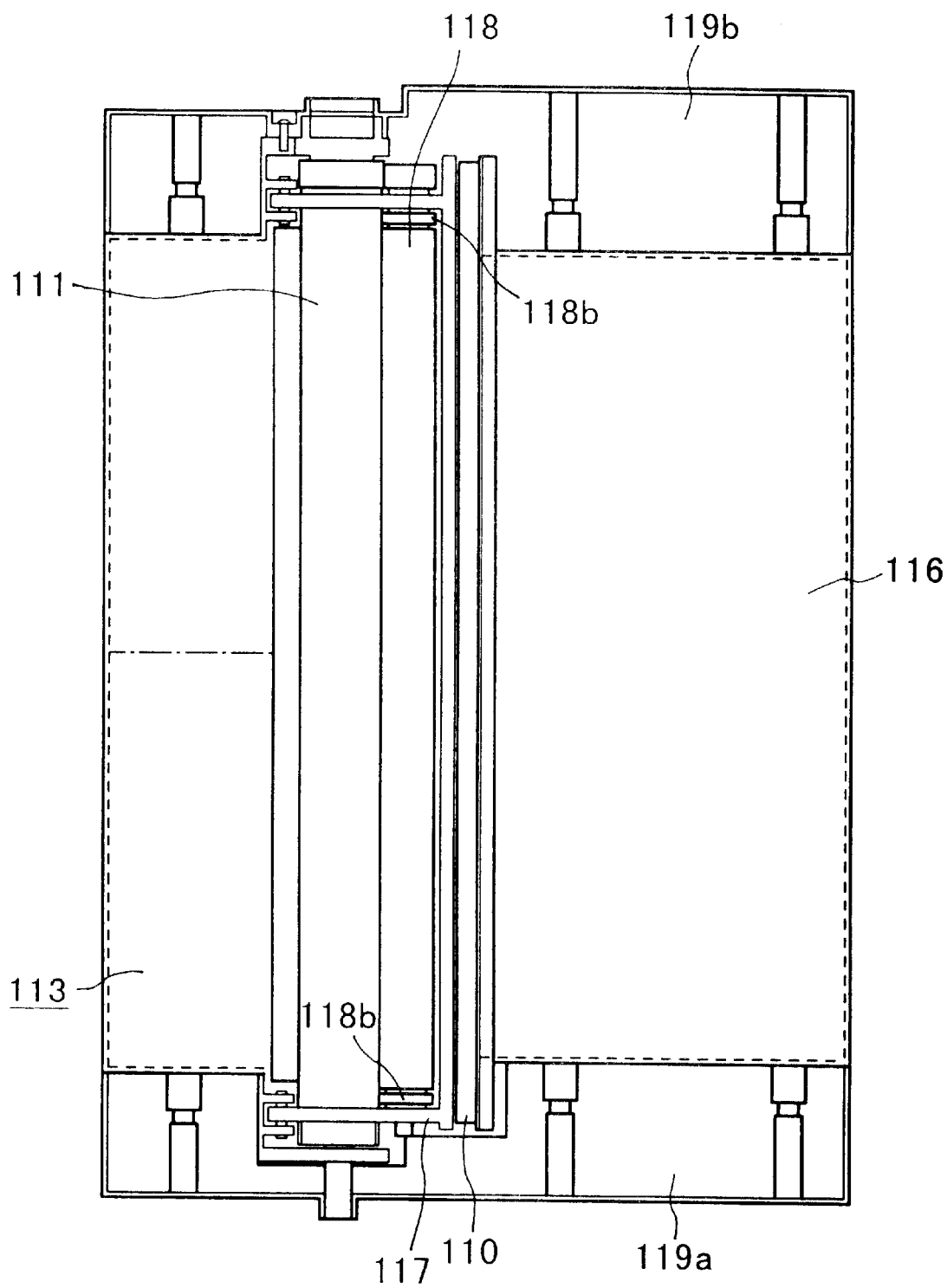
FIG. 26 is a top plan view of a process cartridge according to a further embodiment of the resent invention.

FIGS. 25 and 26 are schematic drawings of one of the embodiments of a process cartridge in accordance with the present invention, and show the structure of the cartridge as seen from above.

Referring to FIG. 25, a toner storage frame 116 provided with a toner storage portion is accurately positioned relative to side covers 119a and 119b, and fixed thereto, by fitting the pins 119c of the side covers 119 (119a and 119b) into the holes or corresponding positioning bosses 116a of the toner storage frame 116. The cleaning means frame 113 is accurately positioned relative to the side covers 119a and 119b, and fixed thereto, by engaging the positioning bosses 113b with the positioning pins 119d of the side covers 119a and 119b. Consequently, the cleaning means frame 113 and toner storage frame 116 are integrally fixed to each other.

Figure 27:
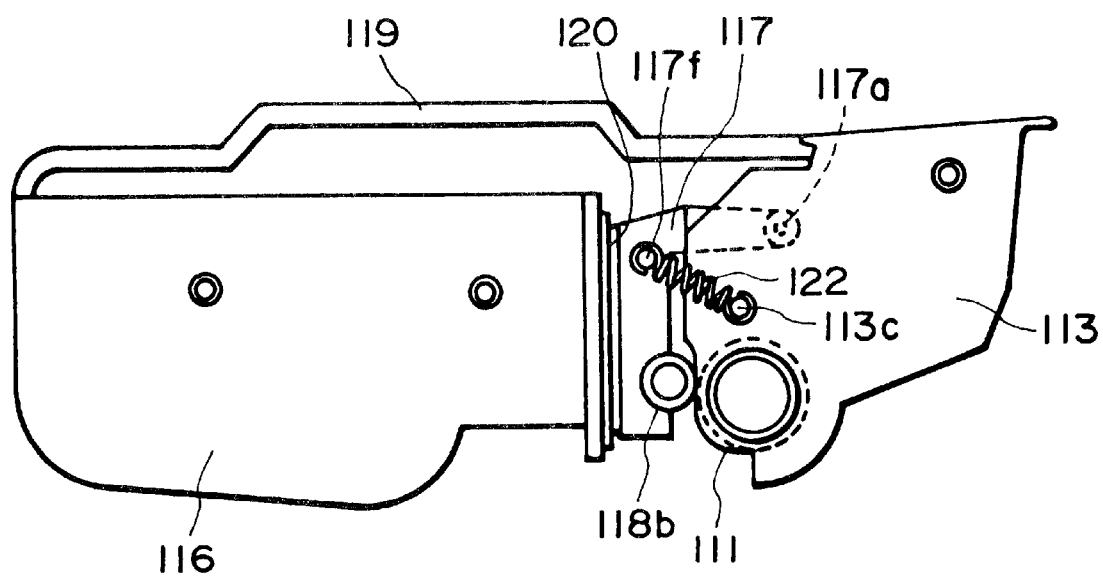
FIG. 27 is a side view of a process cartridge according to a further embodiment of the present invention.

Referring to FIG. 24, the developing means frame 117 of a developing apparatus D is supported by the pins inserted in the holes 113a of the cleaning means frame 113, being enabled to pivot about the center of the holes 113a while holding a development roller 118 and a development blade 112. Between the spring anchoring projection 113c of the cleaning means frame 113, and the spring anchoring projection 117f of the developing means frame 117, a tensional coil spring 112 is stretched as shown in FIG. 27. With the resiliency of the tensional coil spring 122, the spacer rings 118b are kept pressed upon the photosensitive drum 11, outside the image formation region. The spacer rings 18b are provided at the longitudinal ends of the development roller 118, one for one, and are greater in radius by a value equivalent to a development gap (approximately 300 µm) than the development roller 118.

With this arrangement, a gap is provided between the developing means frame 117 and toner storage frame 116. Further, the toner storage frame 116 is structured so that its bottom well is approximately horizontal when the process cartridge is in the apparatus main assembly.

In this embodiment, the gap between the developing apparatus D and toner storage frame 116 is sealed. More specifically, the openings 117b and 116c of the developing apparatus D and frame 116, respectively, for allowing toner to pass, are connected by a flexible member 120, as a sealing member, shaped like a bellows. The flexible member 120 as a flexible seal is welded or glued to the frames 116 and 117, by the connective portions 120a and 120b, respectively.

The flexible member 120 has to be connected only to prevent toner from leaking while toner is passing between the openings 116c of the frame 116, and the opening 117b of the frame 117. Therefore, the frames 116 and 117 may be provided with a male and a female coupler, which surround the openings 116c and 117b, respectively, and the joint between them is sealed with a sealing member, provided that the couplers can absorb the displacement of the frames 116 and 117 relative to each other.

Figure 28:
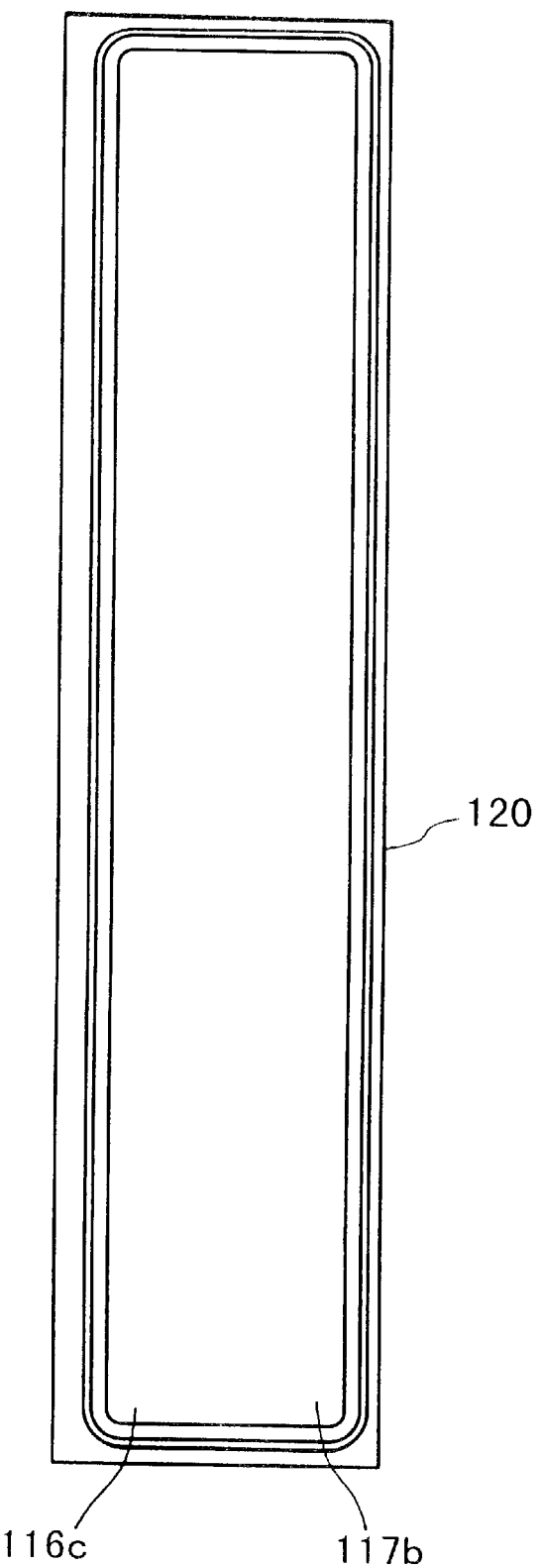
FIG. 28 is a front view of a sealing member according to an embodiment of the present invention.
Figure 29:
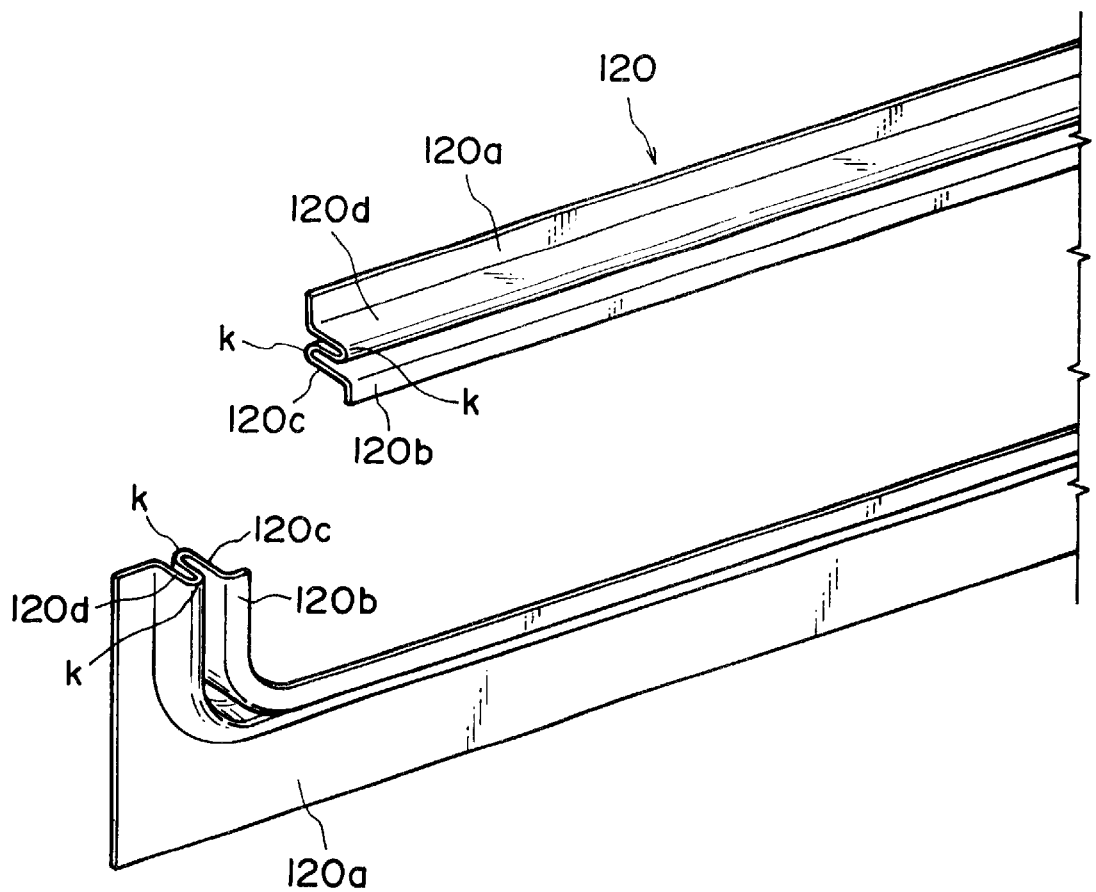
FIG. 29 is a perspective view of a sealing member according to another embodiment of the present invention.
Figure 30:
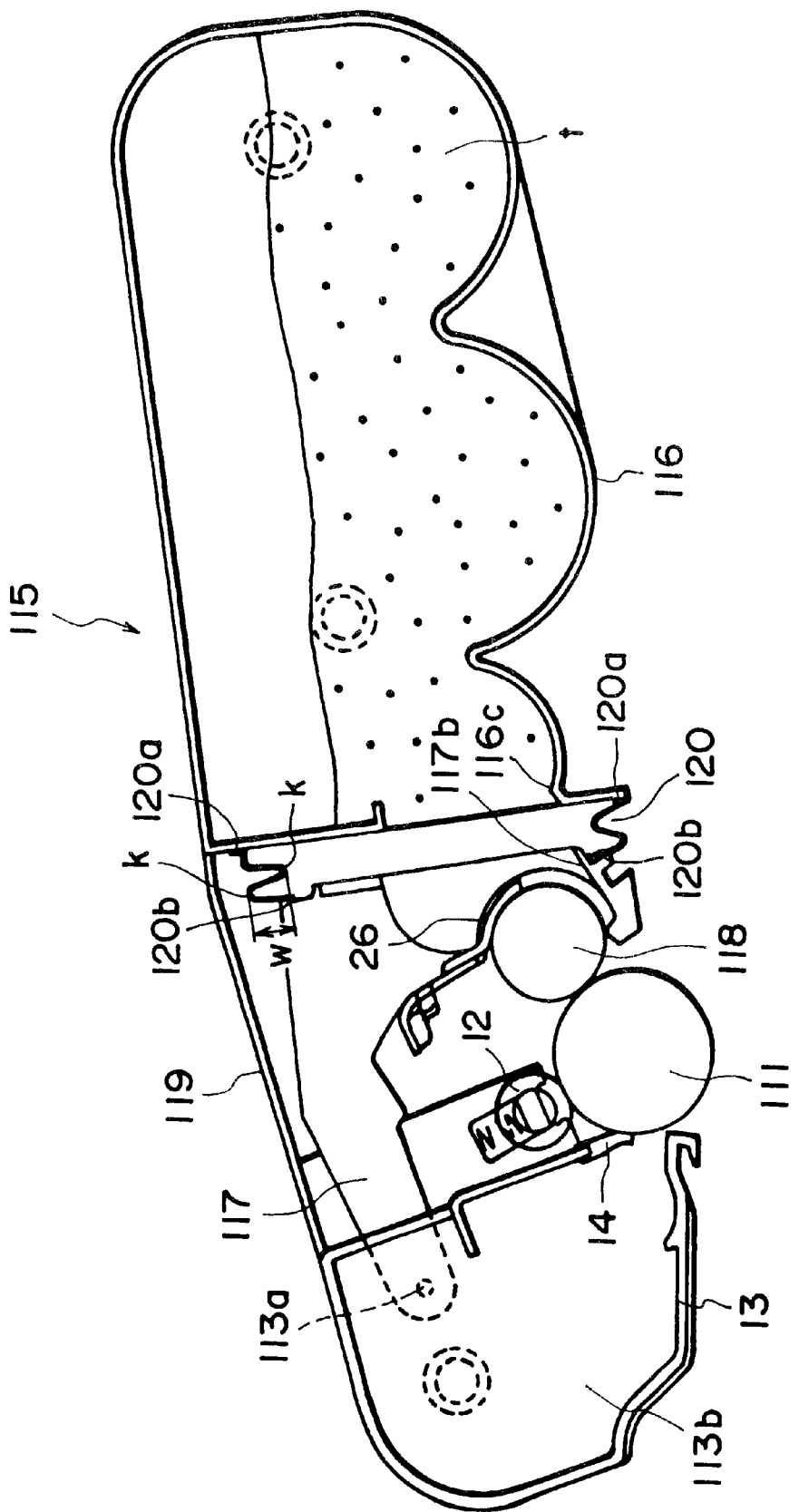
FIG. 30 is a longitudinal sectional view of a process cartridge according to a further embodiment of the present invention.

Referring to FIG. 28, the flexible member 120 is shaped like a belt which surrounds the openings 117b and 116c.

The surfaces 116d and 117c of the frames 116 and 117, respectively, which face each other, are flat surfaces approximately parallel to each other. They surround the openings 116c and 117b, respectively. To the surface 116d, a connective portion 120a of the flexible member 120 is fixed, and to the surface 117c, the connective portion 120b of the flexible member 120 is fixed. The method used to fix these connective portions 120a and 120b to the surfaces 116d and 117c is thermal welding, or gluing. It is also possible to clasp the connective portions 120a and 120b with the use of clasping members (unillustrated), for example, a wear plate, and screw the clasping members to the surfaces 116d and 117c.

The flexible member 120 is uniform in terms of the shape of the cross section perpendicular to the surfaces 120a and 120b. More specifically, referring to FIGS. 24 and 29, in terms of cross section, the L-shaped outward sheath portion 120c and L-shaped inward sheath portion 120d of the flexible member 120 are connected by a zigzag portion. Further, the inward sheath portion 120d and outward sheath portion 120c overlap each other in terms of the direction parallel to the planes of the openings 116d and 117c. In other words, the flexible member 120 has two folds k. With the provision of this structural arrangement, even if the distance between the mutually facing surfaces 116d and 117c varies, or the surfaces 116d and 117c become displaced relative to each other in the direction parallel to their planes, or the surfaces 116d and 117c become nonparallel to each other, or the preceding displacements occur in combination, the flexible member 120 bends like a bellows, absorbing the displacements to keep sealed the passage between the openings 116c and 117d. Further, since the flexible member 120 is in the form of a bellows, it is very small in the resistance it generates as one or a plurality of the aforementioned displacements occur. Therefore, the flexible member 120 does not affect the contact pressure generated between the spacer rings 118b and photosensitive drum 111 by the tensional coil spring 122.

Further, when the frame 116 is full of toner, there is a possibility that the weight of the toner within the frame 116 will deform the side cover 119, and as a result, the mutually facing surfaces 116d and 117c will be displaced relative to each other. The flexible member 120 is capable of dealing with this type of a situation. This type of deformation changes as the amount of the toner within the frame 116 is reduced. As a result, the positional relationship between the opposing surfaces 116d and 117c also changes. However, this displacement can also be dealt with by the flexible member 120.

The front and rear walls of the apparatus main assembly 27 are provided with a guide (unillustrated).

On the other hand, the process cartridge 115 is provided with a pair of shaft-like, cylindrical projections (unillustrated), which project outward from the cleaning means frame 113 through the holes 119e and 119f of the side covers 119, one for one, and the axial lines of which are in alignment with the rotational axis of the photosensitive drum 111. When the process cartridge 115 is installed into the apparatus main assembly 27, the position of the process cartridge 15 relative to the apparatus main assembly 27 is fixed as these cylindrical projections engage with the positioning portions (unillustrated) of the apparatus main assembly 27. Since the frame 116 is relatively large, and the distance from the center of the photosensitive drum 111 to the center of gravity of the frame 116 is relatively large, a large amount of moment is generated in the direction to rotate the process cartridge 115 about the rotational axis of the photosensitive drum 111 in the clockwise direction. As a result, the point of the process cartridge 115, indicated by an arrow mark A in FIG. 24, comes into contact, and remains in contact, with the apparatus main assembly 27, fixing the maintaining the attitude of the process cartridge 115.

Regarding the preceding description, the material for the flexible member 120 is desired to be such elastomer that is similar in properties to the material used for the frames 113 and 116. In this embodiment, styrene resin was used as the frame material, and styrene elastomer was used as the material for the flexible member 120. This combination was excellent in terms of bonding. Other material such as rubber, urethane, silicon rubber, and the like may be also used as the material for the flexible member 120. As for the means for attaching the flexible member 120, adhesive or double-shaped adhesive tape may be used. Instead of these adhering means, a mechanically attaching means may be used. For example, the flexible member 120 may be clasped by a clasping member. Obviously, both connective means may be used in combination.

As for the molding method for the flexible member, injection molding or compression molding may be used. Further, material in the form of a sheet may be heat-pressed.

In order to minimize the reactive force of the flexible member 120, the direction of which is approximately parallel to the conveyance direction of the sheet S, the flexible member 120 is structured so that the portion between the folds k and k, the portion between the fold k and the connective portion 120a, and the portion between the fold k and the connective portion 120b, become parallel to the sheet conveyance direction, as shown in FIG. 24. However, the flexible member 120 may be folded so that the above-described portions become perpendicular to the sheet-conveyance direction.

Further, a fold width W, or the distance between the opposing two folds, of the flexible member 120 is determined so that the flexibility of the flexible member is not lost within a range in which the frames 117 and 116 are allowed to move relative to each other. The opening of the flexible member 120, which faces the opening 116c, is greater in both the horizontal and vertical directions than the opening 116c, and the opening of the flexible member 120, which faces the opening 117b, is smaller in both the horizontal and vertical direction than the opening 117b.

Figure 31:
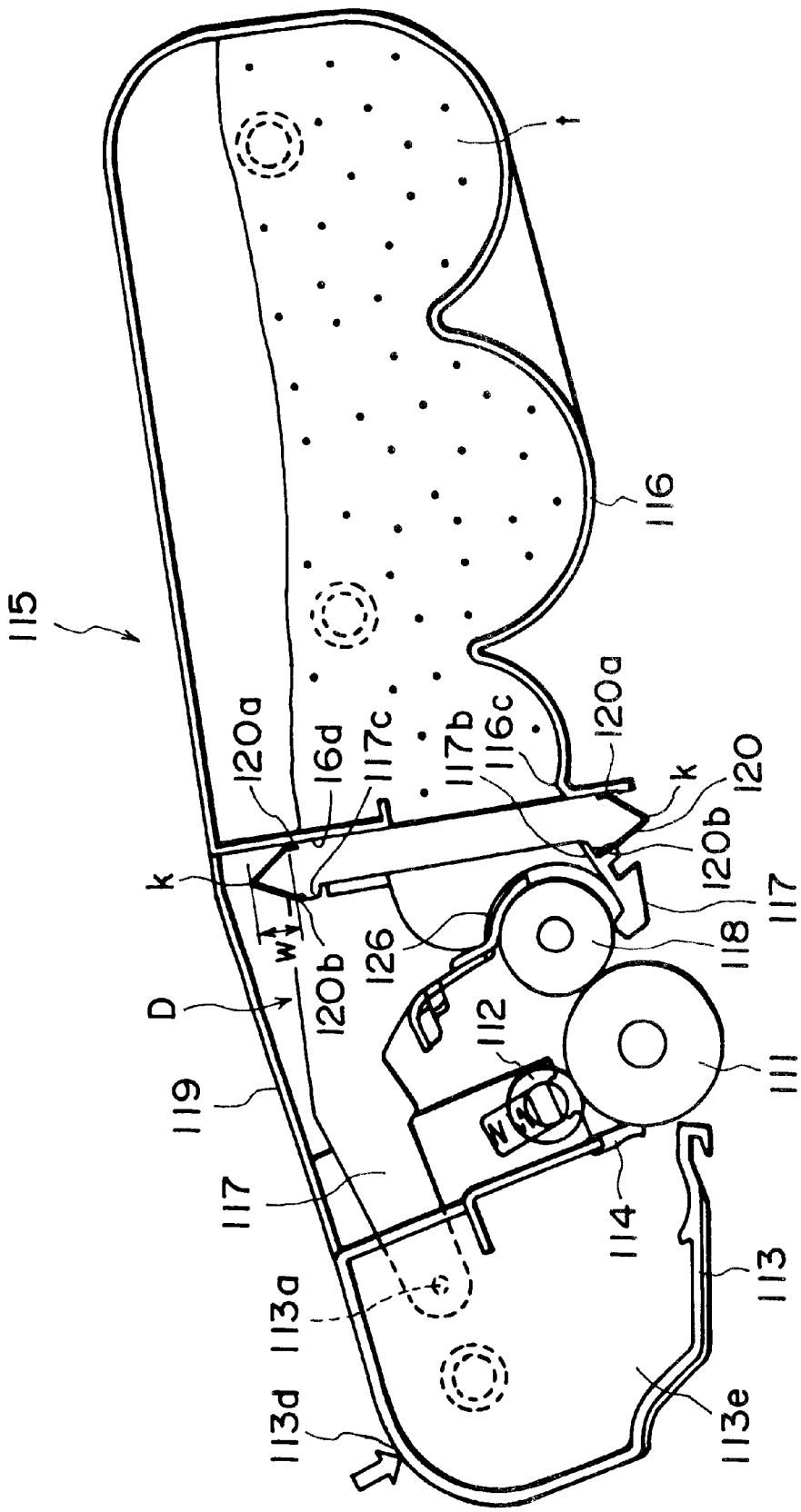
FIG. 31 is a longitudinal sectional view of a process cartridge according to a further embodiment of the present invention.

FIG. 31 shows an example of the flexible member 120, which has only a single fold k. Even if the flexible member 120 is provided with only one fold k, it can deal with the displacement of the frames 116 and 117 relative to each other, as long as the width W from the connective portion 120b to the fold k is rendered generous.

In the preceding description of the embodiments of the present invention, the bellows portion of the flexible member 120 was described with reference to its vertical sectional view. However, when shown in a horizontal sectional view, the direction in which the fold k projects is opposite to the direction in which it projects in the vertical sectional view. For example, the fold projecting inward in FIG. 30 projects outward when seen in a horizontal sectional view.

The above described embodiments of the present invention may be summarized as follows.

The process cartridge 15 (115) removably installable in the main assembly 27 of an electrophotographic image forming apparatus, comprises:

the electrophotographic photosensitive drum 11 (111);

the development roller 18 (118) as a developing member for developing an electrostatic latent image formed on the electrophotographic photosensitive member 11 (111);

the toner storage frame 16 (116) provided with the toner storage portion 16a (116a) as a developer storing portion for storing the developer used for developing the electrostatic latent image with the use of the development roller 18 (118);

the cleaning means frame 13 (113) as a drum frame for supporting the electrophotographic photosensitive drum 11 (111);

the developing means frame 17 (117) which supports the development roller 18 (118) and is pivotally attached to the toner storage frame 16 (116);

the side covers 19 (119a) as the first end cover for holding together the cleaning means frame 13 (113) and developing means frame 17 (117), at each of the longitudinal ends of the cleaning means frame 13 (113) and developing means frame 17 (117); and the side cover 20 (119b) as the second end cover for holding together the cleaning means frame 13 (113) and developing means frame 17 (117), at each of the other longitudinal ends of the cleaning means frame 13 (113) and developing means frame 17 (117).

The developing means frame 17 (117) and toner storage frame 16 (116) are connected to each other, with the interposition of the sealing member 21 to 60, or the flexible member 120, and the flexible sealing member is pasted to the developing means frame 17 (117) and toner storage frame 16 (116).

The sealing member 60 is a hollow member and has a through hole 60a. One end of the through hole 60a faces the opening 16c, as a supply outlet, with which the toner storage frame 16 is provided, and the other end of the through hole 60a faces the opening 17a, as a supply inlet, with which the developing means frame 17 is provided. The opening 16c is an opening through which the developer t stored in the toner storage portion 16a is conveyed toward the development roller 18. The opening 17a is an opening through which the developer t is received into the developing means frame 17 after passing through the opening 16c. As for the sealing member 60, one end of its through hole 60a is pasted to the toner storage frame 16, by the surface which surrounds the opening of the hole 60a, and the other end of the through hole 60a is pasted to the developing means frame 17 by the surface which surrounds the opening of the hole 60a.

The sealing member 21 and flexible member 120 have at least one fold k between the surface b which they are pasted to the developing means frames 17 and 117, respectively, and the surface by which they are pasted to the toner storage frame 16 and 116, respectively. The sealing member 21 and flexible member 120 are in the form of a bellows, one end of which is pasted to the toner storage frame 16 and 116, respectively, and the other end of which is pasted to the developing means frame 17 and 117, respectively.

The flexible sealing members 21 and 60 are formed of elastic material, sheet, or film.

The material for the sealing members 21 and 60, and the material for the flexible member 120, are foamed urethane, ester resin, or polyurethane resin.

The side cover 19 is provided with a handle 29, which is grasped by an operator when the process cartridge 15 (115) is installed into, or removed from, the apparatus main assembly. The process cartridge 15 (115) is installed into, or removed from, the apparatus main assembly 27 in the direction parallel to the longitudinal direction of the electrophotographic photosensitive drum 11 (111).

The side cover 19 (119) is provided with the hole 19a (119f), through which the shaft 25 (125) of the electrophotographic photosensitive member 11 (111) projects. One of the longitudinal ends of the electrophotographic photosensitive member 11 (111) is supported by the cleaning means frame 13 (113), by the shaft 25 (125). The position of the process cartridge 15 (115) relative to the apparatus main assembly 27 is fixed as the process cartridge 15 (115) is installed into the apparatus main assembly 27.

The top surface of the toner storage frame 16 (116) is provided with a handle 30. The top surface means the surface which faces upward when the process cartridge 15 (115) is in the apparatus main assembly 27. The handle 30 is a portion which is grasped by an operator when the process cartridge 15 (115) is moved.

The cleaning means frame 13 (113) has an exposure opening 131 (113l), which is an opening through which a beam of light modulated with image formation data is projected onto the electrophotographic photosensitive drum 11 (111) from the apparatus main assembly 27 after the installation of the process cartridge 15 (115) into the apparatus main assembly 27.

In the cleaning means frame 13 (113), the charge roller 12 (112), as a charging member for charging the electrophotographic photosensitive drum 11 (111), and the cleaning blade 14 (114) as a cleaning member for removing the developer remaining on the electrophotographic photosensitive drum 11 (111), are disposed.

The side covers 19 and 20 (119a and 119b) are fixed to the cleaning means frame 13 (113) and toner storage frame 16 (116) with the use of screws 100.

The side covers 19 and 20 (119a and 119b) are fixed to the cleaning means frame 13 (113) and toner storage frame 16 (116) with the use of resin.

The side cover 19 is provided with the groove 19e in which the projecting member 17e provided at one of the longitudinal ends of the developing means frame 17 is movably supported. The projecting member 17e formed of resinous material is an integral portion of the developing means frame 17. The toner storage portion 16 (116) contains the developer t.

The assembly method for the process cartridge 15 (115) is as follows.

The assembly method for the process cartridge 15 (115) removably installable in the main assembly 27 of an electrophotographic image forming apparatus comprises:

(a) a drum attachment step for attaching the electrophotographic photosensitive drum 11 (111) to the cleaning means frame 13 (113) as a drum frame;

(b) a frame joining step for joining the developing means frame 17 (117) and toner storage frame 16 (116) in a manner to allow them to pivot relative to each other;

(c) a developing member attachment step for attaching the development roller 18 (118) as a developing means to the development means frame 17 (117), the development roller 18 (118) being a means for developing an electrostatic latent image formed on the electrophotographic photosensitive drum 11 (111);

(d) a developer filling step for filling the toner storage frame 16 (116) with the developer t;

(e) a first end cover joining step for attaching the side cover 19 (119e) as the first end cover to the cleaning means frame 13 (113) and development means frame 17 (117), at each of the longitudinal ends of the frames 13 (113) and 17 (117);

(f) a second end cover joining step for attaching the side cover 20 (119b) as the second end cover to the cleaning means frame 13 (113) and development means frame 17 (117), at each of the other longitudinal ends of the frame 13 (113) and 17 (117).

In the frame joining step, the development means frame 17 (117) and toner storage frame 16 (116) are joined with each other in a manner to allow them to pivot relative to each other, with the interposition of the sealing member 21 (60) or the flexible sealing member 120, as a flexible member, between the two frames, so that one end of the flexible member is attached to the development means frame 17 (117) and the other end of the flexible member is attached to the toner storage frame 16 (116).

In the first end cover joining process and second end cover joining step, the side covers 19 (119a) and side cover 20 (119b) are attached to the cleaning means frame 13 (113) and development means frame 17 (117) with the use of screws.

In the first end cover joining step and second end cover joining step, the side covers 19 (119a) and side cover 20 (119b) are attached to the cleaning means frame 13 (113) and development means frame 17 (117) with the use of resin.

In the developer filling step, the developer t is filled into the developer storage portion of the toner storage frame 16 (116) through the developer filling opening (unillustrated) provided at one of the longitudinal ends of the toner storage frame 16 (116).

(Cartridge Installing Space in Main Assembly)

Figure 33:
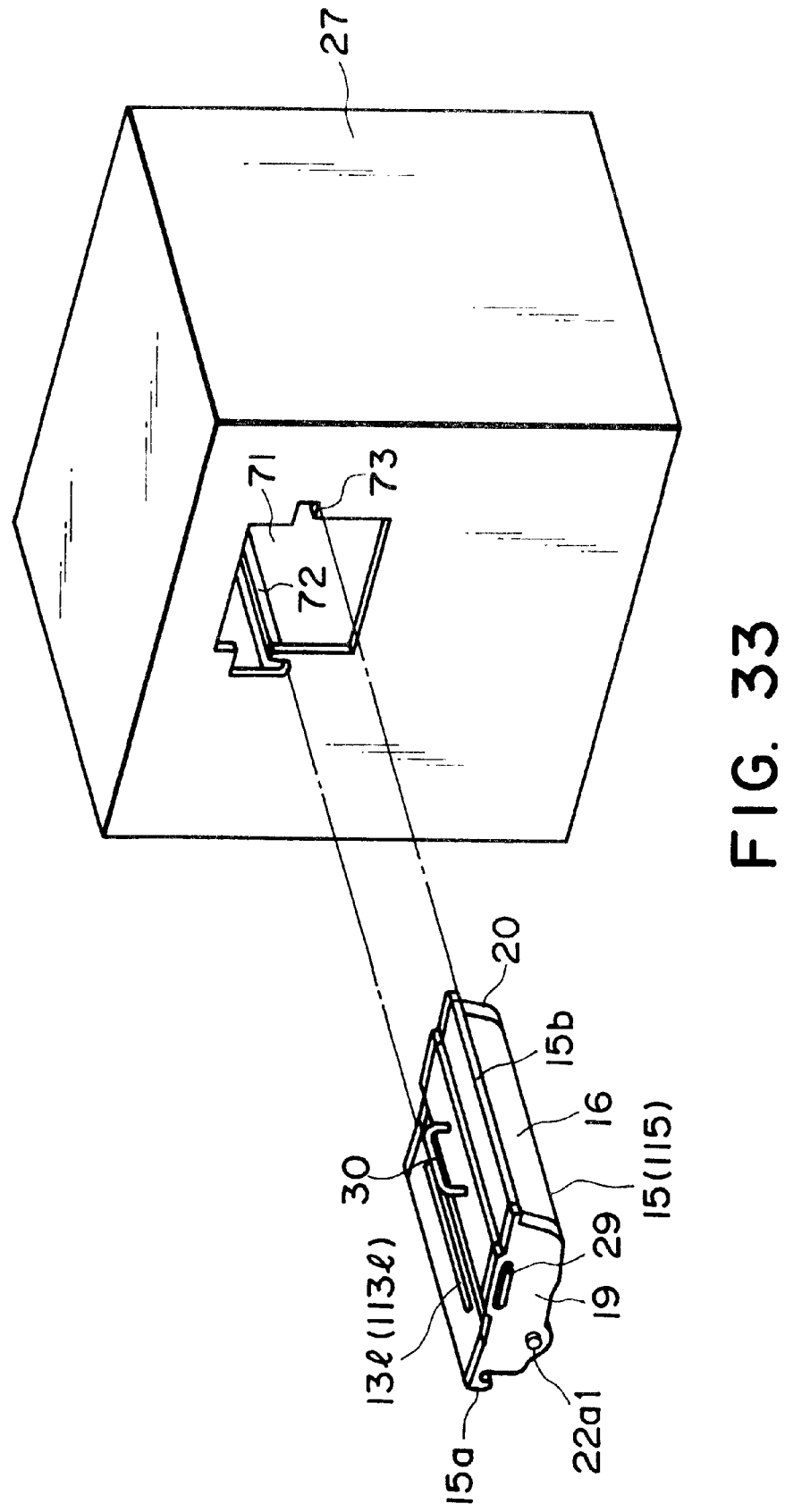
FIG. 33 is a perspective view illustrating mounting and demounting of the process cartridge relative to the main assembly of the image forming apparatus.

FIG. 33 is a perspective view of the cartridge installing space provided in the apparatus main assembly 17. As the front door (unillustrated) of the apparatus main assembly 17 is opened, the entrance to the cartridge installing space 71 becomes visible.

In the opposing sidewalls of this cartridge installing space 71, a pair of guide rails 72 and 73 are provided one for one, which extend in the direction perpendicular to the direction in which the sheet S is conveyed, and parallel to the surface of the sheet S. The guide rails 72 and 73 are disposed virtually parallel to each other, and also at virtually the same levels, that is, in a virtually horizontal plane.

The process cartridge 15 (115) is advanced into, or retracted out of, the above-described cartridge installing space 71, in the longitudinal direction of the process cartridge 15 (115); the process cartridge 15 (115) is removably installed into the apparatus main assembly 17, with the guide portions 15a (115a) and 15b (115b) engaged in the corresponding guide rails 72 and 73 of the cartridge installing space 71.

(Resin Material Binding between Side Cover and Cleaning Frame and Toner Accommodation Frame)

Figure 37:
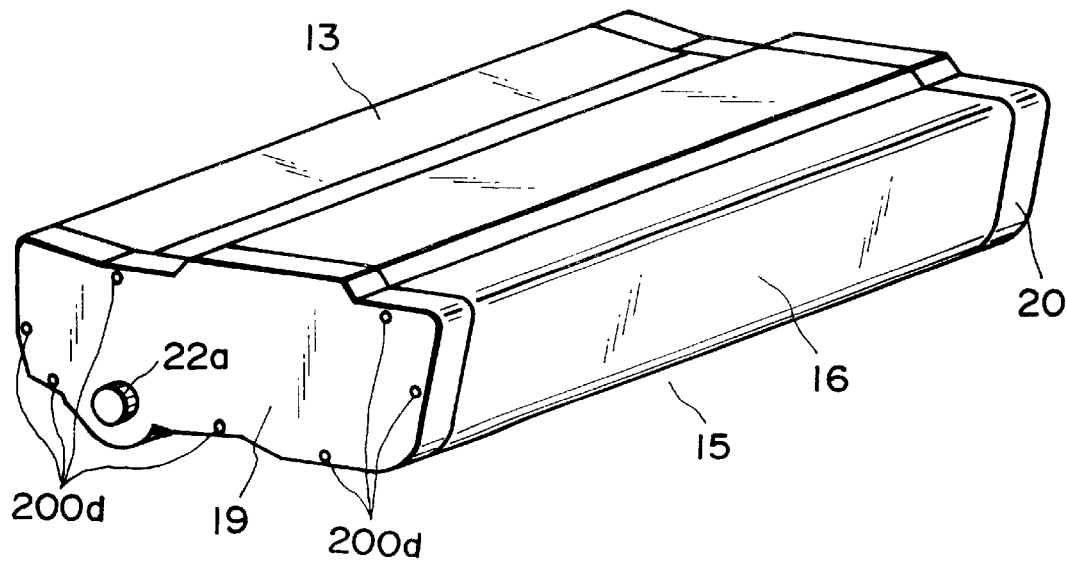
FIG. 37 is a perspective view of a process cartridge.
Figure 40:
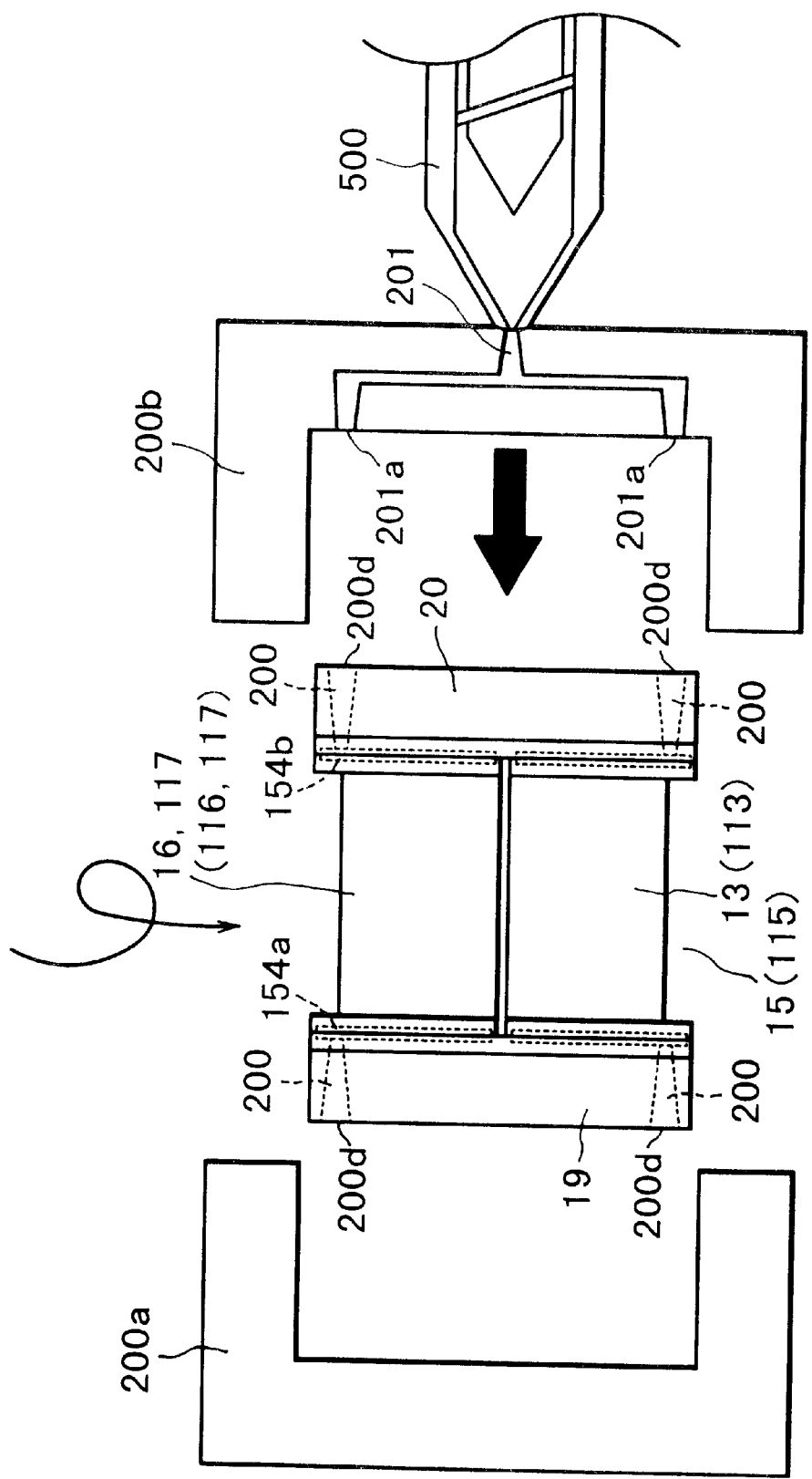
FIG. 40 is a perspective view for the illustration of a bonding process of a side cover.

Referring to FIGS. 37 and 40, a description will be provided as to the resin material binding between the side covers 19, 20 (119a, b) and the cleaning frame 13 (113). Namely, a method of fixing the side covers 19, (119a, b) to the frame 13, 16, 113, 116 will be described.

Here, the side covers 19, 20 (119a, b), the cleaning frame 13 (113) and the toner accommodation frame 16 (116) are molded resin products.

The same reference numerals are assigned to the elements having the corresponding functions, and the detailed description thereof is omitted for simplicity.

Figure 38:
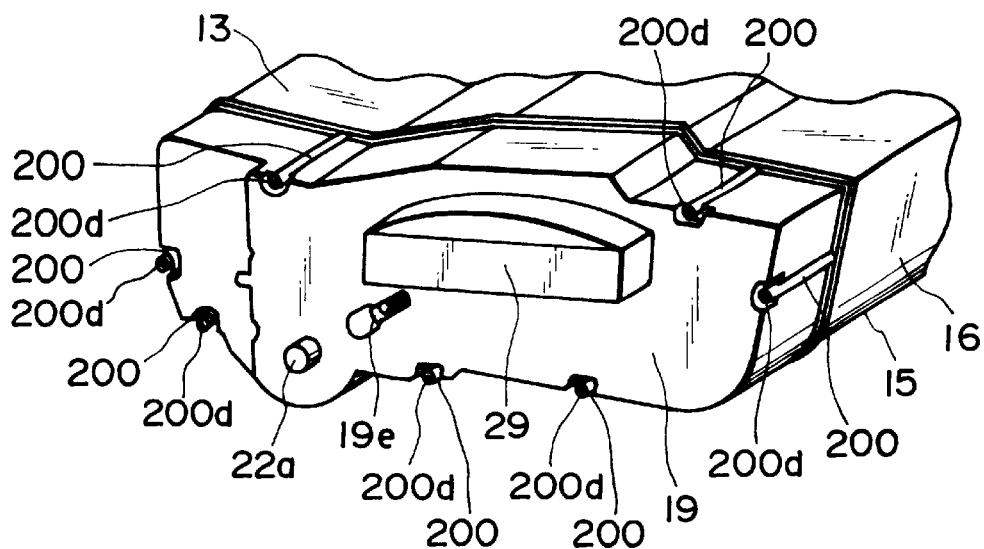
FIG. 38 is a perspective view of a side cover of a process cartridge.

As shown in FIGS. 37 and 38, a resin material injection paths 200 are provided in side covers 19, 20 (the path is not seen in the FIG.)

Designated by 200d is an injection port. The molten resin material is injected into the injection path 200 through the injection port 200d. The injection path 200 (injection port 200d) are integrally molded when the side covers 19, 20 are molded.

Figure 39:
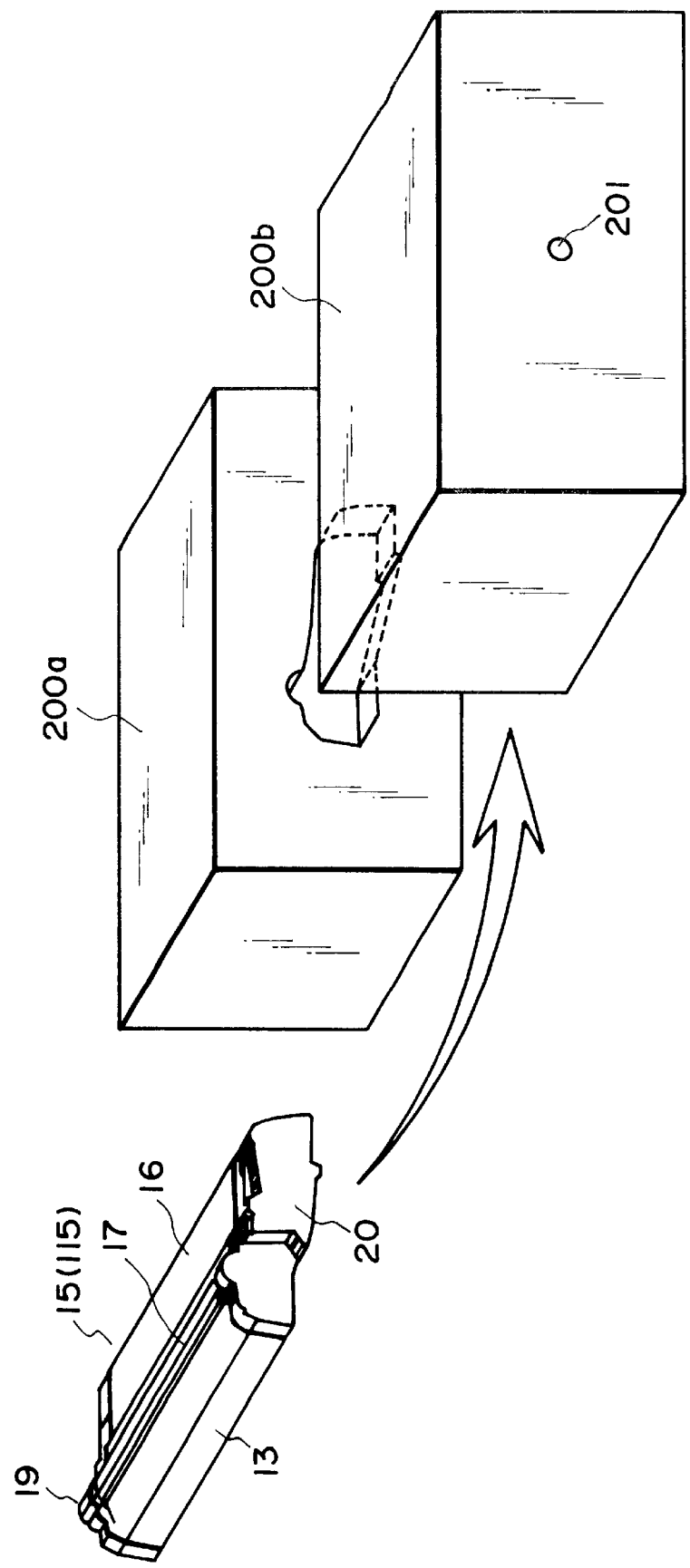
FIG. 39 is a perspective view for the illustration of a bonding process of a side cover.

FIG. 39 and FIG. 40 illustrate a resin material connecting between the side covers 19, 20 and the cleaning frame 13 and the toner accommodation frame 16. FIG. 39 is a perspective view, and FIG. 40 is a top plan view.

The process cartridge 15 (115) shown in FIG. 39 and FIG. 40 are preassembled (temporarily coupled). The side cover 19, 20 (119a, b), the cleaning frame 13 (113), the development frame 17 (117) and the toner accommodation frame 16 (116) are integrally molded, individually. Various parts are mounted to the side covers 19, 20 (119a, b) and the frames 13, 16, 17 (113, 116, 117), as described in the foregoing. Then, the cleaning frame 13 (113) and the development frame 17 (117) are rotatably coupled. Subsequently, the side cover 19 (119a) is temporarily mounted to one side longitudinal ends of the frames 13, 16, 17 (113, 116, 117). The side cover 20 (119b) is temporarily mounted to the other longitudinal ends. For the temporary mounting of the side cover 19, 20 (119a, b), the positioning portions described above are engaged. The temporary mounting of the side cover 19, for example, is carried out in the following manner.

The shaft member 25 is inserted into the hole portion 19a of the side cover and into the hole portion 13a of the cleaning frame 13. The positioning portion 19b of the side cover 19 is engaged with the positioning portion 13b of the cleaning frame 13. The positioning portion (hole) 19c, d of the side cover 19 is engaged with a positioning portion (projection) 16a, b of the toner accommodation frame 16. In this manner, the side covers 19, 20, 119a, b are temporarily mounted to the frames 13, 16 (113, 116). The method of mounting the side covers 19, 20 (119a, b) to the frames 13, 16 (113, 116) has been described in detail.

Then, the metal mold 200a, b is mounted to the process cartridge 15 (115) which has been preassembled (FIGS. 39, 40). At this time, the outlets 201a, b of the gate 201 provided in the metal mold 200b are aligned with an injection port 200d of the side cover 20. The resin material injected into the gate 201 from an injector 500 flows to the abutment portions 154a, b. The molten resin material is cooled and solidified so that side covers 19, 20 (119a, b) are fixed to the frames 13, 16 (113, 116).

The metal molds 200a, b are the ones different from the metal molds used when the side covers and the metal molds 200a, b are molded.

The embodiments of the present invention are summarized as follows:

A bonding method for bonding molded resin products (a main body of the container 51, a cover 52, a side cover 19, 29, 119a, 119b, cleaning frame 13, 113, toner accommodating frame 16, 116), the improvement residing in that a first one of the molded resin products (51, 19, 20, 119a, 119b)and a second one of the molded resin products (52, 13, 113, 16, 116) are bonded by injecting resin material through a resin material injection path (200) to a bonding portion therebetween, wherein the resin material injection path is formed in one of or both of the first resin material molded product and the second resin material molded product.

The resin material injection path (200) is constituted by cooperation between a first resin material injection path (200) formed in the first resin material molded product (51, 19, 20, 119a, 119b) and a second resin material injection path (200) portion formed in the second resin material molded product (52, 13, 113, 16, 116).

The resin material injection path (200) is independently formed in the first resin material molded product (51, 19, 20, 119a, 119b) and/or the second resin material molded product (52, 13, 113, 16, 116).

The resin material injection path (200) has a larger cross-sectional area in an upstream side than in a downstream side with respect to a direction of injection of the resin material.

The resin material injection path (200) is cylindrical, and has an inner diameter which decreases toward downstream with respect to the direction.

The resin material injection path (200) is extended in a direction crossing with a direction in which the bonding portion (154a, 154b) is extended.

The resin material injection path (200) is provided by integral bonding of the first resin material molded product (51, 19, 20, 119a, 119b) and/or the second resin material molded product (52, 13, 113, 16, 116).

The resin material injection path (200) is provided in an outer wall of the first resin material molded product (51, 19, 20, 119a, 119b) and/or the second resin material molded product (52, 13, 113, 16, 116) by integral molding.

A resin material injected through the resin material injection path (200) is a different resin material which is different from a resin material constituting the first resin material molded product (51, 19, 20, 119a, 119b) and the second resin material molded product (52, 13, 113, 16, 116).

A resin material injected through the resin material injection path (200) is polystyrene (PS), polyphenyleneoxide/polystyrene (PPO/PS), or polyphenylene ether/polystyrene (PPE/PS), and a resin material of the first resin material molded product (51, 19, 20, 119a, 119b) and the second resin material molded product (52, 13, 113, 16, 116) is polystyrene (PS), or polyphenylene ether/polystyrene (PPE/PS).

A metal mold (200a, 200b) for bonding the first resin material molded product (52, 13, 113, 16, 116) and the second resin material molded product (52, 13, 113, 16, 116), used when the resin material is injected through the resin material injection path (200), is different from a metal mold (191a, 191b, 192a, 192b) used when the first resin material molded product (51, 19, 20, 119a, 119b) and the second resin material molded product (52, 13, 113, 16, 116) are formed.

The method comprises a temporary coupling step for temporarily coupling the first resin material molded product (52, 13, 113, 16, 116) and the second resin material molded product (52, 13, 113, 16, 116) prior to inserting the first resin material molded product (51, 19, 20, 119a, 119b) and the second resin material molded product (52, 13, 113, 16, 116) into the metal mold (200a, 200b), wherein the first resin material molded product (51, 19, 20, 119a, 119b) and the second resin material molded product (52, 13, 113, 16, 116) which are temporarily coupled are inserted into the metal mold (200a, 200b) (FIGS. 39 and 40).

A method for bonding molded resin products (a main body of the container 51, a cover 52, a side cover 19, 29, 119a, 119b, cleaning frame 13, 113, toner accommodating frame 16, 116), comprises:

(a) a first molding step of forming a first resin material molded product (51, 19, 20, 119a, 119b) by a first metal mold (191a, 191b);

(b) a second molding step for forming a second resin material molded product (52, 13, 113, 16, 116) by a second metal mold (192a, 192b);

(c) a positioning step of placing the first resin material molded product (51, 19, 20, 119a, 119b) and the second resin material molded product (52, 13, 113, 16, 116) in a third metal mold (200a, 200b) which is different from the first metal mold and second metal mold and positioning bonding portions of the first resin material molded product (51, 19, 20, 119a, 119b) and the second resin material molded product (52, 13, 113, 16, 116); and (d) a bonding step of bonding the first resin material molded product (51, 19, 20, 119a, 119b) and second resin material molded product (52, 13, 113, 16, 116) with each other by injecting a resin material through a resin material injection path (200) to a bonding portion (154a, 154b) between the first resin material molded product (51, 19, 20, 119a, 119b) and second resin material molded product (52, 13, 113, 16, 116), wherein the resin material injection path (200) is provided in one of or both of the first resin material molded product (51, 19, 20, 119a, 119b) and the second resin material molded product (52, 13, 113, 16, 116).

The method further comprises temporary coupling step for temporarily cutting the first resin material molded product (51, 19, 20, 119a, 119b) and the second resin material molded product (52, 13, 113, 16, 116), wherein the first resin material molded product (51, 19, 20, 119a, 119b) and second resin material molded product (52, 13, 113, 16, 116) which are temporarily coupled by the temporary coupling step is inserted into the third metal mold (200a, 200b) (FIGS. 39 and 40).

A process cartridge (15, 115) which is detachably mountable to a main assembly (27) of an electrophotographic image forming apparatus, comprises:

(a) an electrophotographic photosensitive member (11);

(b) process means (12, 14 or 18) actable on the electrophotographic photosensitive member (11);

(c) an outer wall constituted by bonding may first resin material molded product (51, 19, 20, 119a, 119b) and a second resin material molded product (52, 13, 113, 16, 116) by injecting resin material through a resin material injection path to a bonding portion (154a, 154b) between the first resin material molded product (51, 19, 20, 119a, 119b) and the second resin material molded product (52, 13, 113, 16, 116), wherein the resin material injection path is provided in one of or both of the first resin material molded product (51, 19, 20, 119a, 119b) and the second resin material molded product (52, 13, 113, 16, 116).

A process cartridge (15, 115) which is detachably mountable to a main assembly (27) of an electrophotographic image forming apparatus, comprises:

(a) an electrophotographic photosensitive drum (11);

(b) a charge member (12) for electrically charging the electrophotographic photosensitive drum;

(c) a developing member (18) for developing an electrostatic latent image formed on the electrophotographic photosensitive drum;

(d) a drum frame (13) for supporting the electrophotographic photosensitive drum and the charge member;

(e) a developer frame (16) having a developer accommodating portion (16a) for accommodating a developer for use by the developing member (18) to develop the electrostatic latent image;

(f) a first end cover (19, 119) bonded to the drum frame and the developer frame by injecting resin material through a resin material injection path to bonding portion (154a, 154b) between the first end cover and the drum frame and between the first end cover and the developer frame, wherein the first end cover is provided at one side longitudinal ends of the drum frame and the developer frame; and (g) a second end cover (20, 119b) bonded to the drum frame and developer frame by injecting resin material through a resin material injection path, wherein the second end cover is provided at the other side longitudinal ends of the drum frame and developer frame.

An assembling method of a process cartridge (15, 115) which is detachably mountable to a main assembly (27) of an electrophotographic image forming apparatus, comprises:

(a) a step of preparing an electrophotographic photosensitive member (11);

(b) a step of preparing process means (12, 14 or 18) actable on the electrophotographic photosensitive member (11); and (c) a step of bonding a first resin material molded product (51, 19, 20, 119a, 119b) and a second resin material molded product (52, 13, 113, 16, 116) by injecting resin material through a resin material injection path to a bonding portion (154a, 154b) between the first resin material molded product (51, 19, 20, 119a, 119b) and second resin material molded product (52, 13, 113, 16, 116), with the resin material injection path provided in one of or both of the first resin material molded product (51, 19, 20, 119a, 119b) and second resin material molded product (52, 13, 113, 16, 116).

An assembling method of a process cartridge (15, 115) which is detachably mountable to a main assembly (27) of an electrophotographic image forming apparatus, comprises:

(a) a step of preparing a drum frame (13) for supporting an electrophotographic photosensitive drum 11) and a charge member (12) for electrically charging the electrophotographic photosensitive drum (11);

(b) a step of preparing a developer frame (16) having a developer accommodating portion (16a) for accommodating a developer for use by a developing member (18) to develop the electrostatic latent image;

(c) a first bonding step of bonding a first end cover (19, 119a) to the drum frame and to the developer frame by injecting resin material through a resin material injection path to the bonding portion (154a, 154b) between the first end cover and the drum frame and between the first end cover and the drum frame, wherein the first end cover is bonded to one side longitudinal ends of the drum frame and the developer frame;

(d) a second bonding step of bonding a second end cover (20, 119b) to the drum frame and to developer frame by injecting resin material a resin material injection path to bonding portion (154a, 154b) between the second end cover and the drum frame and between the second end cover and the developer frame, wherein the second end cover is bonded to the other side ends of the drum frame, a lower developing cover and a developer frame.

According to the present invention, the latitude of the design is improved, and the assembling process is simplified. The rigidity is improved, too.

According to an aspect of the present invention, the resin material injection path is independently formed in the first resin material molded product and/or the second resin material molded product. Therefore, the resin material inlet can be provided within a projection area of the product.

According to another aspect of the present invention, the resin material injection path has a larger cross sectional area in an upstream side than in a downstream side with respect to a direction of injection of the resin material. Therefore, the position in the resin injection path where the resin material is desired to be solidified first can be set at a downstream position, and the gate seal is effected at the position, so that the resin material is prevented from flowing back. Additionally, the resin material is solidified in a pressurized state.

According to still another aspect of the present invention, the injection path is cylindrical and converging in the injecting direction, so that the resin material is evenly solidified at the gate sealing position.

According to yet another aspect of the present invention, the injection passage is formed integrally with the first molded resin product and/or the second molded resin product, so that the area usable for the passage is wide, and therefore, the design latitude is high.

According to another aspect of the present invention, the metal mold (200a, 200b) for bonding the second resin material molded product (52, 13, 113, 16, 116) and the second resin material molded product (52, 13, 113, 16, 116), used when the resin material is injected through the resin material injection path (200), is different from a metal mold (191a, 191b, 192a, 192b) used when the first resin material molded product (51, 19, 20, 119a, 119b) and the second resin material molded product (52, 13, 113, 16, 116) are formed. Therefore, the metal mold for the connection is simplified.

According to yet another aspect of the present invention, the bonding method comprises a temporary coupling step for temporarily coupling the first resin material molded product (51, 19, 20, 119a, 119b) and the second resin material molded product (52, 13, 113, 16, 116) prior to inserting the first resin material molded product (51, 19, 20, 119a, 119b) and the second resin material molded product (52, 13, 113, 16, 116) into the metal mold (200a, 200b), wherein the first resin material molded product (51, 19, 20, 119a, 119b) and the second resin material molded product (52, 13, 113, 16, 116) which are temporarily coupled, are inserted into the metal mold (200a, 200b) (FIGS. 39 and 40). Therefore, the first resin material molded product (51, 19, 20, 119a, 119b) and the second resin material molded product (52, 13, 113, 16, 116) can be easily set in the metal mold for the bonding.

According to the foregoing embodiments, the necessity for using screws for fastening the frames is eliminated. Furthermore, the rigidity of frame is enhanced so that mechanical strength against impact is enhanced, and the twisting deformation is suppressed.

While the invention has been described with reference to the structures disclosed herein, it is not confined to the details set forth and this application is intended to cover such modifications or changes as may come within the purpose of the improvements or the scope of the following claims.

Therefore, the quality of the process cartridge having a large capacity, and therefore, a long service life can be improved. As described in the foregoing, according to the present invention, the molded resin products can be assuredly bonded.

While the invention has been described with reference to the structures disclosed herein, it is not confined to the details set forth and this application is intended to cover such modifications or changes as may come within the purposes of the improvements or the scope of the following claims.

What is claimed is:

1. A bonding method for bonding first and second molded resin products, comprising the steps of:

forming a resin material injection path in one of or both of said first resin material molded product and said second resin material molded product;

injecting resin material through the resin material injection path to a bonding portion between the first and second molded resin products; and wherein said resin material injection path has a larger cross-sectional area in an upstream side than in a downstream side with respect to a direction of injection of the resin material.

2. A method according to claim 1, wherein said resin material injection path forming step includes the step of constituting the resin material injection path by a cooperation between a first resin material injection path formed in said first resin material molded product and a second resin material injection path portion formed in said second resin material molded product.

3. A method according to claim 1, wherein said resin material injection path forming step includes the step of constituting the resin material injection path in said first resin material molded product and/or said second resin material molded product.

4. A method according to claim 1, wherein said resin material injection path is cylindrical, and has an inner diameter which decreases toward the downstream direction with respect to the direction of injection of the resin material.

5. A method according to claim 1, 2 or 3, wherein said resin material injection path is extended in a direction crossing with a direction in which said bonding portion is extended.

6. A method according to claim 1, 2 or 3, wherein said resin material injection path forming step includes the step of constituting the resin material injection path by integral bonding of said first resin material molded product and/or said second resin material molded product.

7. A method according to claim 1, 2 or 3, wherein said resin material injection path forming step includes the step of constituting the resin material injection path in an outer wall of said first resin material molded product and/or said second resin material molded product by integral molding.

8. A method according to claim 1, 2 or 3, wherein a resin material injected through said resin material injection path is a different resin material which is different from a resin material constituting said first resin material molded product and said second resin material molded product.

9. A method according to claim 1, wherein the resin material injected through said resin material injection path is polystyrene (PS), polyphenyleneoxide/polystyrene (PPO/PS), or polyphenylene ether/polystyrene (PPE/PS), and a resin material of said first resin material molded product and said second resin material molded product is polystyrene (PS), or polyphenylene ether/polystyrene (PPE/PS).

10. A method according to claim 1, 2 or 3, wherein a metal mold connecting member for assisting bonding said first resin material molded product and said second resin material molded product, used when the resin material is injected through said resin material injection path, is different from a connecting member used when said first resin material molded product and said second resin material molded product are formed.

11. A method according to claim 10, wherein said method comprises a temporary coupling step for temporarily coupling said first resin material molded product and said second resin material molded product prior to inserting said first resin material molded product and said second resin material molded product into the connecting member, wherein said first resin material molding product and said second resin material molded product, which are temporarily coupled, are inserted into said connecting member.

12. A bonding method for bonding molded resin products, comprising:
(a) a first molding step of forming a first resin material molded product by a first metal mold;
(b) a second molding step for forming a second resin material molded product by a second metal mold;
(c) a positioning step of placing said first resin material molded product and said second resin material molded product in a third connecting member which is different from said first metal mold and second metal mold and positioning bonding portions of said first resin material molded product and said second resin material molded product; and
(d) a bonding step of bonding said first resin material molded product and second resin material molded product with each other by injecting a resin material through a resin material injection path to a bonding portion between said first resin material molded product and second resin material molded product, wherein said resin material injection path is provided in one of or both of said first resin material molded product and said second resin material molded product.

13. A method according to claim 12, wherein said resin material injecting step includes the step of forming a resin material injection path by constituting said resin material injection path by a cooperation between a first resin material injection path formed in said first resin material molded product and a second resin material injection path portion formed in said second resin material molded product.

14. A method according to claim 12, wherein said resin material injecting step includes the step of forming a resin material injection path by constituting said resin material injection path in said first resin material molded product and/or said second resin material molded product.

15. A method according to claim 12, 13 or 14, wherein said resin material injection path has a larger cross-sectional area in an upstream side than in a downstream side with respect to a direction of injection of the resin material.

16. A method according to claim 14, wherein said resin material injection path is cylindrical, and has an inner diameter which decreases in the downstream direction with respect to the direction of injection of the resin material.

17. A method according to claim 12, 13 or 14, wherein said resin material injection path is extended in a direction crossing with a direction in which said bonding portion is extended.

18. A method according to claim 12, 13 or 14, wherein said resin material injecting step includes the step of forming a resin material injection path by constituting said resin material injection path by integral bonding of said first resin material molded product and/or said second resin material molded product.

19. A method according to claim 12, 13 or 14, wherein said resin material injecting step includes the step of forming a resin material injection path by constituting said resin material injection path in an outer wall of said first resin material molded product and/or said second resin material molded product by integral molding.

20. A method according to claim 12, 13 or 14, wherein a resin material injected through said resin material injection path is a different resin material which is different from a resin material constituting said first resin material molded product and said second resin material molded product.

21. A method according to claim 12, wherein the resin material injected through said resin material injection path is polystyrene (PS), polyphenylene oxide/polystyrene (PPO/PS), or polyphenylene ether/polystyrene (PPE/PS), and a resin material of said first resin material molded product and said second resin material molded product is polystyrene (PS), or polyphenylene ether/polystyrene (PPE/PS).

22. A method according to claim 12, further comprising a temporary coupling step for temporarily coupling said first resin material molded product and said second resin material molded product, wherein said first resin material molding product and second resin material molded product, which are temporarily coupled by said temporary coupling step, is inserted into said third connecting member.

23. A process cartridge which is detachably mountable to a main assembly of an electrophotographic image forming apparatus, comprising:
   (a) an electrophotographic photosensitive member;
   (b) process means actable on said electrophotographic photosensitive member;
   (c) an outer wall constituted by bonding a first resin material molded product and a second resin material molded product by injecting resin material through a resin material injection path to a bonding portion between said first resin material molded product and said second resin material molded product, wherein said resin material injection path is provided in one of or both of said first resin material molded product and said second resin material molded product.

24. A process cartridge according to claim 23, wherein said resin material injection path is constituted by a cooperation between a first resin material injection path formed in said first resin material molded product and a second resin material injection path portion formed in said second resin material molded product.

25. A process cartridge according to claim 23, wherein said resin material injection path is independently formed in said first resin material molded product and/or said second resin material molded product.

26. A process cartridge according to claim 23, 24 or 25, wherein said resin material injection path has a larger cross-sectional area in an upstream side than in a downstream side with respect to a direction of injection of the resin material.

27. A process cartridge according to claim 26, wherein said resin material injection path is cylindrical, and has an inner diameter which decreases in a downstream direction with respect to the direction of injection of the resin material.

28. A process cartridge according to claim 23, 24 or 26, wherein said resin material injection path is extended in a direction crossing with a direction in which said bonding portion is extended.

29. A process cartridge according to claim 23, 24 or 26, wherein said resin material injection path is provided by integral bonding of said first resin material molded product and/or said second resin material molded product.

30. A process cartridge according to claim 23, 24 or 26, wherein said resin material injection path is provided in an outer wall of said first resin material molded product and/or said second resin material molded product by integral molding.

31. A process cartridge according to claim 23, 24 or 26, wherein a resin material injected through said resin material injection path is a different resin material which is different from a resin material constituting said first resin material molded product and said second resin material molded product.

32. A process cartridge according to claim 23, wherein the resin material injected through said resin material injection path is polystyrene (PS), polyphenyleneoxide/polystyrene (PPO/PS), or polyphenylene ether/polystyrene (PPE/PS), and a resin material of said first resin material molded product and said second resin material molded product is polystyrene (PS), or polyphenylene ether/polystyrene (PPE/PS).

33. A process cartridge according to claim 23, 24 or 25, wherein said first resin material molded product includes a first end cover and a second end cover, and said second resin material molded product includes a drum frame and a developer frame, wherein said drum frame supports the electrophotographic photosensitive member, and wherein said developer frame includes a developer accommodating portion for accommodating a developer.

34. A process cartridge according to claim 23, 24 or 25, wherein said process means includes a charge member for electrically charging said electrophotographic photosensitive member, a developing member for developing an electrostatic latent image formed on said electrophotographic photosensitive member, and a cleaning member for removing residual toner from said electrophotographic photosensitive member.

35. A process cartridge according to claim 23, wherein said process cartridge includes a developer which develops an electrostatic latent image formed on said electrophotographic photosensitive member by a developing member, which is one of said process means.

36. A process cartridge which is detachably mountable to a main assembly of an electrophotographic image forming apparatus, comprising:
   (a) an electrophotographic photosensitive drum:
   (b) a charge member for electrically charging said electrophotographic photosensitive drum;
   (c) a developing member for developing an electrostatic latent image formed on said electrophotographic photosensitive drum;
   (d) a drum frame for supporting said electrophotographic photosensitive drum and said charge member;
   (e) a developer frame having a developer accommodating portion for accommodating a developer for use by said developing member to develop the electrostatic latent image;
   (f) a first end cover bonded to said drum frame and said developer frame by injecting resin material through a resin material injection path to bonding portions between said first end cover and said drum frame and between said first end cover and said developer frame, wherein said first end cover is provided at one longitudinal end of said drum frame and said developer frame; and
   (g) a second end cover bonded to said drum frame and developer frame by injecting resin material through a resin material injection path to bonding portions between said first end cover and said drum frame and between said first end cover and said developer frame, wherein said second end cover is provided at the other longitudinal end of said drum frame and developer frame.

37. A process cartridge according to claim 36, wherein to said resin material injection path is constituted by cooperation between a first resin material injection path formed in said first resin material molded product and a second resin material injection path portion formed in said second resin material molded product.

38. A process cartridge according to claim 36, wherein said resin material injection path is independently formed in said first resin material molded product and/or said second resin material molded product.

39. A process cartridge according to claim 36, 37 or 38, wherein said resin material injection path has a larger cross-sectional area in an upstream side than in a downstream side with respect to a direction of injection of the resin material.

40. A process cartridge according to claim 39, wherein said resin material injection path is cylindrical, and has an inner diameter which decreases in a downstream direction with respect to the direction of injection of the resin material.

41. A process cartridge according to claim 36, 37 or 39, wherein said resin material injection path is extended in a direction crossing with a direction in which said bonding portion is extended.

42. A process cartridge according to claim 36, 37 or 39, wherein said resin material injection path is provided by integral bonding of said first resin material molded product and/or said second resin material molded product.

43. A process cartridge according to claim 36, 37 or 39, wherein said resin material injection path is provided in an outer wall of said first resin material molded product and/or said second resin material molded product by integral molding.

44. A process cartridge according to claim 36, 37 or 39, wherein a resin material injected through said resin material injection path is a different resin material which is different from a resin material constituting said first resin material molded product and said second resin material molded product.

45. A process cartridge according to claim 36, wherein the resin material injected through said resin material injection path is polystyrene (PS), polyphenyleneoxide/polystyrene (PPO/PS), or polyphenylene ether/polystyrene (PPE/PS), and a resin material of said first resin material molded product and said second resin material molded product is polystyrene (PS), or polyphenylene ether/polystyrene (PPE/PS).

46. A process cartridge according to claim 36, wherein said process cartridge includes developer, and said developer is accommodated in said developer accommodating portion.

47. An assembling method of a process cartridge which is detachably mountable to a main assembly of an electrophotographic image forming apparatus, comprising:
(a) a step of preparing an electrophotographic photosensitive member;
(b) a step of preparing process means actable on said electrophotographic photosensitive member; and
(c) a step of bonding a first resin material molded product and a second resin material molded product by injecting resin material through a resin material injection path to a bonding portion between said first resin material molded product and second resin material molded product, with said resin material injection path being provided in one of or both of said first resin material molded product and second resin material molded product.

48. A method according to claim 47, wherein said resin material injecting step includes the step of forming a resin material injection path by constituting said resin material injection path by cooperation between a first resin material injection path formed in said first resin material molded product and a second resin material injection path portion formed in said second resin material molded product.

49. A method according to claim 47, wherein said resin material injecting step includes the step of forming a resin material injection path by constituting said resin material injection path in said first resin material molded product and/or said second resin material molded product.

50. A method according to claim 47, 48 or 49, wherein said resin material injection path has a larger cross-sectional area in an upstream side than in a downstream side with respect to a direction of injection of the resin material.

51. A method according to claim 50, wherein said resin material injection path is cylindrical, and has an inner diameter which decreases in the downstream direction with respect to the direction of injection of the resin material.

52. A method according to claim 47, 48 or 49, wherein said resin material injection path is extended in a direction crossing with a direction in which said bonding portion is extended.

53. A method according to claim 47, 48 or 49, wherein said resin material injecting step includes the step of forming a resin material injection path by constituting said resin material injection path by integral bonding of said first resin material molded product and/or said second resin material molded product.

54. A method according to claim 47, 48 or 49, wherein said resin material injecting step includes the step of forming a resin material injection path by constituting said resin material injection path in an outer wall of said first resin material molded product and/or said second resin material molded product by integral molding.

55. A method according to claim 47, 48 or 49, wherein a resin material injected through said resin material injection path is a different resin material which is different from a resin material constituting said first resin material molded product and said second resin material molded product.

56. A method according to claim 47, wherein the resin material injected through said resin material injection path is polystyrene (PS), polyphenyleneoxide/polystyrene (PPO/PS), or polyphenylene ether/polystyrene (PPE/PS), and a resin material of said first resin material molded product and said second resin material molded product is polystyrene (PS), or polyphenylene ether/polystyrene (PPE/PS).

57. A method according to claim 47, 48 or 14, wherein said first resin material molded product includes a first end cover and a second end cover, and a second end cover, and said second resin material molded product includes a drum frame and a developer frame wherein said drum frame supports the electrophotographic photosensitive member, and wherein said developer frame includes a developer accommodating portion for accommodating a developer.

58. A method according to claim 47, 48 or 49, wherein said process means includes at least one of a charge member for electrically charging said electrophotographic photosensitive member, a developing member for developing an electrostatic latent image formed on said electrophotographic photosensitive member and a cleaning member for removing residual toner from said electrophotographic photosensitive member.

59. An assembling method of a process cartridge which is detachably mountable to a main assembly of an electrophotographic image forming apparatus, comprising:
(a) a step of preparing a drum frame for supporting an electrophotographic photosensitive drum and a charge member for electrically charging said electrophotographic photosensitive drum;
(b) a step of preparing a developer frame having a developer accommodating portion for accommodating a developer for use by a developing member to develop the electrostatic latent image;
(c) a first bonding step of bonding a first end cover to said drum frame and to said developer frame by injecting resin material through a resin material injection path to bonding portions between said first end cover and said drum frame and between said first end cover and said developer frame, wherein said first end cover is bonded to one longitudinal end of said drum frame and said developer frame; and (d) a second bonding step of bonding a second end cover to said drum frame and to developer frame by injecting resin material a resin material injection path to bonding portions between said second end cover and said drum frame and between said second end cover and said developer frame, wherein said second end cover is bonded to the other end of said drum frame and said developer frame.

60. A method according to claim 59, wherein said resin material injecting step includes the step of forming a resin material injection path by constituting said resin material injection path by cooperation between a first resin material injection path formed in said first resin material molded product and a second resin material injection path portion formed in said second resin material molded product.

61. A method according to claim 59, wherein said resin material injecting step includes the step of forming a resin material injection path by constituting said resin material injection path in said first resin material molded product and/or said second resin material molded product.

62. A method according to claim 59, 60 or 61, wherein said resin material injection path has a larger cross-sectional area in an upstream side than in a downstream side with respect to a direction of injection of the resin material.

63. A method according to claim 62, wherein said resin material injection path is cylindrical, and has an inner diameter which decreases in the downstream direction with respect to the direction of injection of the resin material.

64. A method according to claim 59, 60 or 61, wherein said resin material injection path is extended in a direction crossing with a direction in which said bonding portion is extended.

65. A method according to claim 59, 60 or 61, wherein said resin material injecting step includes the step of forming a resin material injection path by constituting said resin material injection path by integral bonding of said first resin material molded product and/or said second resin material molded product.

66. A method according to claim 59, 60 or 61, wherein said resin material injecting step includes the step of forming a resin material injection path by constituting said resin material injection path in an outer wall of said first resin material molded product and/or said second resin material molded product by integral molding.

67. A method according to claim 59, 60 or 61, wherein a resin material injected through said resin material injection path is a different resin material which is different from a resin material constituting said first resin material molded product and said second resin material molded product.

68. A method according to claim 59, wherein the resin material injected through said resin material injection path is polystyrene (PS), polyphenyleneoxide/polystyrene (PPO/PS), or polyphenylene ether/polystyrene (PPE/PS), and a resin material of said first resin material molded product and said second resin material molded product is polystyrene (PS), or polyphenylene ether/polystyrene (PPE/PS).

69. A method according to claim 59, wherein said developing member is supported on the developing frame, and the developing frame is swingably mounted to the developer frame.

* * * * *

UNITED STATES PATENT AND TRADEMARK OFFICE
CERTIFICATE OF CORRECTION

PATENT NO. : 6,415,121 B1
DATED : July 2, 2002
INVENTOR(S) : Akira Suzuki et al.

It is certified that error appears in the above-identified patent and that said Letters Patent is hereby corrected as shown below:

Column 1,
Lines 29 and 33, "mountably" should read -- mountable --.

Column 3,
Line 36, "molded ." should read -- molded product. --.

Column 4,
Line 32, "material" should read -- material through --.

Column 8,
Line 17, "direction)" should read -- direction). --.

Column 9,
Line 13, "received" should read -- receive --.

Column 11,
Line 57, "16 1b" should read -- 161b --.

Column 14,
Line 3, "ad" should read -- and --.

Column 17,
Line 61, "becomes-pivotable" should read -- becomes pivotable --.

Column 20,
Line 38, "at" should read -- as --.

Column 21,
Line 42, "fixed." should read -- is fixed. --.

Column 22,
Lines 1 and 15, "above described" should read -- above-described --.

Column 28,
Line 12, "maintaining" should read -- maintaining of --.
Line 66, "above described" should read -- above-described --.

Column 32,
Line 55, "119$b$)and" should read -- 119b) and --.

Column 34,
Line 34, "may" should be deleted.

UNITED STATES PATENT AND TRADEMARK OFFICE
CERTIFICATE OF CORRECTION

PATENT NO. : 6,415,121 B1
DATED : July 2, 2002
INVENTOR(S) : Akira Suzuki et al.

It is certified that error appears in the above-identified patent and that said Letters Patent is hereby corrected as shown below:

Column 35,
Line 66, "cross sectional" should read -- cross-sectional --.

Column 39,
Lines 46, 50, 54 and 59, "26," should read -- 25, --.

Column 40,
Line 30, "drum:" should read -- drum; --.
Line 58, "to" (second occurrence) should be deleted.

Column 41,
Lines 11, 15, 19 and 24, "39," should read -- 38, --.

Column 42,
Line 41, "and a second and cover," (second occurrence) should be deleted.

Column 43,
Line 8, "developer frame" should read -- said developer frame --.
Line 9, "material" (first occurrence) should read -- material through --.

Signed and Sealed this

Twenty-seventh Day of May, 2003

JAMES E. ROGAN
*Director of the United States Patent and Trademark Office*